May 3, 1966  W. F. MacKENZIE ETAL  3,249,278
HEEL ATTACHING MACHINES
Filed March 24, 1964  21 Sheets-Sheet 6
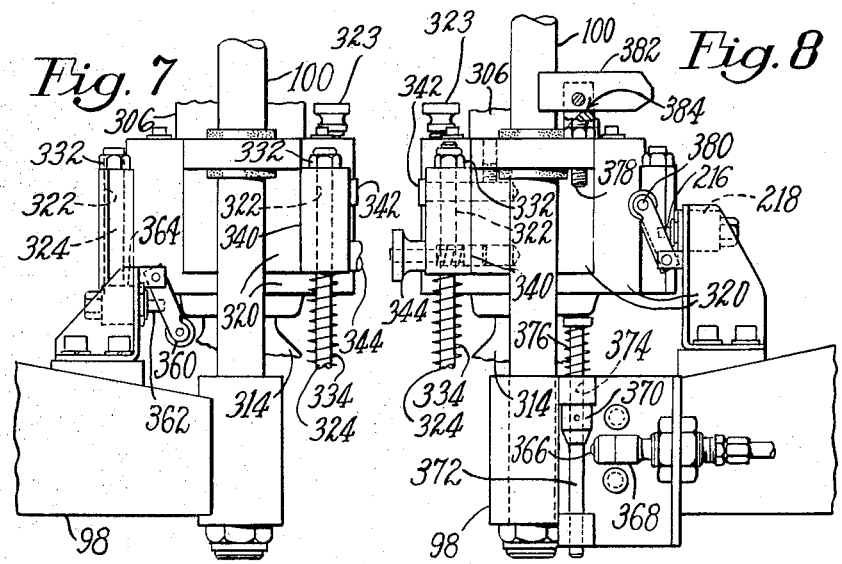
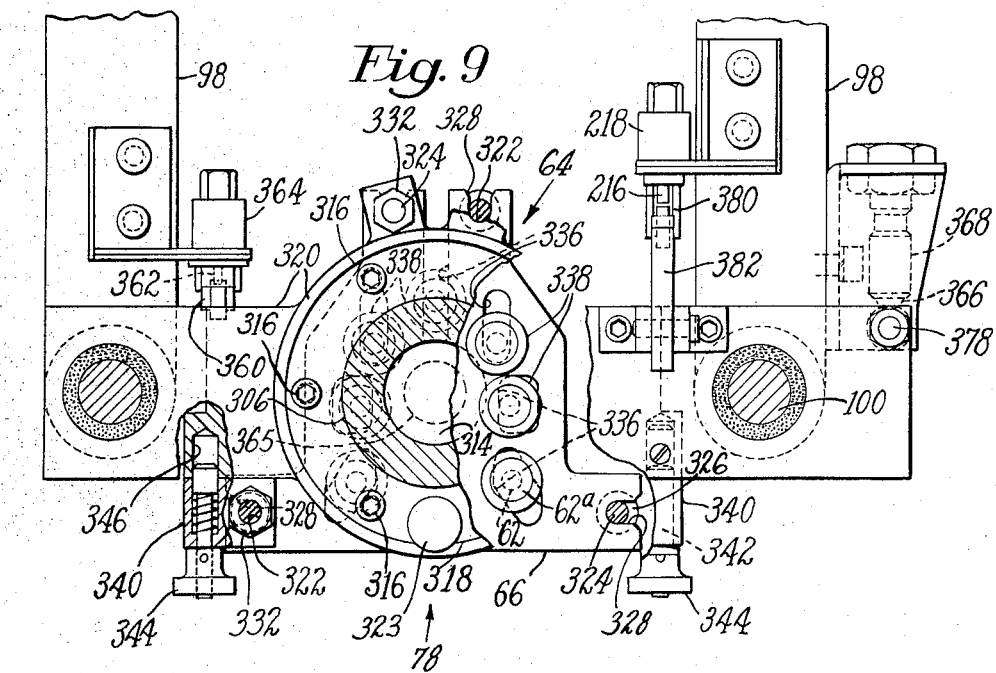

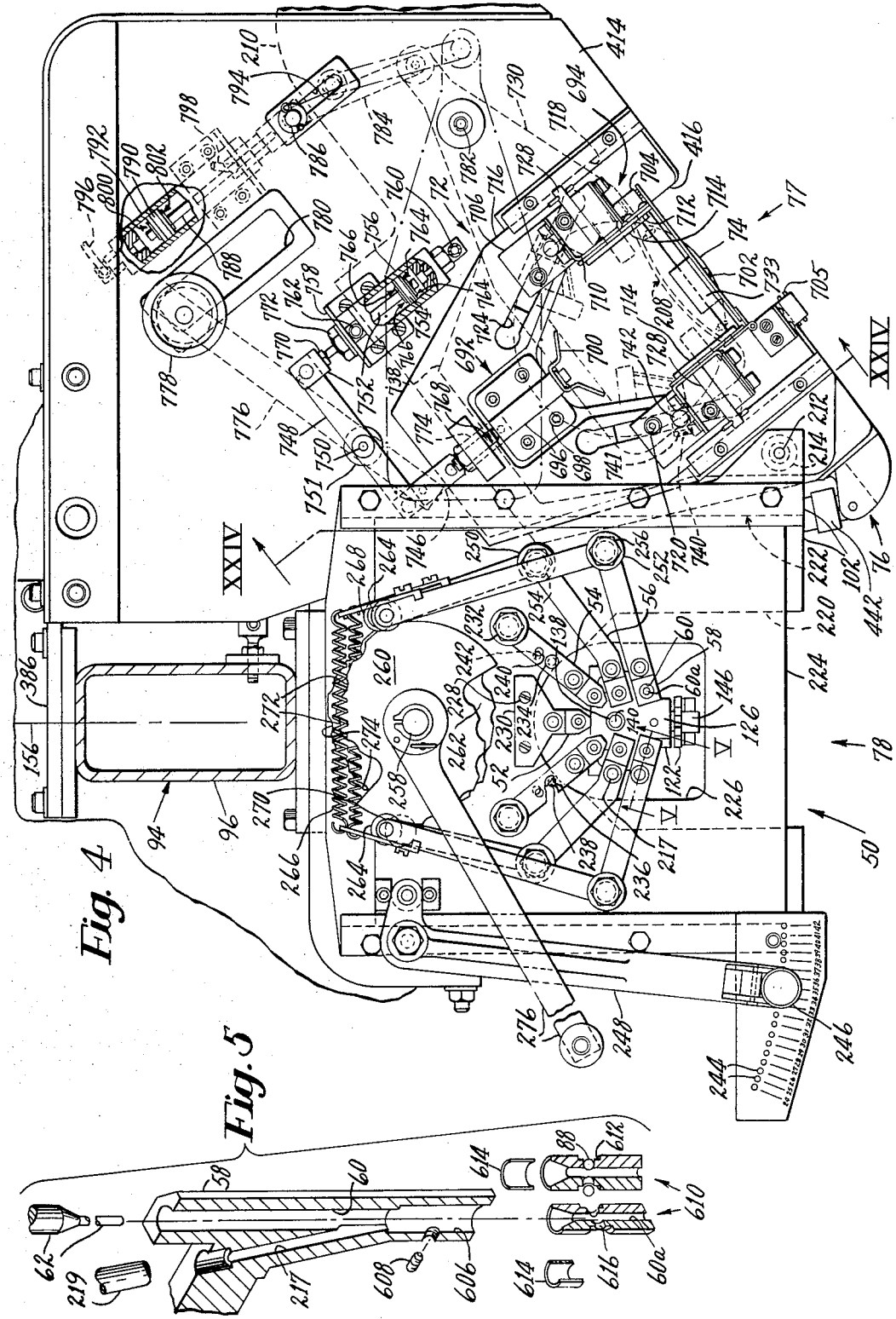

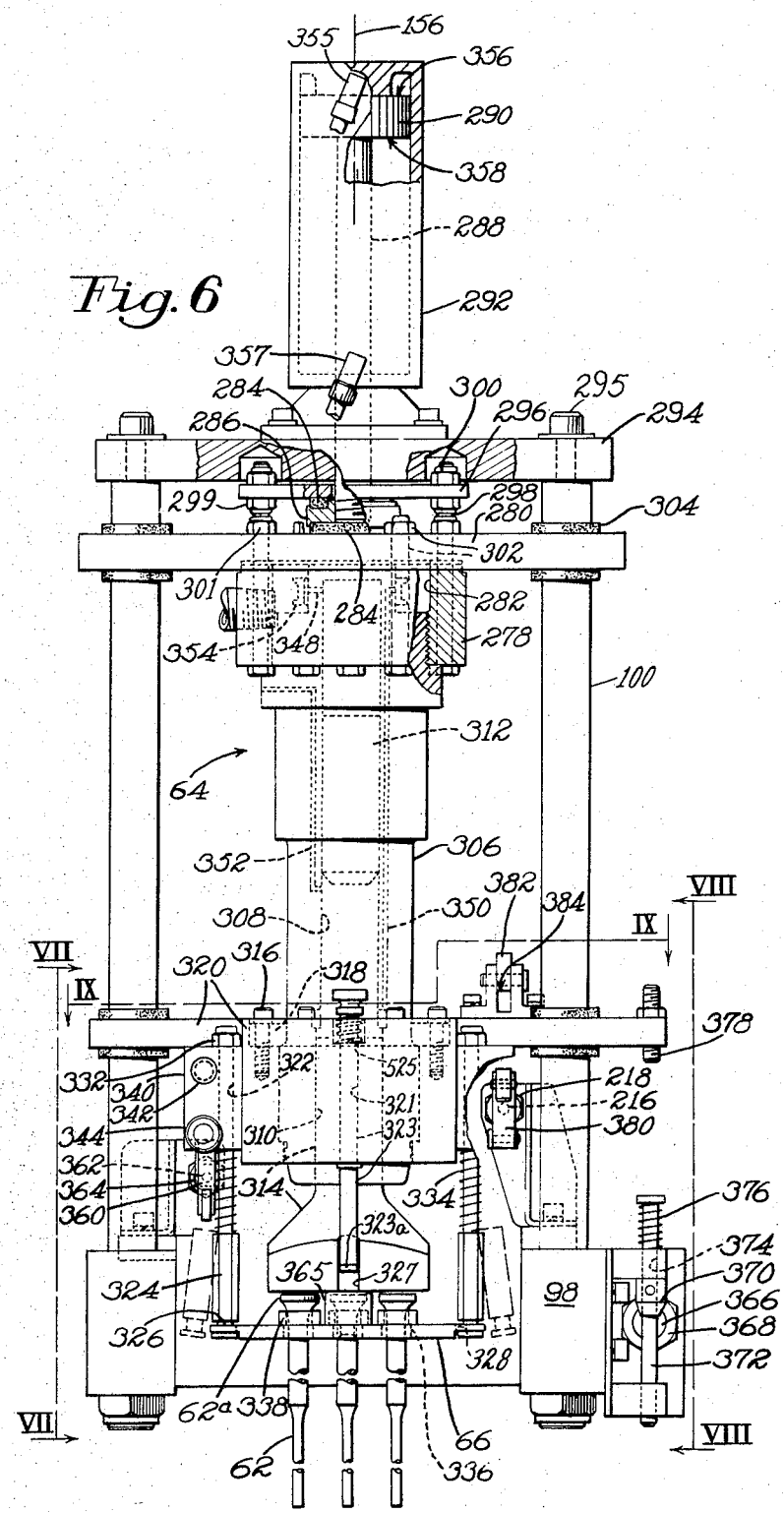

May 3, 1966 W. F. MacKENZIE ETAL 3,249,278
HEEL ATTACHING MACHINES
Filed March 24, 1964 21 Sheets-Sheet 7
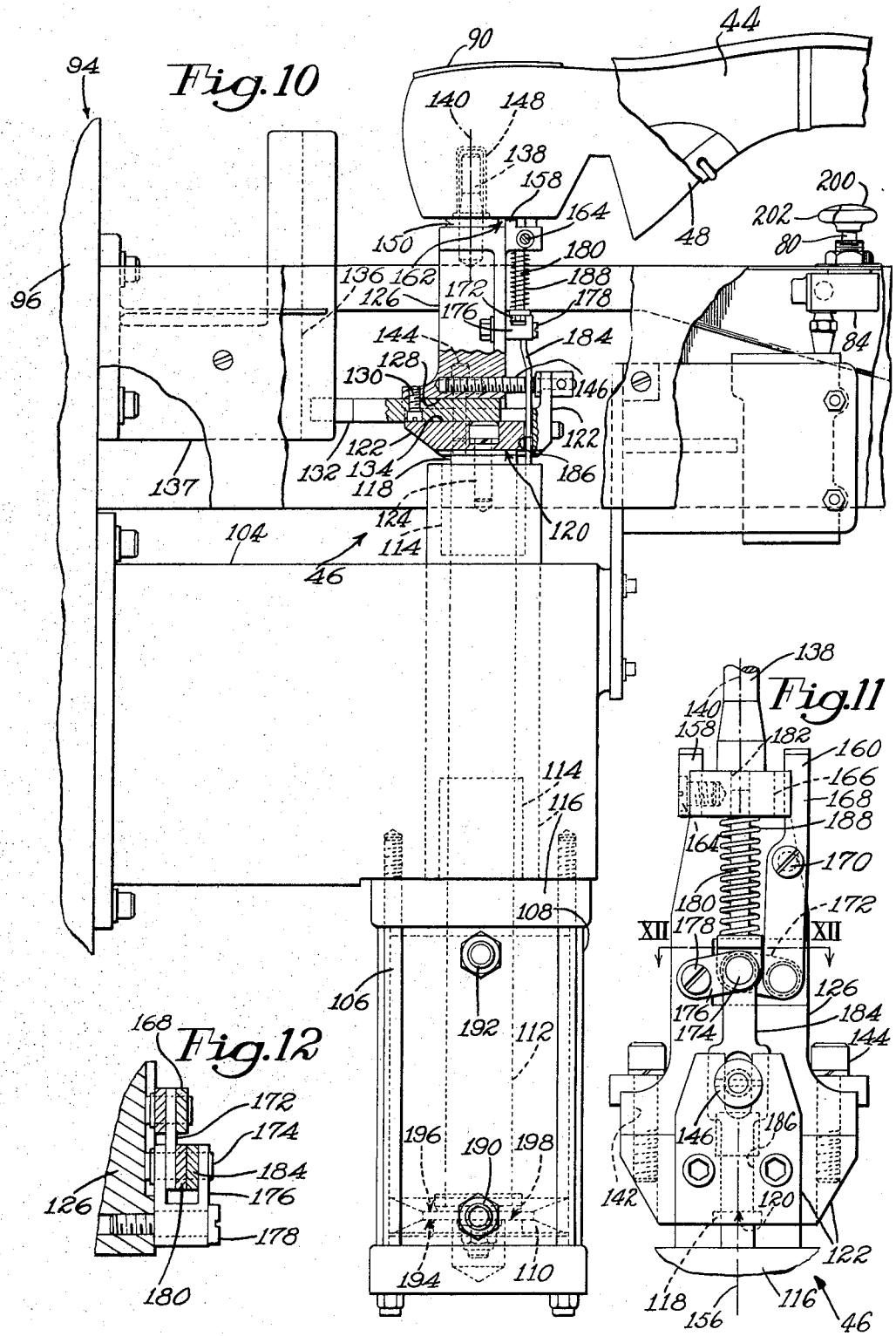

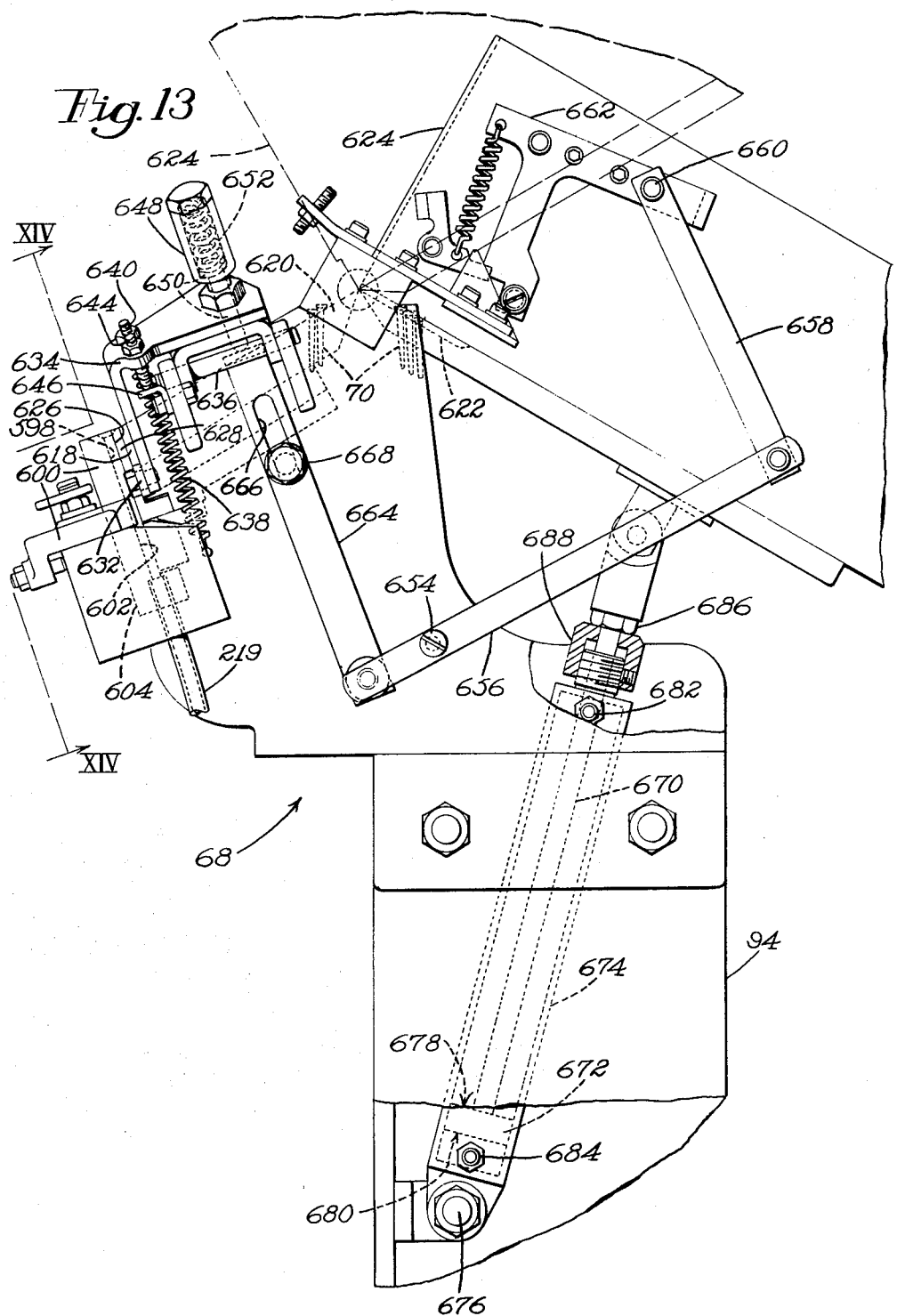

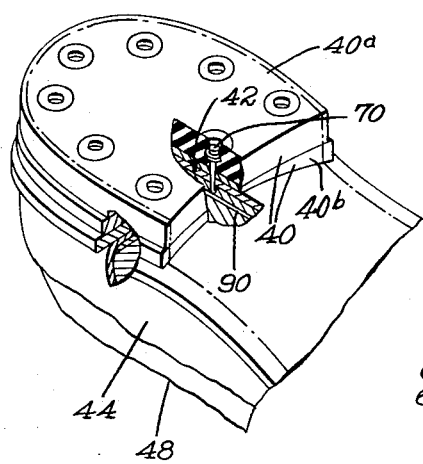
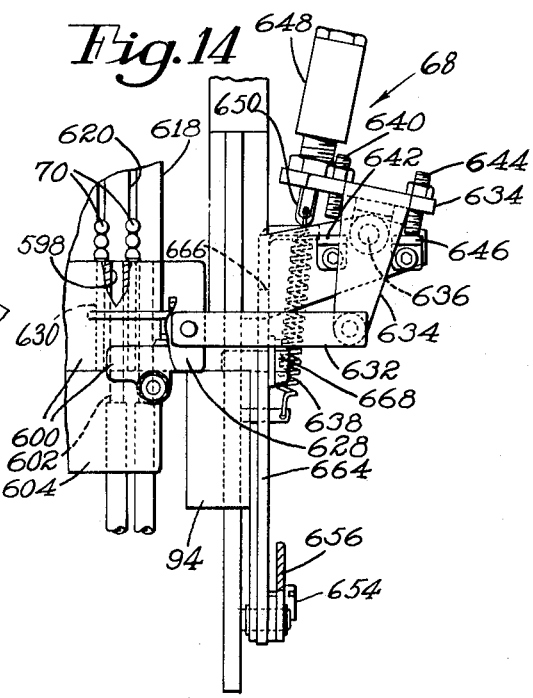
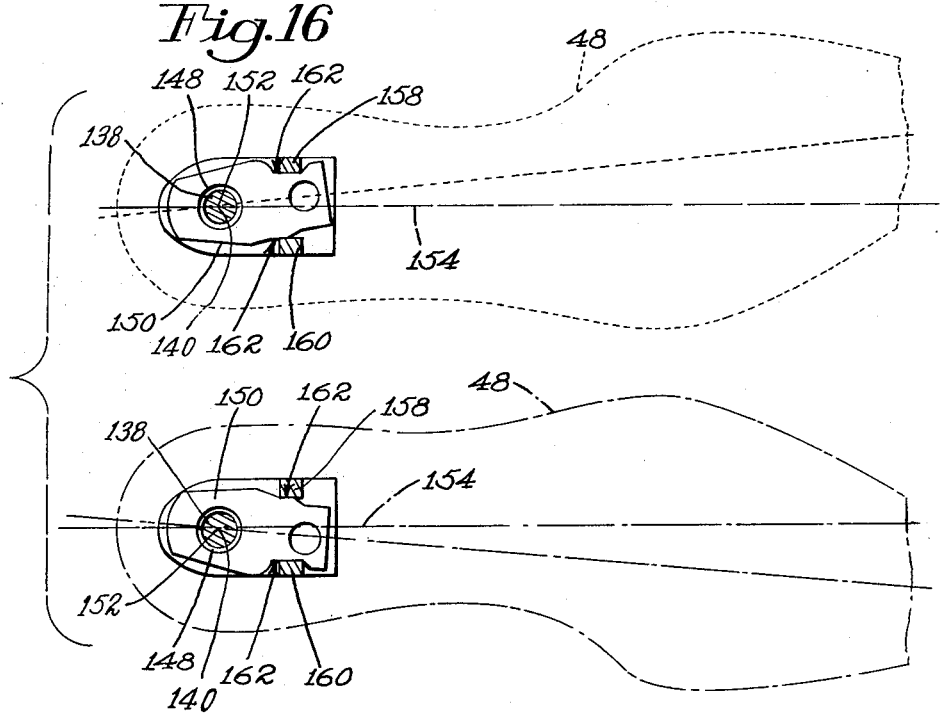

May 3, 1966 W. F. MacKENZIE ETAL 3,249,278
HEEL ATTACHING MACHINES
Filed March 24, 1964 21 Sheets-Sheet 10

Fig. 17

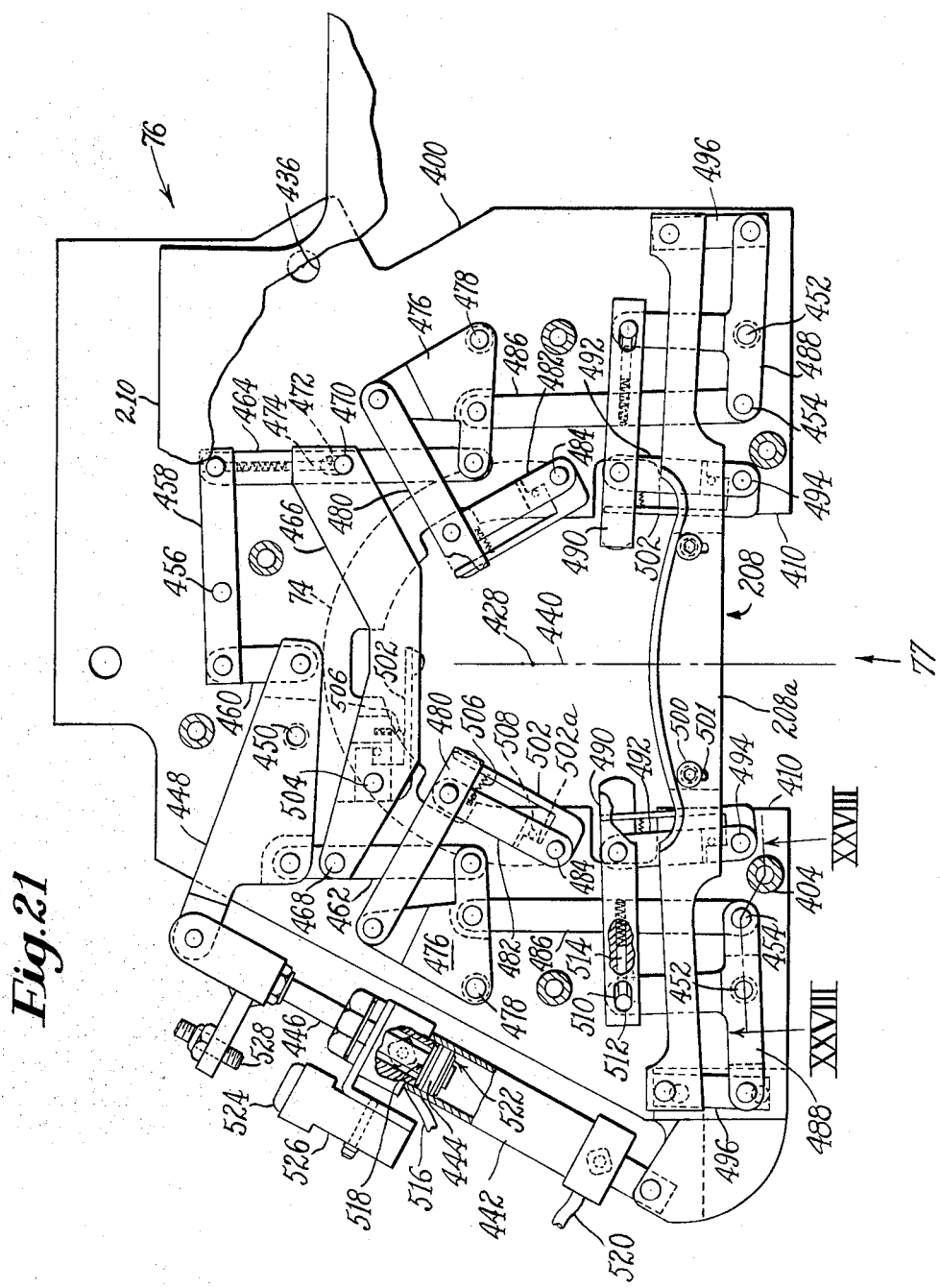

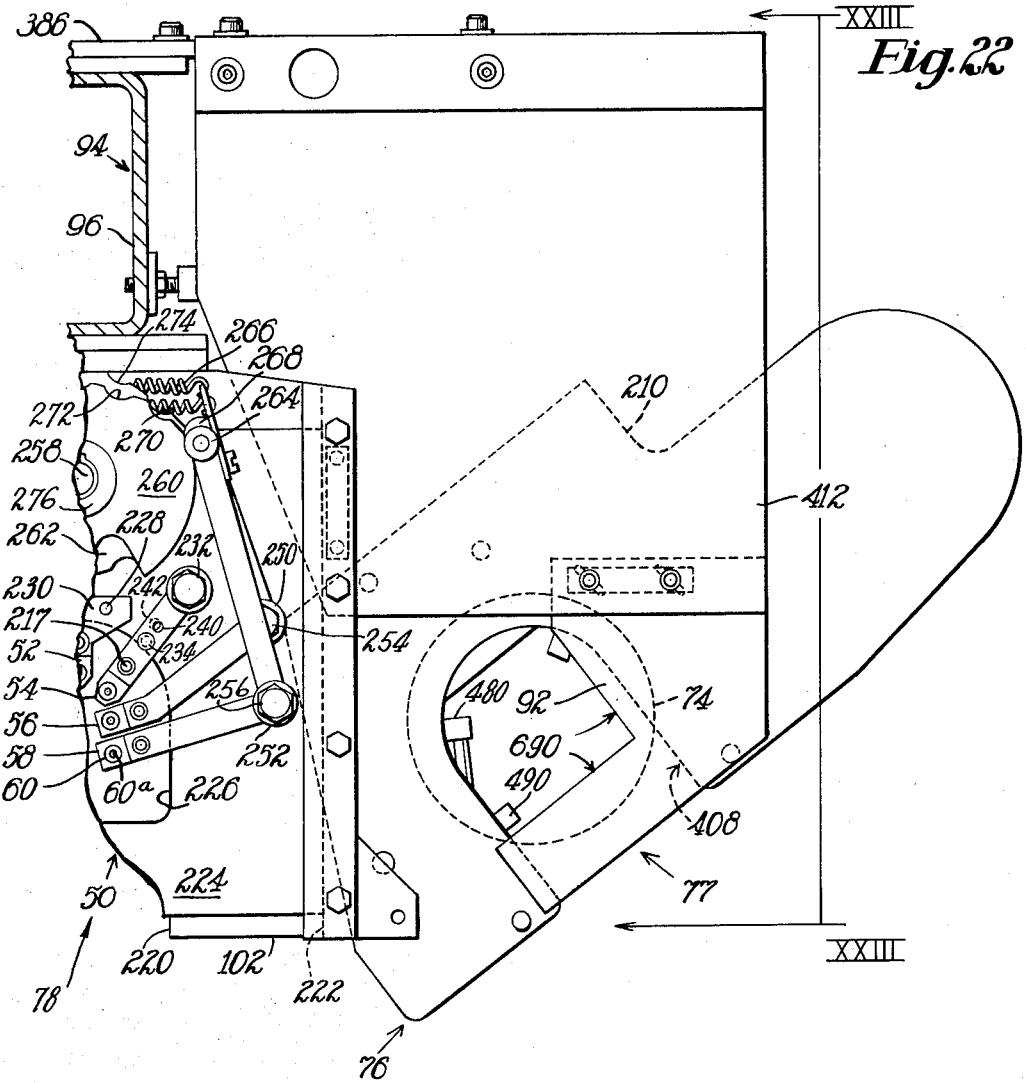
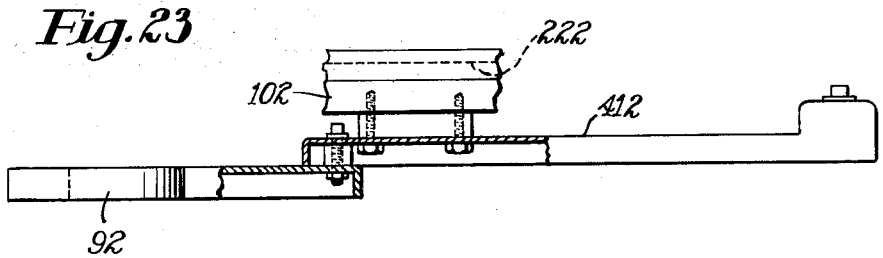

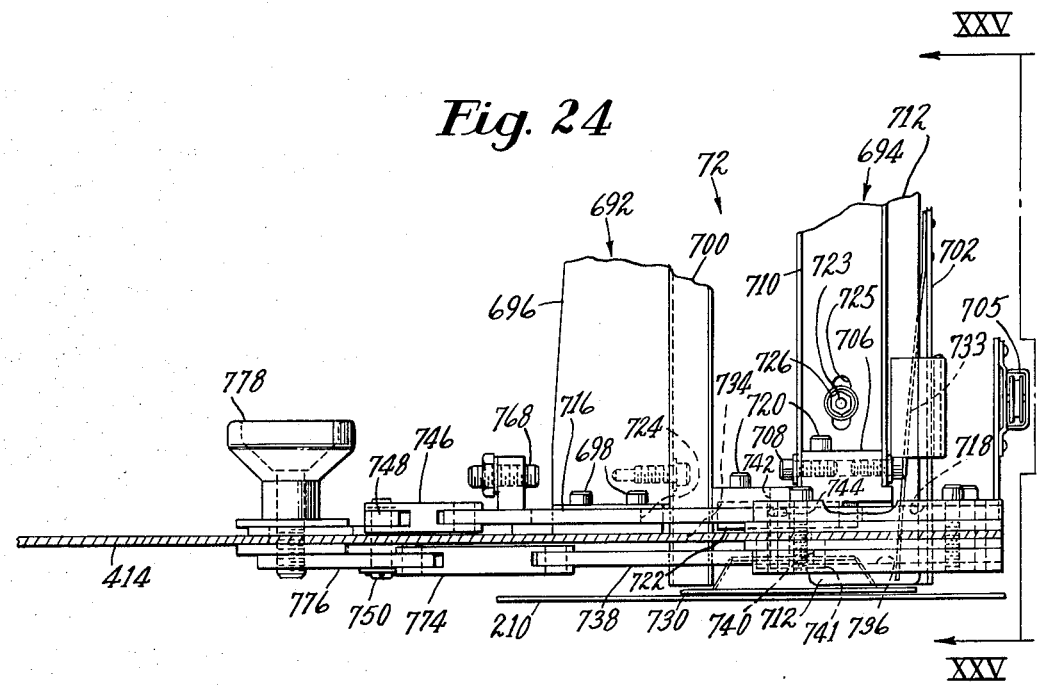

May 3, 1966  W. F. MacKENZIE ETAL  3,249,278
HEEL ATTACHING MACHINES
Filed March 24, 1964  21 Sheets-Sheet 16

United States Patent Office 3,249,278
Patented May 3, 1966

3,249,278
HEEL ATTACHING MACHINES
William F. MacKenzie, Hamilton, Donald E. Ripley, Peabody, Adelbert W. Rockwell, Jr., Gloucester, Leo F. Stanton, Newburyport, and Herbert N. MacRae, Beverly, Mass., assignors to United Shoe Machinery Corporation, Flemington, N.J., a corporation of New Jersey
Filed Mar. 24, 1964, Ser. No. 354,259
35 Claims. (Cl. 227—1)

This invention relates to machines for attaching heels to shoes, it being an object of the invention to provide an improved machine of the type disclosed in United States Letters Patent No. 3,072,913, granted January 15, 1963, on an application filed in the names of Morgan et al. The present machine is improved by a nailing die such as disclosed in an application for United States Letters Patent Serial No. 172,018, filed February 8, 1962, in the name of Andrew J. Gilbride, now Patent No. 3,144,656, and may be used quickly and effectively to attach associated rubber and base lifts, collectively constituting heels, to shoes mounted on geometrically graded lasts.

With the above object in view, the present machine is provided with an improved jack for a shoe mounted on a geometric last, improvements in a carrier unit for positioning and clamping heels and delivering them to a position adjacent to the nailing die, an improved magazine for delivering heels to the heel carrier unit, and controls for improving the timing and operation of the foregoing members and of associated nail driving and nail delivering mechanism of the machine whereby to render the machine more effective in its operation than the prior machine.

The present machine consists in the novel features hereinafter described, reference being had to the accompanying drawings which illustrate one embodiment of the invention selected for purposes of illustration, said invention being fully disclosed in the following description and claims.

In the drawings,

FIG. 4 is a plan view, taken on the line IV—IV of FIG. 2, showing a nailing die and a heel and base lift receiving magazine of the illustrative machine which, because the magazine is empty, has come to a stop with a heel positioning and clamping unit thereof located at a heel loading position;

FIG. 5 is an exploded view taken on the line V—V of FIG. 4 showing in detail one of seven driver guides or nail tubes of the machine;

FIG. 6 is a front view, partly broken away and partly in section, showing an upper portion of the machine;

FIGS. 7 and 8 show control mechanism of the machine as viewed on the lines VII—VII, VIII—VIII respectively of FIG. 6;

FIG. 9 is a view on the line IX—IX of FIG. 6, partly broken away and partly in section, showing control mechanism illustrated in FIG. 6 and also showing details of nail driver guiding and controlling mechanism of the machine;

FIG. 10 shows in side elevation, partly broken away, a jack of the machine and mechanism for operating the jack;

FIG. 11 shows, on an enlarged scale, a front elevation of a post of the jack and of work positioning mechanism associated with said post;

FIG. 12 is a view on the line XII—XII of FIG. 11 showing details of the work positioning mechanism of the jack;

FIG. 13 is a side elevation, partly broken away and partly in section, of a nail distributor of the illustrative machine, a tilt pot hopper of which is in its dash-line position when the machine is idle and is in its full-line position during a first part of the cycle of operation of the machine;

FIG. 14 is a view on the line XIV—XIV of FIG. 13 showing in front elevation the right portion of the nail distributor;

FIG. 15 is a perspective view of a shoe to which a composite heel, comprising rubber heel and base lifts, has been attached by the illustrative machine, the outsole and the heel of the finished shoe being shown in dash-outline;

Figure 2:
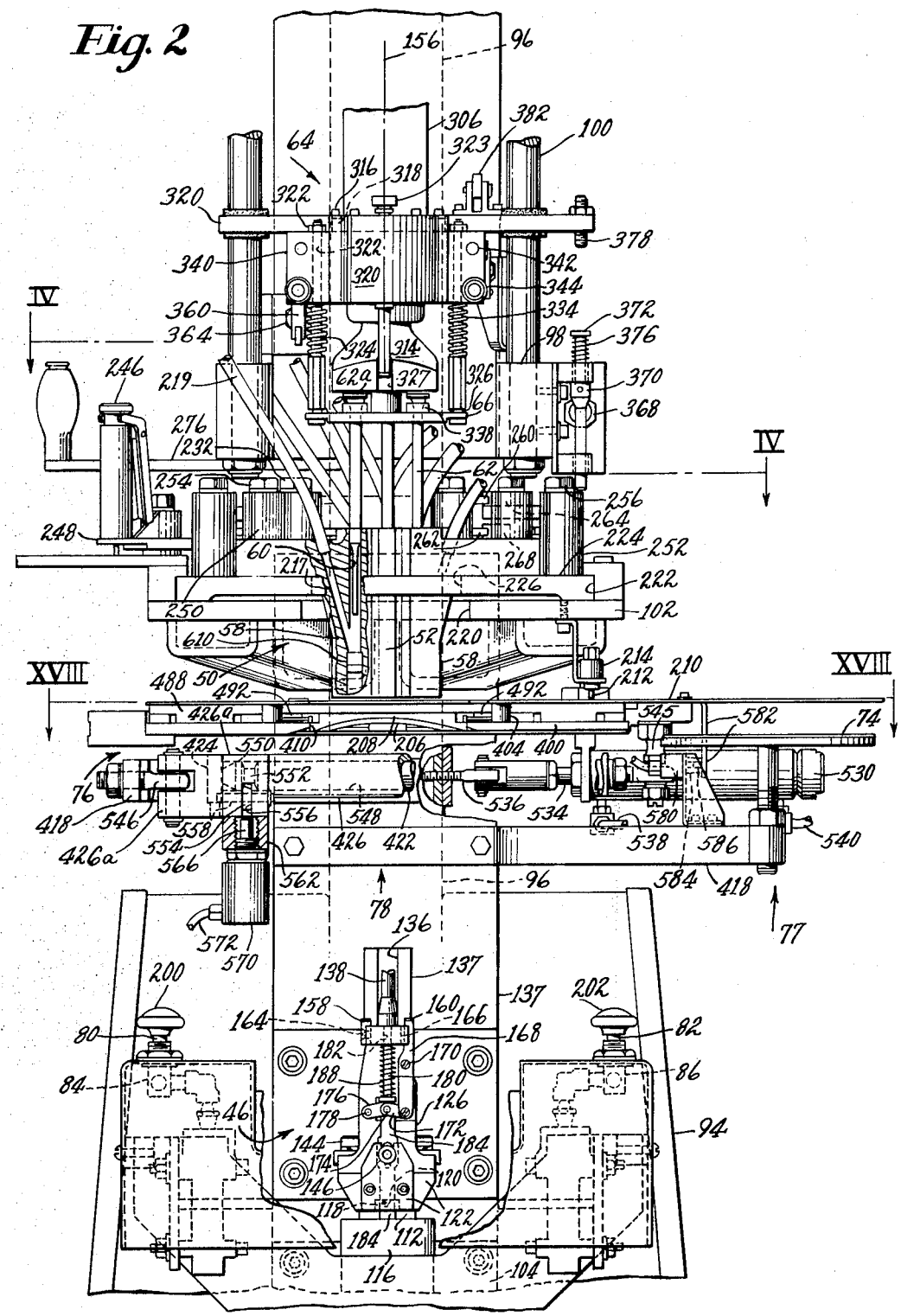
FIG. 2 is a front view, partly broken away and partly in section, of a lower portion of the machine ready to receive a shoe for the attachment of a heel thereto.
Figure 3:
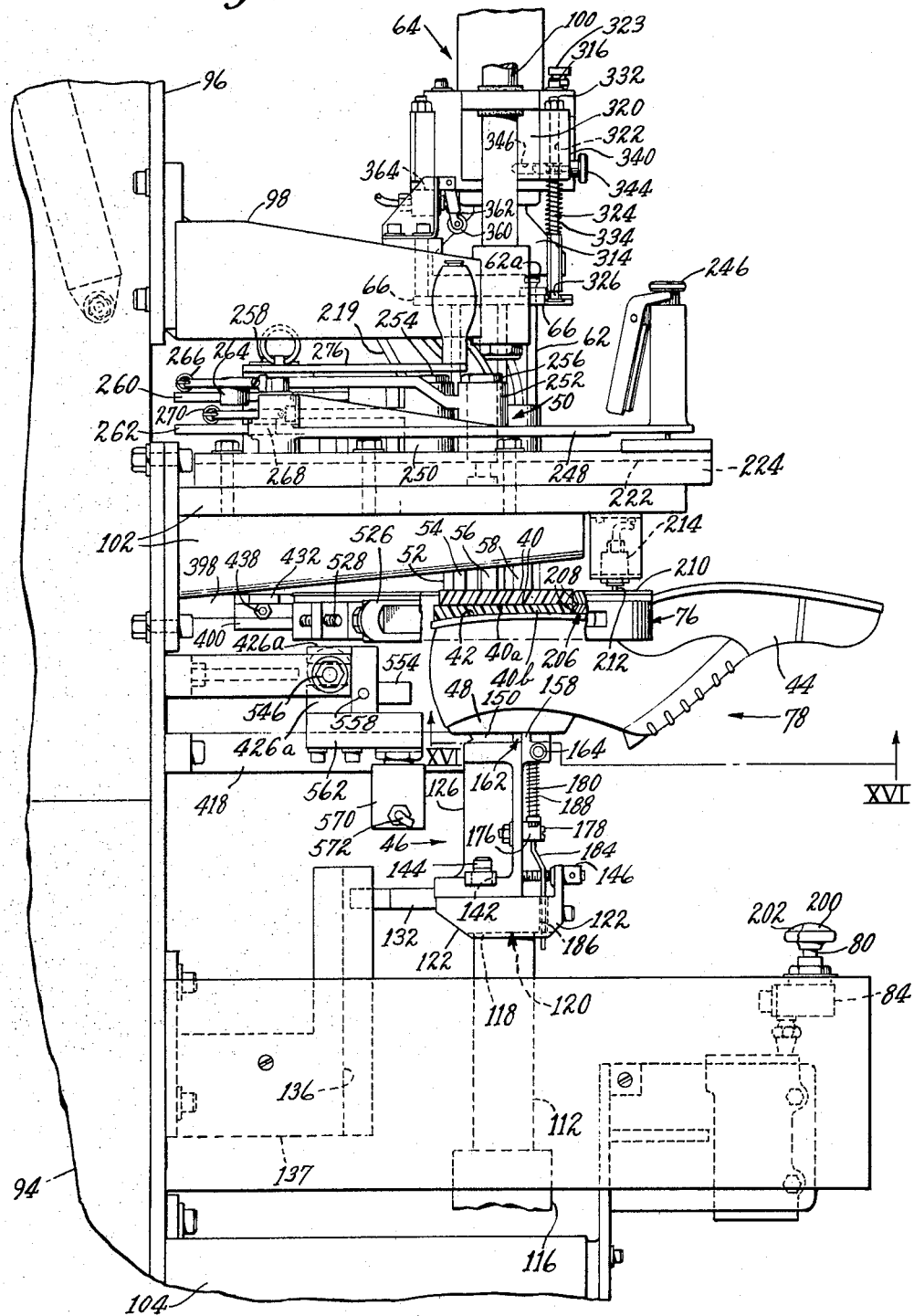
FIG. 3 shows in side elevation the portion of the machine illustrated in FIG. 2, said machine being in the process of attaching the heel to the shoe.
Figure 18:
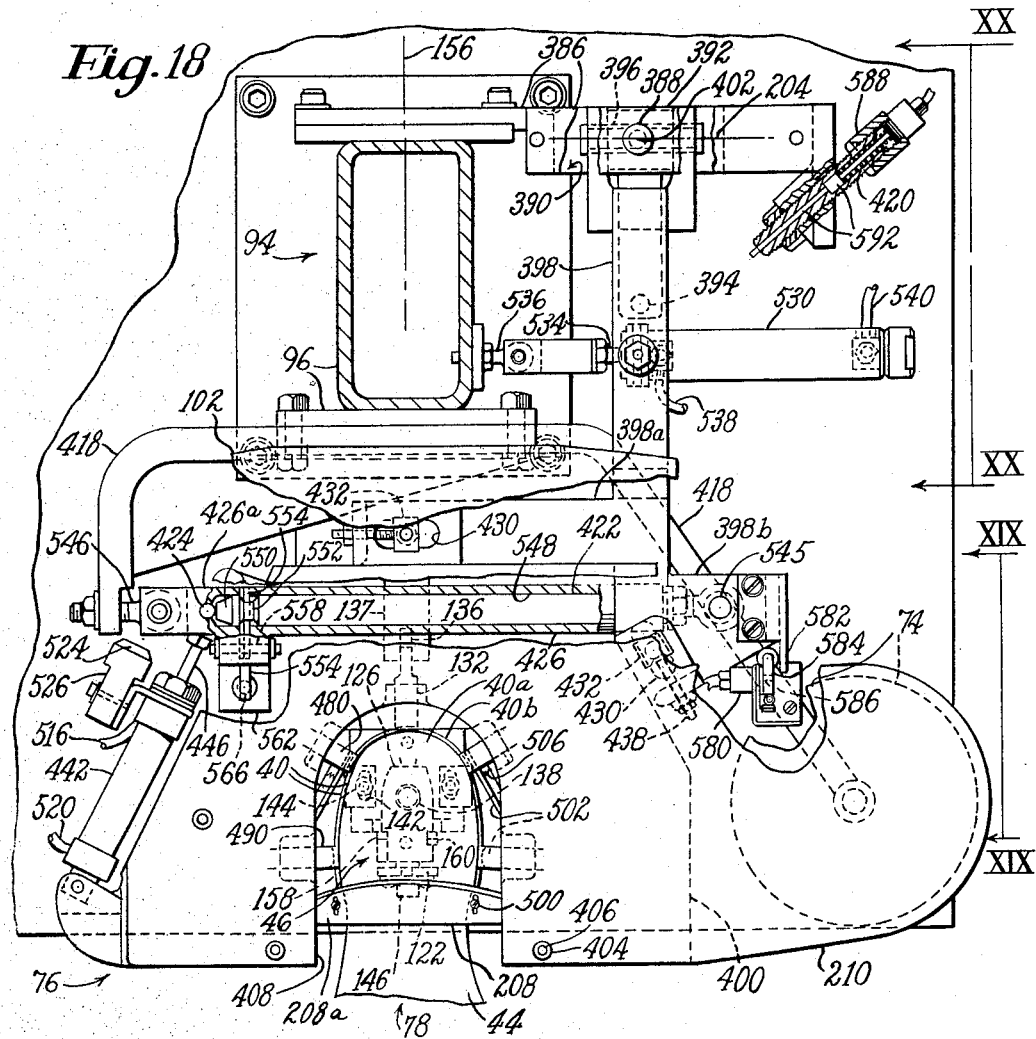
Figure 19:
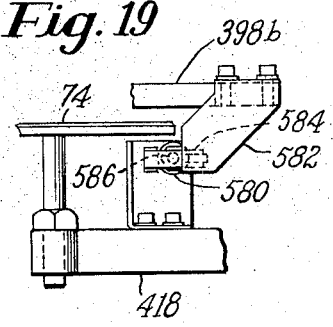
Figure 20:
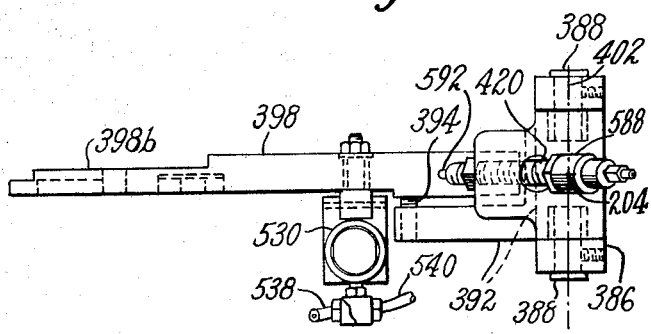
Figure 26:
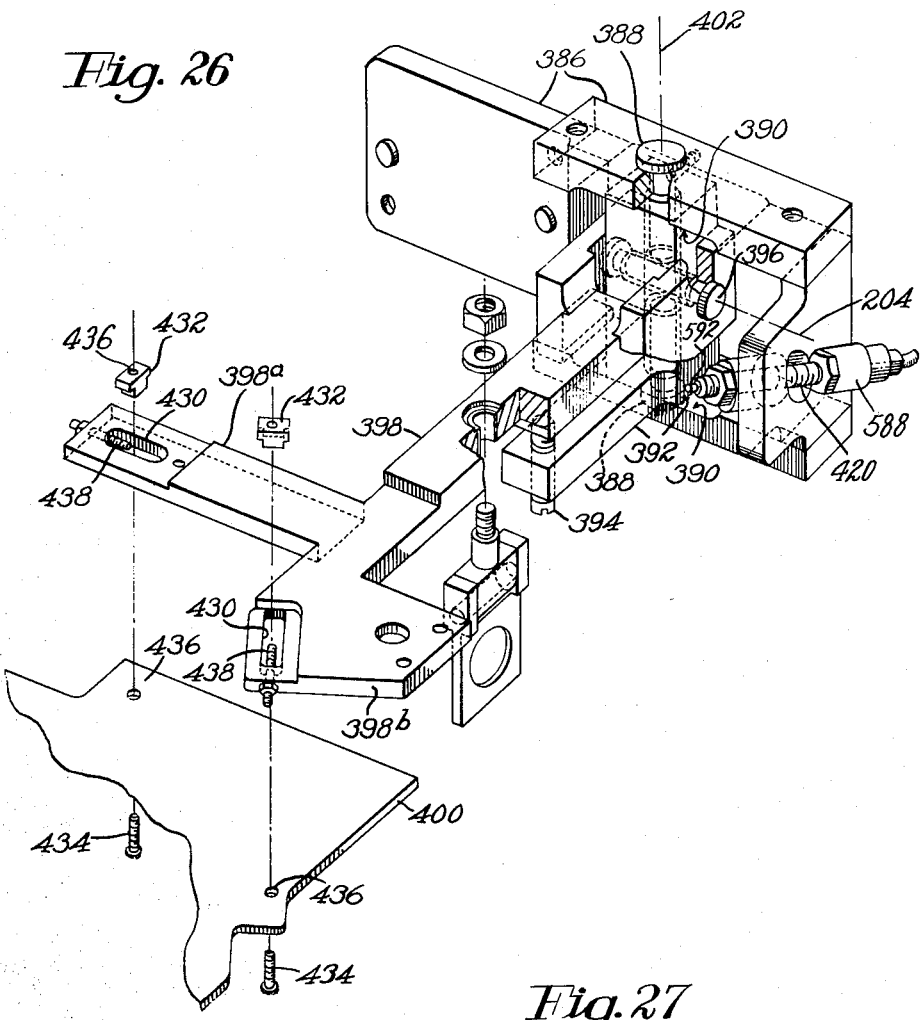
Figure 27:
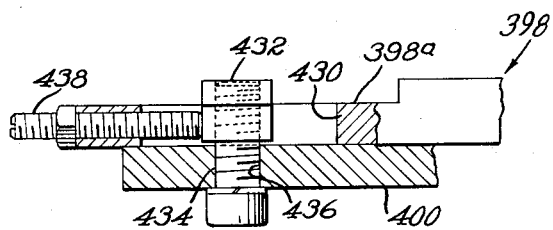
Figure 28:
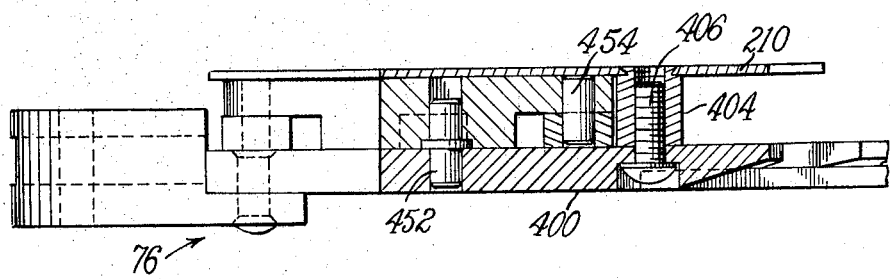
Figure 29:
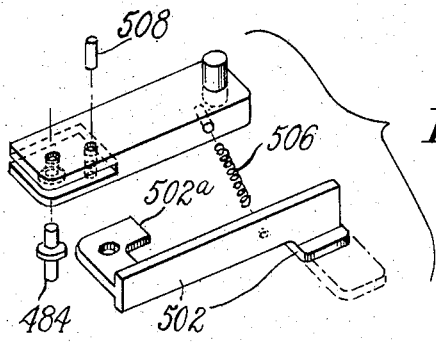
Figure 30:
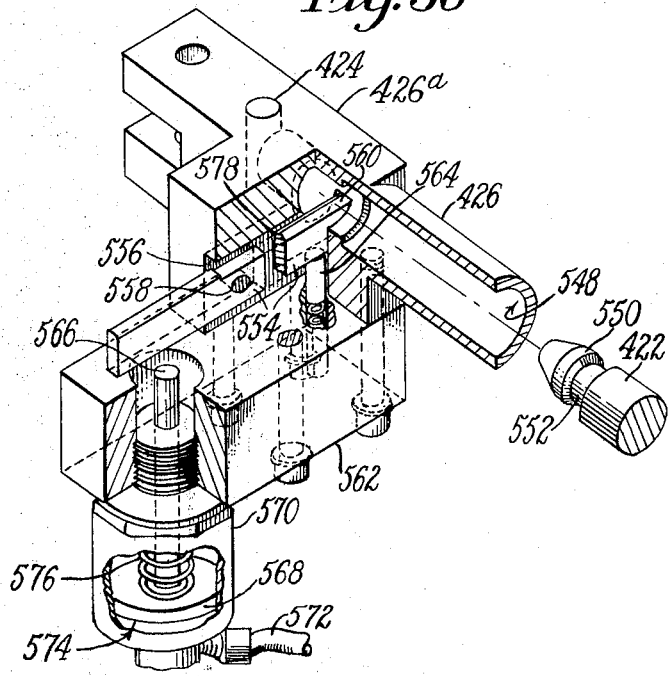
Figure 31:
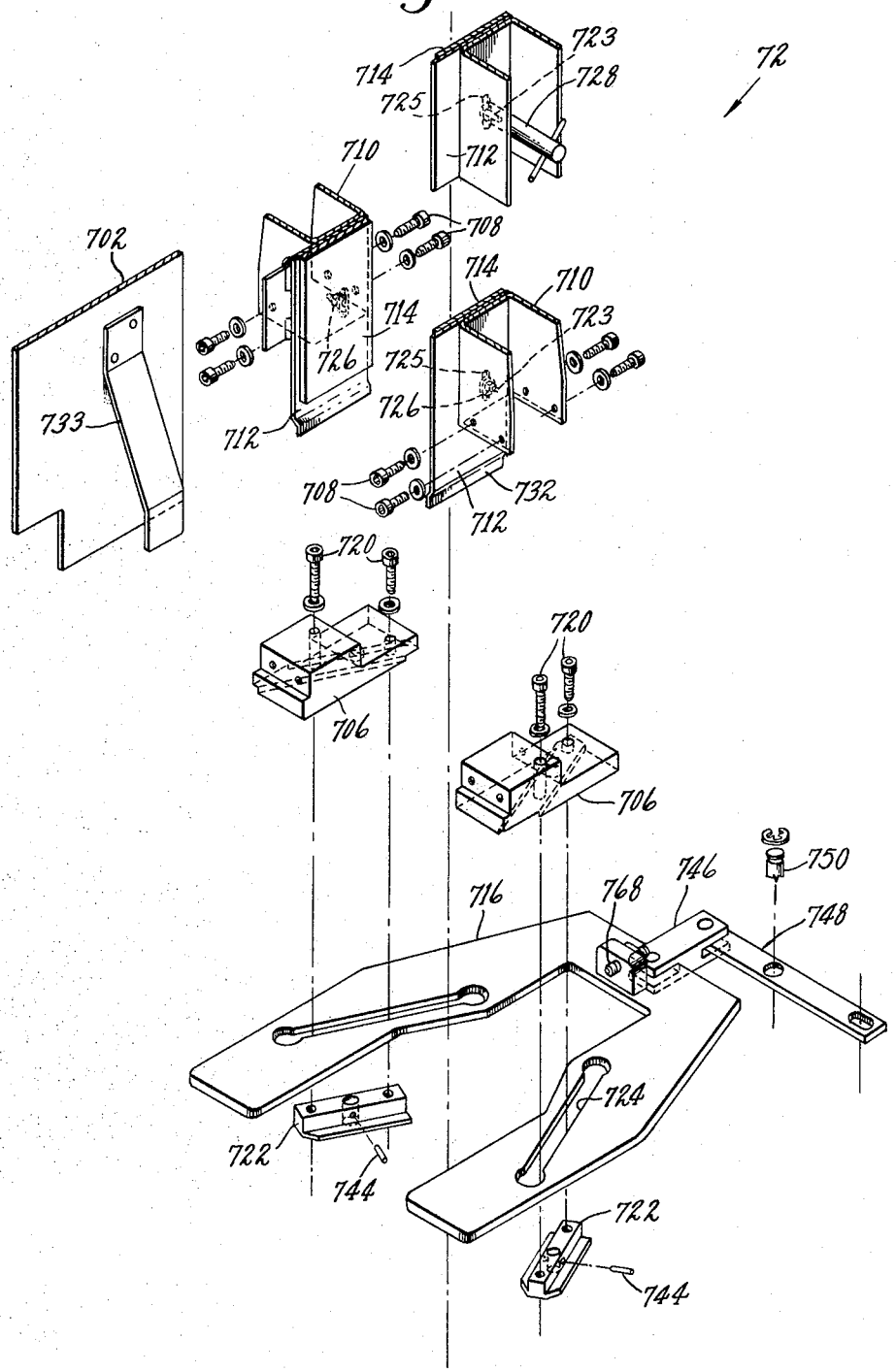
Figure 32:
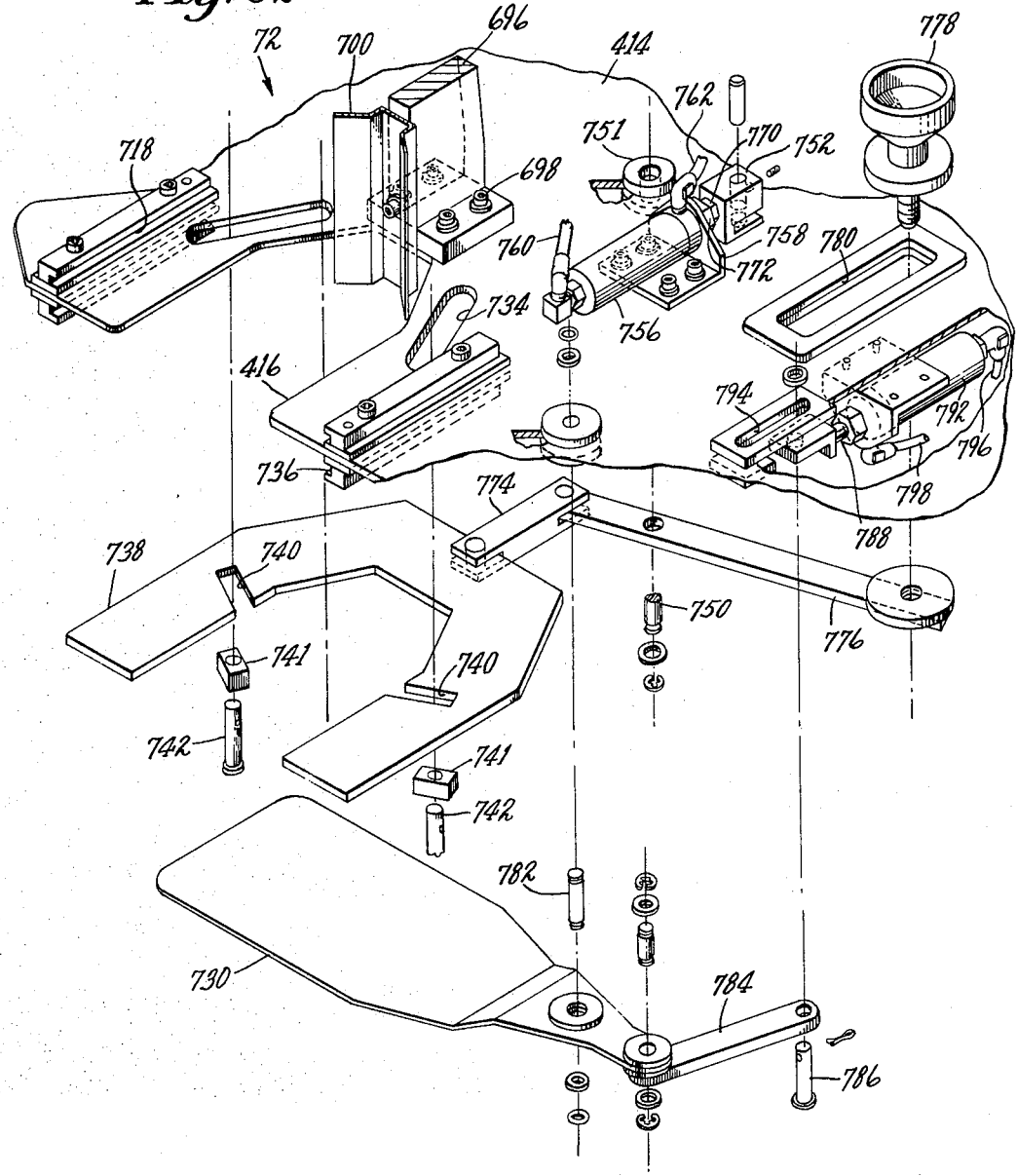
Figure 33:
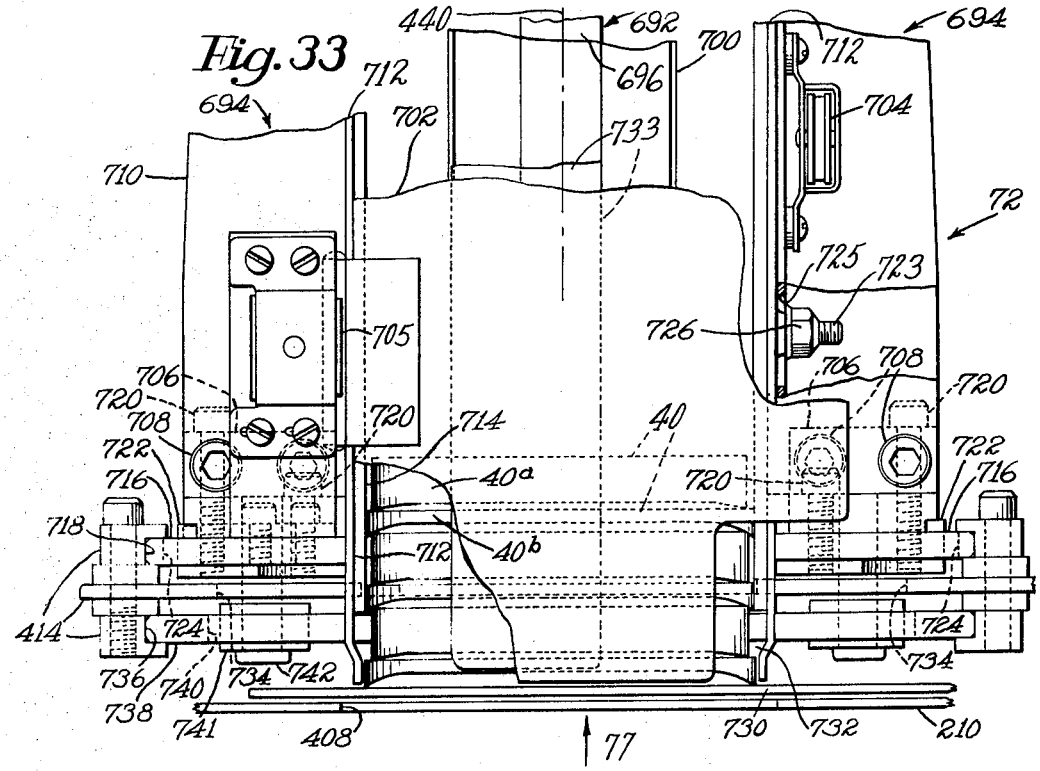
Figure 34:
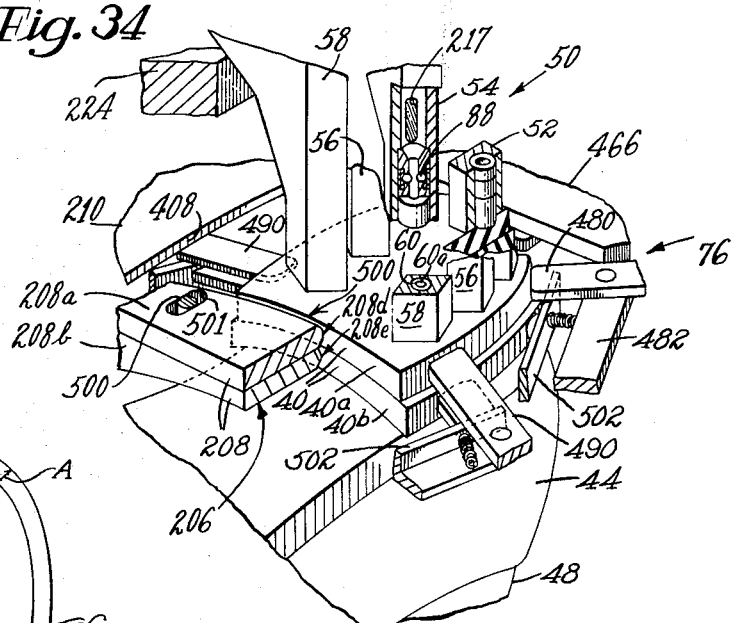
Figure 35:
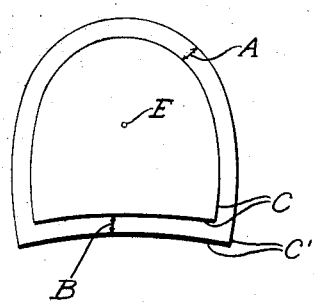
Figure 36:
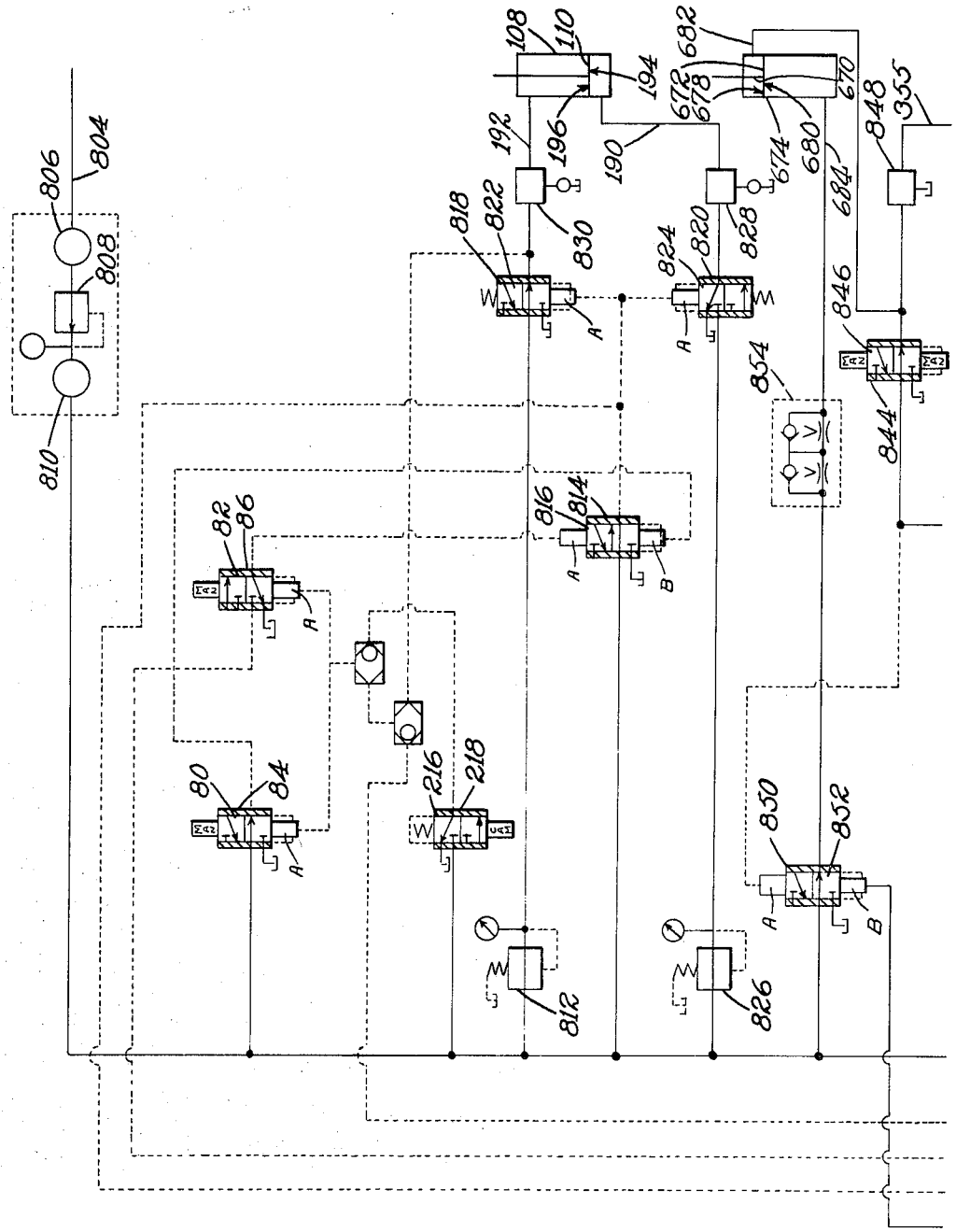
Figure 37:
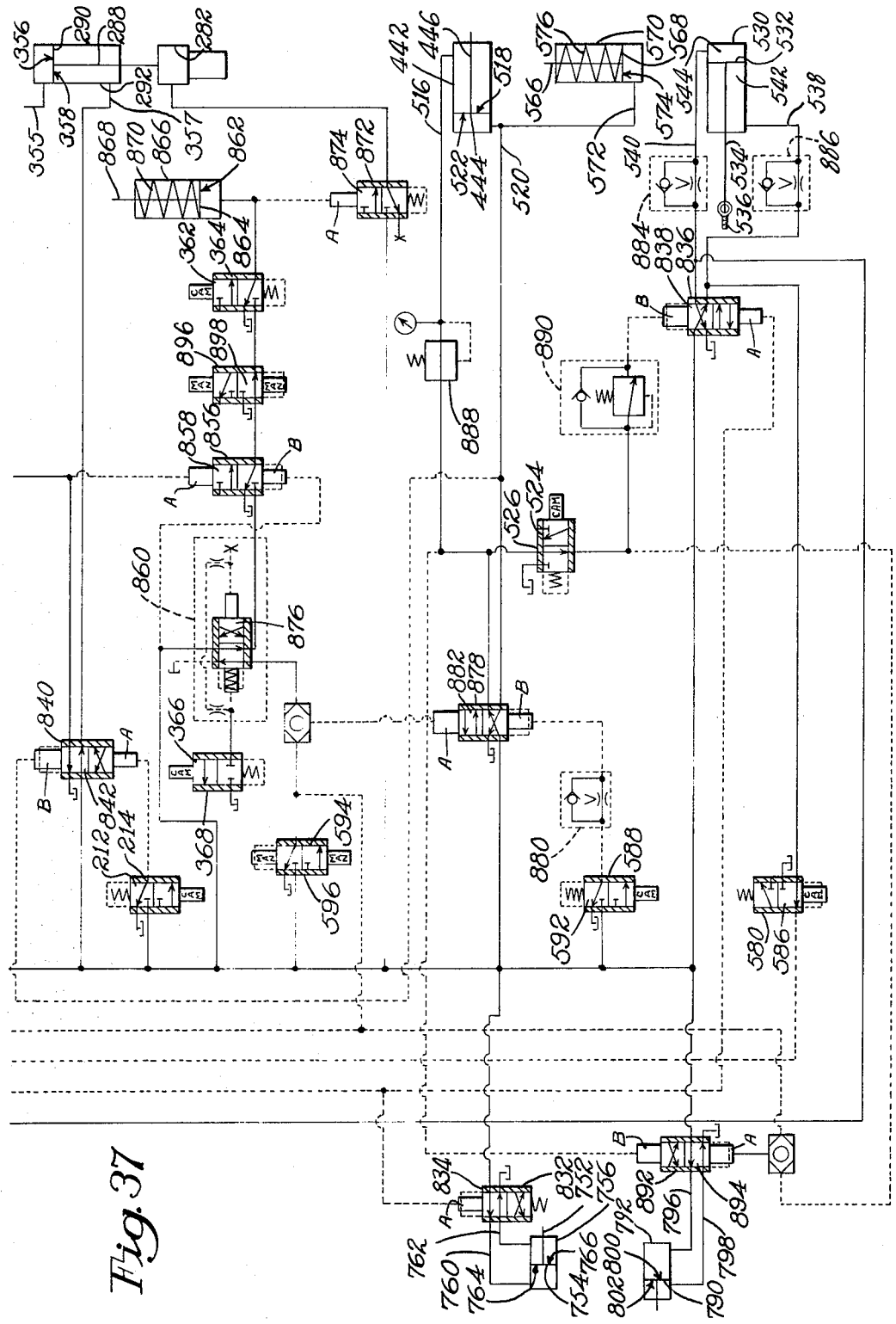

FIG. 16 is a view on the line XVI—XVI of FIG. 3 indicating the relative positions of positioning plates and the sole outlines of right and left geometrically graded lasts during the heel attaching operation, coaction between the positioning plates and the jack of the machine being such that the vertical longitudinal median planes respectively of the heel seat of right and left lasts are coincident with a fixed reference plane of the machine and of the jack;

Figure 17:
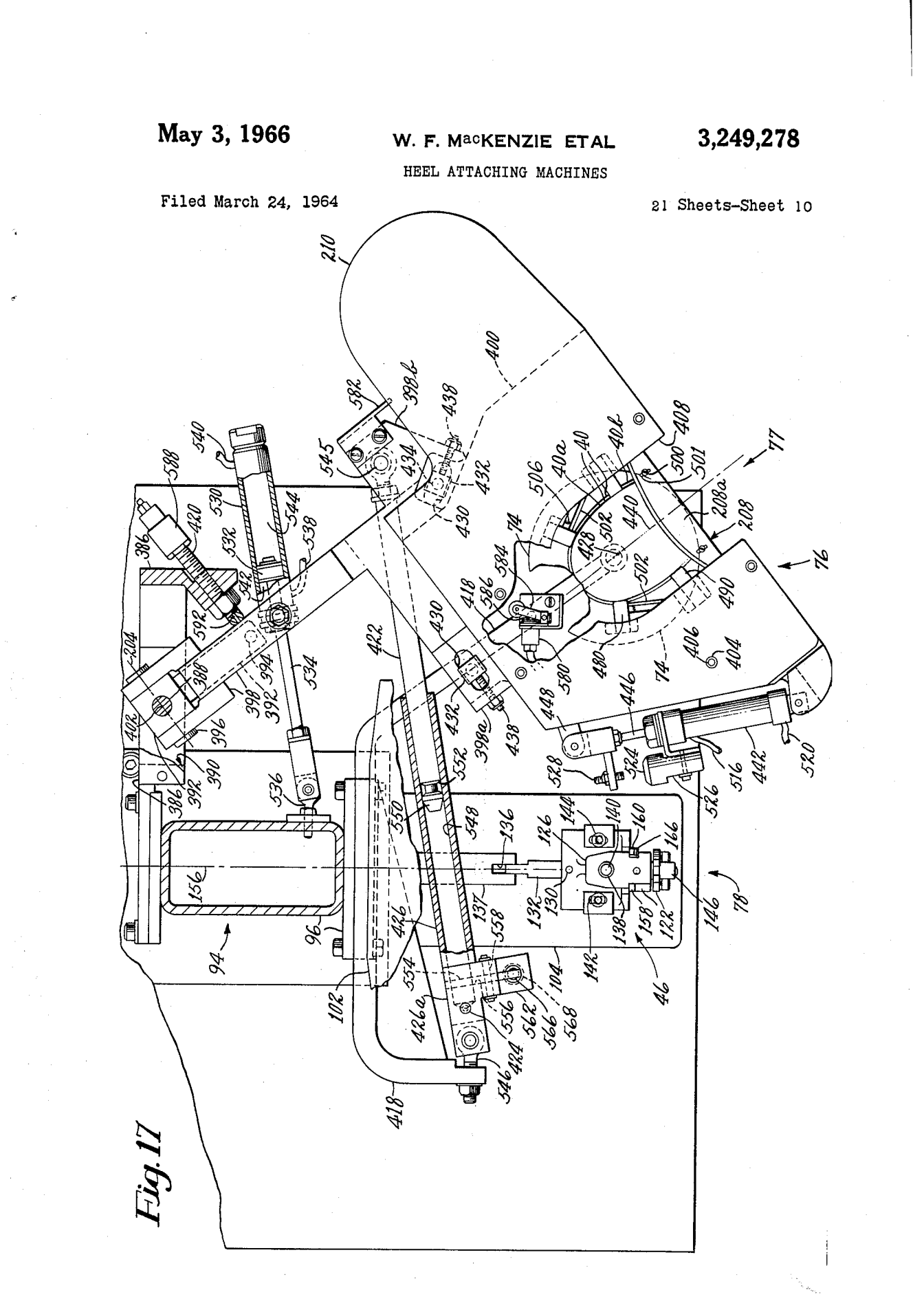

FIG. 17 is a plan view, partly broken away and partly in section, of the heel positioning and clamping unit and of mechanism for moving said unit between heel loading and heel attaching stations, at the time that the unit is at its loading station;

FIG. 18 is a plan view on the line XVIII—XVIII of FIG. 2;

FIGS. 19 and 20 are views on the lines XIX—XIX and XX—XX respectively of FIG. 18;

FIG. 21 is a view showing in plan the heel positioning and clamping unit with a cover plate thereof removed;

FIG. 22 is a view showing in plan a portion of the nailing die and also showing a heel gage which is used when heels are manually fed to the machine;

FIG. 23 is a view on the line XXIII—XXIII of FIG. 22;

FIG. 24 is a view showing a portion of the heel and base lift receiving magazine of the machine as viewed on the line XXIV—XXIV of FIG. 4;

FIG. 25 shows the portion of the magazine illustrated in FIG. 24 as viewed from the front on the line XXV—XXV of FIG. 24;

FIG. 26 shows in perspective mechanism for use in transferring the heel positioning and clamping unit of the machine between the heel loading station and the heel attaching station;

FIG. 27 is a view showing detailed means for use in adjustably securing the heel positioning and clamping unit to the mechanism illustrated in FIG. 27;

FIG. 28 is a section on the line XXVIII—XXVIII of FIG. 21;

FIG. 29 is a perspective view showing in detail base lift clamping arms and supporting means therefor which form part of the heel positioning and clamping unit shown in FIG. 21;

FIG. 30 is a perspective view, partly broken away and partly in section, of mechanism for locking the heel positioning and clamping unit in and for releasing it for movement away from the heel attaching station;

FIGS. 31 and 32 are exploded views showing in perspective the various parts which constitute the upper and lower portions respectively of the heel magazine of the machine;

FIG. 33 is an enlarged view, partly broken away, showing details of the lower end of the magazine just after it has been loaded with heel and base lifts, the lowermost base lift resting on a tray or shutter which is in an active position beneath the magazine;

FIG. 34 is a perspective view, partly broken away and partly in section illustrating the relative positions of the work, and portions of the nailing die and the heel positioning and clamping unit during the heel attaching operation;

FIG. 35 is a schematic view used in describing the characteristics of a conventional heel or heel lift adapted to be attached to the shoe by the use of the machine; and FIGS. 36 and 37 are schematic air flow diagrams for use in describing the operation of the machine.

Figure 1:
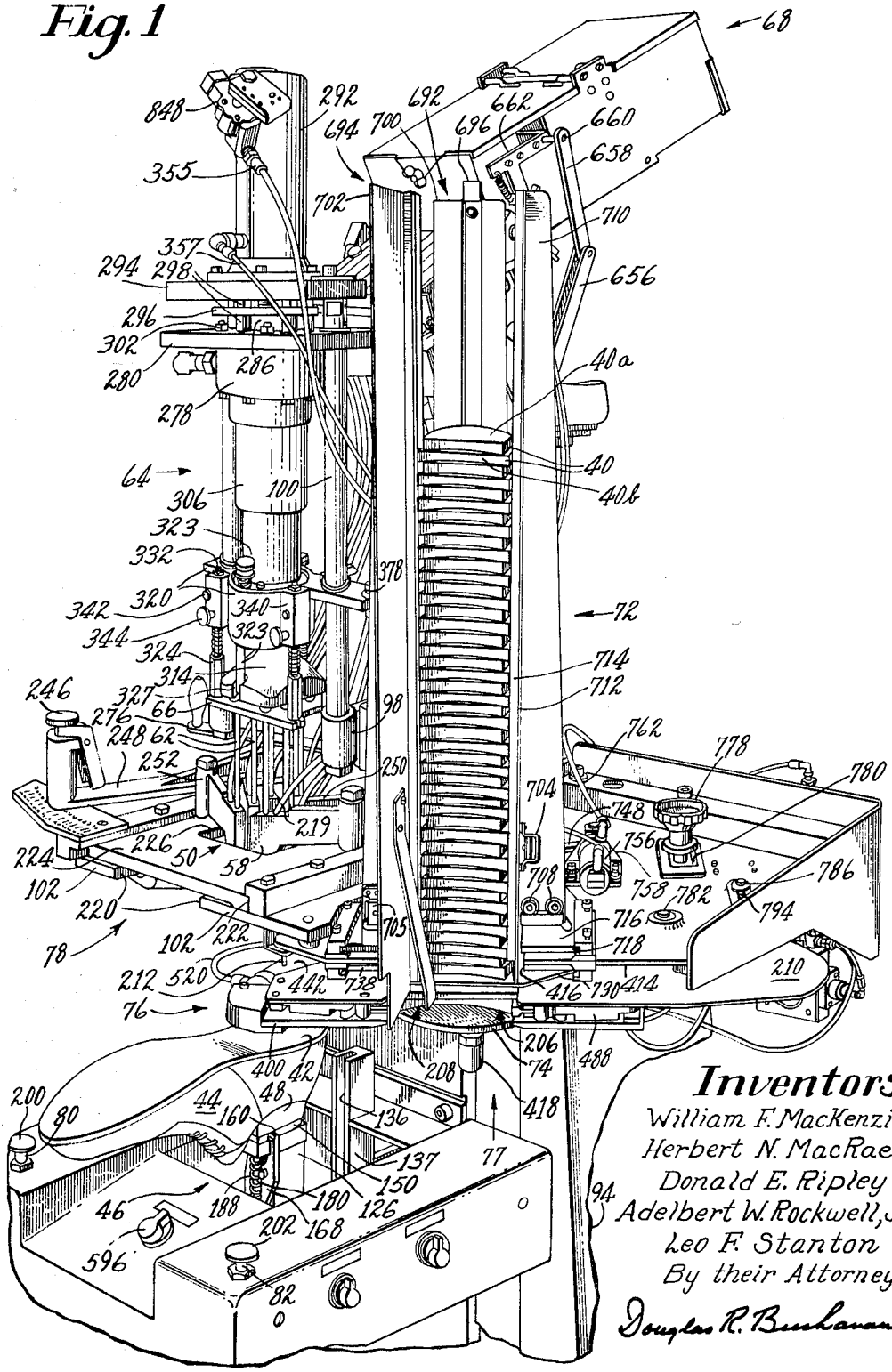
FIG. 1 is a perspective view, partly broken away, showing an improved heel attaching machine embodying the invention and as viewed from the front and the right of the machine.

The illustrative machine is described with reference to the attachment of a composite heel 40, which comprises a rubber heel lift 40a and a base lift 40b, to a heel seat portion 42 (FIGS. 1, 3 and 15) of a shoe 44, and comprises a jack 46 for supporting, upside down and heel end rearward, a geometrically graded last 48 on which the shoe is mounted, a multipart nailing die 50 comprising a rear nail driver guide or nail tube 52, and back, center, and front pairs of side nail driver guides or nail tubes 54, 56, and 58 (FIGS. 3, 4, 22 and 34) each having large and small passages 60, 60a for receiving a nail driver 62 having a head 62a, a nail driving gun 64 (FIGS. 1, 2, 3, 6 and 9) having associated with it a stripper or extractor plate 66 for operatively connecting the drivers 62 to the gun and to the nailing die 50, a nail distributor 68 (FIGS. 1, 13 and 14) for supplying nails 70 to the passages 60a of the driver guides of the nailing die, a magazine 72 from which the composite heels 40 are successively delivered to a table 74, and a heel positioning and clamping unit or carrier unit 76 which is adapted successively to position and to clamp the composite heel resting on the table 74 at a heel loading or receiving position or station 77 and to move it from said table to a heel attaching position or station 78 and just below the nailing die.

When the composite heel 40 has dropped onto the table 74 during the last part of the cycle of the machine, fluid (pneumatic) pressure operated means hereinafter described is rendered active to cause the heel carrier unit 76 to position and to clamp the heel and thereafter to transfer it to a waiting position at the heel attaching station 78. After placing the last 48 bearing the shoe on the jack 46, plungers 80 (FIGS. 1, 2, 3, 10 and 36), 82 of valves 84, 86 respectively are simultaneously moved manually from their full-line to their dash-line positions (FIG. 36) with the result that the machine, powered by fluid pressure operated means hereinafter described in detail, operates automatically through its heel attaching cycle, causing the jack 46 to be raised, first to orient the last 48 on the jack, then to force the heel seat portion 42 of the shoe 44 against the composite heel 40 arranged beneath the nailing die 50, and thereafter the composite heel to be forced against the lower ends of the nail driver guides or tubes 52, 54, 56 and 58 of the nailing die 50. As the machine continues to operate through its cycle the gun drives, by multi-impact action, nails 70, which during the last part of the previous cycle of the machine have been delivered to the passages 60a of the nailing die and rest on ball detents 88 (FIGS. 5 and 34), hereinafter described, into the heel and the heel seat portion of the shoe, said nails being clenched in said heel seat portion by reason of their being forced against a heel plate 90 (FIGS. 10 and 15) of the last 48, whereby effectively to attach the heel to the shoe.

When the heel 40 has been attached to the shoe 44, the above-mentioned fluid pressure operated means causes in succession the heel positioning and clamping unit 76 to release the heel, the jack 46 and the gun 64 to be moved to their lowered and raised starting positions respectively, the nails 70 in the nail distributor 68 to be dropped into the nailing die 50, and the heel positioning and clamping unit to be moved back to the loading station 77 over the table 74 and beneath the magazine 72, the lowermost composite heel in the magazine, dropping by gravity onto the table from which it is delivered to its waiting position at the heel attaching station 78 as above explained. If desirable, the magazine 72 and the supporting and operating means therefor may be removed from the machine, the composite heel 40, which comprises the heel and base lifts 40a and 40b, then being manually presented to the machine by the use of an L-shaped gage 92 (FIGS. 22 and 23).

The machine has a main frame 94 comprising an upstanding column portion 96 (FIGS. 2 and 3) and fixed to said column portion is a bracket 98. Secured to the bracket 98 are right and left guide rods 100 serving to guide the gun 64 vertically toward and away from the nailing die 50 which is initially adjustable as an entirety, as will be hereinafter explained, on a guide bracket 102 secured to the column portion 96 of the main frame 94.

The jack 46 and operating mechanism therefor, which will now be described with particular reference to FIGS. 10 and 11 are supported on another bracket 104 secured to the column portion 96 of the main frame. Secured by rods 106 to the bracket 104 is a cylinder 108 having a bore in which is reciprocable a piston 110 fixed to a connecting rod 112 extending upward through bores in upper and lower bearings 114 of a combined cap and cylinder sleeve 116 secured by said rods to the bracket. The upper end of the connecting rod 112 has a rectilinear rib 118 fitting in a rectilinear groove 120 formed at the bottom of a 2-part adaptor black 122 secured by a screw 124 to the connecting rod. Mounted on a rear portion of the 2-part adaptor block 122 is a jack post 126 which has formed in its lower end a slot 128 of rectangular cross section. Secured to the jack post 126 by one or more screws 130 and engaging in the slot 128 and projecting rearwardly of the jack post is a bar 132 which also fits in a rectilinear slot 134 formed in the upper end of the rear portion of the adaptor block 122 and has its rear end fitting in a vertical guide slot 136 formed in a bracket 137 secured to the column portion 96 of the main frame 94 of the machine. Secured to the jack post 126 is a last pin or spindle 138 which has an axis 140, said post having formed in its lateral lower end slots 142 through which pass screws 144 threaded into the adaptor block 122, said screws serving initially to clamp the jack post and accordingly the last pin in a desired forward or rearward position upon the adaptor block which has rotatably mounted in a bifurcated portion thereof a hand screw 146 threaded into the jack post. In order initially to locate the jack post 126 on the adaptor block 122 in the desired operating position during the setting up of the machine, the screws 144 are loosened and the hand screw 146 is turned to the desired position, the screws 144 then being tightened. The last pin or spindle 138 of the jack post 126 is adapted to receive a thimble 148 of the geometrically graded last 48 carrying the shoe, said last having secured to the flat upper end of its back cone a positioning plate 150.

The geometrically graded last 48 is described in United States Letters Patent No. 1,948,547, granted Feburary 27, 1934, on an application filed in the name of Lawrence E. Topham, and comprises the thimble 148, FIGS. 10 and 16, which has an axis 152 centered with reference to the rear half of the heel seat portion of the last, which portion is defined by the heel plate 90 of the last. When the last 48 carrying the shoe is mounted on the last spindle 138, the axes 140, 152 of the spindle and the thimble 148 are coincident. Geometrically graded lasts 48 of different sizes have the sides and rear ends of their heel seat portions spaced different distances from the axes 152 of the thimbles 148 of the lasts 48. The positioning plate 150 which, as above explained, is used in orienting the last 48 about the spindle 138 of the jack post 126 may be considered part of the last and is disclosed in detail in United States Letters Patent No. 2,806,233, granted September 17, 1957, on an application filed in the names of A. R. Hubbard et al.

In order to position right and left lasts 48, which carry shoes, upon the spindle 138 of the jack post 126 with the vertical longitudinal median planes 154 of the heel seat portions of the lasts and accordingly the shoes coincident with a fixed vertical reference plane 156 of the machine, which reference plane is also the vertical median plane of the jack 46 and of the nailing die 50, the jack post 126 has mounted on it fixed and movable lugs or clamping members 158, 160 respectively which engage shoulders 162 respectively of the positioning plate 150 of the last mounted upon the jack post spindle and are generally similar to lugs or clamping members mounted upon jacks described in United States Letters Patent No. 3,030,625, granted April 24, 1962, on an application filed in the name of Leo A. Crowell, and in United States Letters Patent No. 3,044,086, granted July 17, 1962, on an application filed in the names of Adolph A. Dorosz et al.

In order to enable the operator quickly to place the last 48 upon the spindle 138 of the jack post 126 and also to facilitate automatically placing the last upon the spindle by the use of machines, the lug 160 is moved away from the fixed lug 158 just before the jack 46 reaches its lowermost limit of movement toward its loading and unloading position. As the jack 46 is raised from its lowered position the lug 160 is moved toward the fixed lug 158 by spring action to a last orienting position in which the lugs cooperate with the shoulders 162 of the last plate 150 to orient the last 48 and accordingly the work on the last pin or spindle 138 with the vertical longitudinal median plane 154 of the heel seat portion of the last coincident with the fixed vertical reference plane 156 of the machine. A jack similar to the present jack is disclosed in an application for United States Letters Patent Serial No. 280,234, filed May 14, 1963, in the names of Leon D. Alderman et al.

The lug 158 is fixed to the jack post 126 by a screw 164 and the lug 160, which moves in a slot 166 in said post, forms the upper end of a lever 168 journaled on a fulcrum pin 170 mounted on said post. The lower end of the lever 168 is pivotally connected to a single link 172 forming part of a toggle, said link having a bore adapted to receive a pin 174 which also passes through bores in a double link 176 journaled on a shouldered fulcrum screw 178 secured to the jack post 126. The pin 174 also passes through a bore in an enlarged lower end portion of a rod 180 slidable in a cylindrical passage 182 of the jack post 126 and also passes through a bore formed at the upper end of an actuator plate 184 which extends through a slot 186 in the 2-part coupling block 122. Surrounding the rod 180 and interposed between the jack post 126 and a flange of the rod is a spring 188 which, when the jack 46 is moved away from its lowered position, constantly tends to straighten the toggle and accordingly to urge the movable lug 160 counterclockwise (FIG. 11) until, if there is no last on the jack, such movement is limited by the floor of the slot 166. When the jack 46 is in its lowered position, the lower end of the actuator plate 184 is in forced engagement with the upper end of the sleeve 116 and has moved the lever 168 and accordingly the lug 160 against the action of the spring 188 to its full-line position. After the last 48 bearing the shoe 44 has been placed on the spindle 138 and the jack 46 has been raised causing the actuator plate 184 to be moved away from the sleeve 116, the spring 188, operating through the above described mechanism, causes the movable lug 160 to be forced against one of the shoulders 162 of the positioning plate 150 of the last whereby to force the other shoulder of the plate against the fixed lug 158 in order to orient the last 48 and accordingly the shoe about the axis 140 of the spindle 138, the construction and arrangement being such that the vertical longitudinal median plane 154 of the heel seat of the last is coincident with the fixed vertical reference plane 156 of the machine. It will be appreciated that when the last 48 is oriented upon the jack post spindle 138 the shoulders 162 and accordingly the last engaging faces of the lugs 158, 160 are spaced equal distances from the vertical longitudinal median plane 154 of the heel seat of the last and from the fixed vertical reference plane 156 of the machine. Conversely, when the jack is lowered, the lower end of the actuator plate 184 engages the upper end of the sleeve 116, causing the toggle to break against the action of the spring 188 and the lever 168 to swing to its full-line position (FIG. 11).

The jack 46 is raised and lowered by alternately rendering high pressure air and air open to exhaust available for lines 190, 192 which are open to faces 194, 196 respectively of the piston 110. When the machine is at rest the face 194 of the piston 110 is in engagement with a stop face 198 of the cylinder 108, the line 190 being open to exhaust and the line 192 being open to high pressure air. When the heel and base lifts 40a and 40b to be attached to the shoe 44 have been positioned and clamped in the heel carrier unit 76 and this unit has been moved to and locked in the heel attaching station 78 beneath the nailing die 50, as will appear later, the operator places the last 48 bearing the shoe upon the jack post spindle 138, the positioning plate 150 of the last resting upon the upper horizontal face of the jack post 126 between the lugs 158, 160.

The last 48 upon which the shoe is mounted having been placed on the jack post spindle 138, the operator simultaneously depresses hand knobs 200, 202 of the above-mentioned pilot valves 84, 86 causing the plungers 80, 82 of these valves to be moved to their dash-line positions (FIG. 36) thereby causing, through fluid-pressure operated mechanism hereinafter described, air open to high and exhaust pressures to be available for the faces 194, 196 respectively of the piston 110, causing the jack 46 to be raised. As the jack 46 is raised, the actuator plate 184 moves away from the upper end of the sleeve 116 with the result that the toggle on the jack post 126 is straightened and the lug 160 is moved toward the lug 158 to orient the last 48 upon the spindle 138 of said post, as above explained. It will be appreciated that the lugs 158, 160 serve the same purpose as the lugs (130) of the jack (40) described in Patent No. 3,072,913 but facilitate the placing of the work on and removing it from the jack.

As the jack 46 continues its upward movement, the heel seat portion 42 of the outside of the shoe 44 is forced against the composite heel 40 positioned and clamped in the carrier unit 76, said heel in turn being forced against the bottoms of the nail tubes or nail driver guides 52, 54, 56 and 58 of the nailing die by reason of the fact that the unit is pivoted for swinging movement about a horizontal axis 204 (FIGS. 17, 18 and 26) hereinafter referred to. It will be understood that when the jack 46 is raised causing the heel seat portion 42 of the outsole of the shoe 44 to be forced against the composite heel 40 and the heel to be forced against the nailing die 50, the shank portion of the outsole of the shoe is forced against a concave under face 206 of a breast clamp 208 hereinafter referred to, of the heel carrier unit 76, said outsole serving to hold said unit in its tilted up position about the abovementioned axis 204 until such time as the jack is lowered.

It will be noted at this point that in the machine disclosed in Patent No. 3,072,913 the corresponding heel carrier or heel positioning and clamping unit (54) is flexed upwardly under pressure of the work. In the present machine, however, the heel carrier unit 76 as above explained, is mounted for bodily swinging movement about the axis 204 toward and away from the nailing die 50. Just before the jack 46 reaches the upward extent of its movement, a cover plate 210 of the heel carrier unit 76 moves a plunger 212 of a valve 214, which is secured to the guide bracket 102, from its full-line to its dash-line position shown in FIG. 37, thus initiating means hereinafter described for lowering the gun 64. After the composite heel 40 has been attached to the shoe 44, a plunger 216 of a valve 218 is moved from its full-line to its dash-line position (FIG. 36) causing, through fluid pressure control means hereinafter described, air under high and exhaust pressures to be available for the upper and lower faces 196, 194 respectively of the piston 110 with the result that the jack 46 is moved to its lowered starting position determined by the engagement of the piston with the stop face 198 of the cylinder 108. As above explained, just before the jack 46 reaches its lowered position the actuator plate 184 engages the upper end of the bearing sleeve 116 cauisng the lug 160 to be moved against the action of the spring 188 to its open full-line position shown in FIG. 11.

In heel attaching machines in which the spindle 138 of the post 126 of the jack 42 is moved lengthwise only of the axis 140 of the spindle, that is vertically in the illustrative construction, it will be appreciated that the passages 60a of all the driver guides or nail tubes 52, 54, 56 and 58 must be moved further away from said axis as the size of the shoe and accordingly the size of the rubber heel and base lifts increases. The driver guides or nail tubes 52, 54, 56 and 58 have formed in them bores 217 (FIGS. 2, 4, 5, 22 and 34) of suitable diameter to receive the lower ends of plastic nail tubes 219 (FIGS. 1, 2, 3, 5 and 13) which are connected at their upper ends to the nail distributor 68.

The nailing die 50, which may be effectively used with the above type of jack 46, is disclosed in said application Serial No. 172,018 and is an improvement over the nailing die discolsed in said Patent No. 3,072,913. The nailing die 50 is adjustably supported upon the guide bracket 102 secured to the upstanding column portion 96 of the main frame 94. The bracket 102 has at its forward end a U-shaped opening 220 (FIG. 22) and has formed in it undercut rectilinear guideways 222, which are equidistant from the vertical reference plane 156 of the machine, and movable in said guideways is a slide or carrier 224 provided with a central clearance opening 226. Secured by screws 228 to the slide or carrier 224 is a plate 230 having formed integral with it the rear nail driver guide or nail tube 52. Journaled on shoulder screws 232 threaded into the slide 224 are the back side nail driver guides or nail tubes 54 which bear against a flat upper face of the slide. Each of the back side nail driver guides or nail tubes 56 may be set in different operating positions in accordance with patterns corresponding to calibrated holes (not shown) in a template illustrated in said application Serial No. 172,018, by the use of headed studs 234 which are adapted to fit selectively either in a pair of bores 236, 238 formed respectively in the back side driver guides or nail tubes 54 and in the slide 224 or in bores 240, 242, formed respectively in the back side driver guides or nail tubes and in the slide. As explained in said application Serial No. 172,018, the positioning of the slide 224 lengthwise of the guideways 222 depends upon in which one of a plurality of recesses 244 (FIG. 4) a spring-pressed plunger 246 carried by a bell crank lever 248 is inserted, said lever being initially set with its rear nail driver guide or nail tube 52 in a predetermined position to accommodate the work on hand.

To accommodate shoes of graduated sizes, for example, as seen in FIGS. 4 and 22, the back, center and front pairs of side nail driver guides or nail tubes 54, 56 and 58 are swung with relation to the rear nail driver guide or nail tube 52 along fairly flat arcs toward and away from the vertical reference plane 156 of the machine, said center and front pairs of side nail driver guides or nail tubes being formed integral with bell crank levers 250, 252, respectively, which bear on the slide 224 and are journaled on shoulder screws 254, 256 secured to said slide.

Threaded into the slide 224 is a shouldered bearing screw 258 which has a vertical axis lying in the vertical reference plane 156 of the machine and is formed integral with upper and lower cams 260, 262. The bell crank levers 252 carry rolls 264 which are constantly held in forced engagement with the peripheral face of the upper cam 260 by a spring 266 oppoiste ends of which are attached to said bell crank levers. In like manner the bell crank levers 250 carry rolls 268 which are constantly held in engagement with the peripheral face of the lower cam 262 by a spring 270 having its opposite ends attached respectively to these levers.

The upper cam 260 has formed in its periphery six pairs of oppositely arranged cavities 272 which upon rotation of the cam to a predetermined position, are engaged respectively by the rolls 264 carried by bell crank levers 252 which establish the positions of the front side nail driver guides or nail tubes 58 on the slide 224. Similarly, the periphery of the lower cam 262 has formed in it six pairs of oppositely arranged cavities 274 which are engaged respectively by the rolls 268 carried by the bell crank levers 250, said cavities controlling the operating positions of the central side nail driver guides or nail tubes 56. In order initially to move the cams 260, 262 into any one of six different operating positions on the slide 224, the bearing screw 258, which is secured to the cams, has secured to it an arm 276.

By initially setting the nail tubes or driver guides 54 selectively, as above described, in either of their two operating positions on the slide or carrier 224, and by swinging the cams 260, 262 into any one of their six different operating positions on the slide, the various nail tubes or driver guides 54, 56 and 58 may be moved into predetermined positions in which the lower ends of their nail passages 60a form with the passage 60a of the rear nail tube or driver guide 52, patterns corresponding to standard nail hole patterns well known in the art.

In view of the foregoing it will be clear that when a shoe of a different size or nail hole pattern from that being operated upon is to be accommodated, the operator swings the lever 248 to its proper position whereby to move the slide 224 and accordingly the nail driver guides or nail tubes 52, 54, 56 and 58 as a unit lengthwise of the guideways 222 and parallel to the fixed vertical reference plane 156 of the machine whereby to adjust all of the driver guides or nail tubes forwardly or rearwardly with relation to the spindle 138 of the jack 46. The operator then swings the back, central and front pairs of side nail guides or nail tubes 54, 56 and 58 into their different operating positions in accordance with the particular nail pattern of the heel to be accommodated.

It will be noted that the nail drivers 62 have upper portions of relatively large diameter and lower portions of relatively small diameter adapted to fit slidingly in the large and small passages 60, 60a of the driver guides or nail tubes 52, 54, 56 and 58, the length of the lower portions of the drivers being such that before bottoming against converging walls formed between the large and small passages, they will project further below the bottoms of the associated nail passages or driver guides than is necessary to effect the deepest penetration of the work to be accommodated.

The illustrative nail driving gun 64 (FIG. 6), which is similar to the gun disclosed in said Patent No. 3,072,913, or which may be similar to any one of various well known commercial guns or riveters, has a threaded upper end onto which is screwed a sleeve 278 having mounted on it a cover plate 280, an annular chamber 282 being formed between the sleeve, the cover plate and the threaded upper portion of the gun. Arranged above the cover plate 280 are a pair of spaced washers 284, and interposed between said washers is a nut 286 having threaded into it the lower end portion of a connecting rod 288 secured to a piston 290 reciprocable in a bore of a vertically arranged cylinder 292 which is secured to a platform 294 fixed by screws 295 to the upper ends of the vertical stationary guide rods 100. The sleeve 278, the cover plate 280 and a presser plate 296 have formed in them alined bores for receiving long bolts 298, the presser plate being forced by nuts 300, which are threaded into the upper ends of the bolts, against the upper washer 284 in order securely to connect the piston rod 288 to the gun 64, lock nuts 299, 301 being employed to maintain the associated parts in their relatively clamped positions. The cover plate 280, which is independently secured to the sleeve 278 by bolt and nut connections 302 has laterally extending flanges provided with bores for receiving bearings 304 which are slidable along the guide rods 100.

The gun 64 comprises a barrel 306 having formed in it upper and lower bores 308, 310 in which an impact piston or block 312 and a hammer or jack-set 314, respectively, are reciprocable.

Secured by screws 316 and a circular plate 318 to an enlarged lower end of the barrel 306 of the gun 64 is a multipart carrier block 320 which may be considered part of the gun and is slidingly mounted for vertical movement on the rods 100 and has formed in it front and rear pairs of vertical bores 322 adapted slidingly to receive flanged rods 324 having at their lower ends slot portions 326 which interlock with slot portions 328 of the stripper or extractor plate 66 which, as will appear later, is adapted to guide and to carry the drivers 62 during different portions of the operation of the machine. The rods 324 have secured to their upper ends nuts 332, springs 334 being interposed between the carrier block 320 and flanged portions of the rod in order constantly to urge said rods and accordingly the stripper or extractor plate 66 downward until the nuts engage the carrier block. The circular plate 318 and its associated screws 316 constitute part of the multi-part carrier block 320.

Slidingly mounted in a bore 321 of the carrier block 320 is a rod 323 which is constantly urged to its raised position shown in FIG. 6 by a spring 325, upward movement of the rod being limited by the engagement of a collar portion of the rod with the bottom of the carrier block. The rod 323, which engages in a slot 327 formed in the hammer or jack set 314 and has a foot portion 323a, is adapted to insure against rotation of the hammer in the gun 64 by reason of its engagement in said slot. Preparatory to changing the nailing die 50, the drivers 62 and the extractor plate 66, as will be hereinafter explained, it is desirable to depress the rod 323 against the action of the spring 325 and to turn the foot portion 323a of the rod so that it underlies the lower face of the hammer or jack set 314 whereby to insure that the hammer will be supported while the nailing die is being changed.

As explained in application Serial No. 172,018, the nail drivers 62 associated with the gun 64 pass through slots 336 formed in the extractor or stripper plate 66, said drivers passing with clearance through bores in aluminum or nylon washers 338 which are slidingly mounted on the plate, the diameter of the washers being substantially greater than the widths of the associated slots, which are suitably shaped as best shown in FIG. 9, to enable the drivers to partake of the above-mentioned adjustment of the nail driver guides or nail tubes 52, 54, 56 and 58. The nailing die slide 224, the various nail driver guides or nail tubes and operating mechanism therefor carried by the slide, and the drivers 62 resting in the passages 60, 60a of the nail driver guides and extending through the slots 336 of the stripper plate 66, are removed as a unit from the table or guide bracket 102 when it is desired to operate on shoes of extremely large sizes, another corresponding unit being subsequently substituted for the removed unit.

It will be appreciated that in order to remove the assembled nail drivers 62 and the extractor plate 66 from the rods 324 preparatory to changing the nailing die 50, as above explained, it is desirable to swing the front rods 324 outwardly to their dash-line positions shown in FIG. 6. Accordingly, the bores 322 in which the front pair of rods 324 slide, are formed in guide housing portions 340 of the carrier block 320, said housing portions being journaled on pins 342 which are secured in the main body of the carrier block, said housing portions being held in their operating positions on the main body of the block by spring-pressed plungers 344 which are carried by said housing portions and are adapted to engage in holes 346 formed in the main body of the carrier block. It will be appreciated that as the nailing die 50 and associated drivers 52 and the stripper or extractor plate 66 are removed from the machine, the slot portions 328 of the plate will slide out of the slot portions 326 of the rear pair of rods 324.

High pressure air is delivered to the chamber 282 of the gun 64 by control means hereinafter to be described. The barrel 306 of the gun 64 has formed in it a pair of passages 348, 350 which leads from the chamber 282 of the gun to the upper bore 308 and also has a passage 352 extending from said bore to exhaust. Arranged in the chamber 282 in opposed relation to the outer ends of the passages 348, 350 is a floating annular valve 354 which is operative alternately to open one of said passages to high pressure air from the chamber and to close the other passage from the chamber and vice versa in the manner common in well known percussively driven devices of the prior art such, for example, as disclosed in United States Letters Patent No. 2,911,645, granted November 10, 1959, on an application filed in the name of William P. Crossen. As above indicated, any one of various commercial guns of this general type may be used in place of the illustrative gun.

When air under high and exhaust pressures is admitted through lines 355, 357 to chambers formed respectively by the cylinder 292 and upper and lower faces 356, 358 of the piston 290 as the result of starting the machine through its cycle and accordingly moving the plunger 212 of the valve 214 to its dash-line position FIG. 36, the gun 64 guided by the rods 100, moves vertically downward causing the carrier block 320 to swing a cam lever 360 clockwise (FIG. 7) thereby moving a plunger 362 of a pilot valve 364 supported by the bracket 98 to its dash-line position (FIG. 36) and thus causing, through means hereinafter described, high pressure air to be available for the chamber 282 of the gun 64, this condition occurring when the gun has moved downward to a position in which the lower end of the barrel 306 of the gun is in close proximity to a conical upper face portion of the hammer or jack-set 314, the lower face of the hammer at this time being in engagement with the heads 62a of the nail drivers 62 shanks of which at this time are in engagement with nails which rest in the lower passages 60a of the nail tubes or driver guides 52, 54, 56 and 58 with their pointed ends in or substantially in engagement with the composite heel 40, the drivers during their downward movement having forced the nails waiting in the passages 60a of the nail tubes or driver guides past the ball detents 88. It will be apparent that at the time air is admitted to the chamber 282 of the gun 64, the heads 62a of the drivers 62 are spaced substantial distances above the stripper or extractor plate 66 so that, as the hammer or jack-set 314 strikes the drivers, said drivers will drive the nails into the work.

When pressure has been built up in the chamber 282 of the gun 64 the impact block 312 reciprocates rapidly in the bore 308 of the gun and strikes with repeated high speed blows or impact action against the hammer or jackset 314, causing the nails then in the bores 60a of the nail tubes or driver guides 52, 54, 56 and 58 to be driven into the composite heel 40 and the heel seat of the shoe 44 mounted on the jack 46, the nails being clinched against the heel plate 90 of the last 48 carrying the shoe as the gun follows the hammer downward as fast as permitted when the nails are being driven into the work. The stripper or extractor plate preferably has at its upper central portion a cylindrical stop portion 365 which is adapted to limit downward movement of the hammer or jack-set 314 toward said plate whereby to insure that the drivers 62 shall not seat in the washers 338.

Downward driving action of the gun 64 is limited by the displacement of a plunger 366 of a valve 368, which is secured to the bracket 98, to its dash-line position shown in FIG. 36, such displacement being effected by the downward movement of a cam 370 secured to a headed rod 372 slidable in a bore 374 of the bracket 98. When the machine is idle, the cam 370 is forced against a stop face of the bracket 98 by a spring 376, the plunger 366 of the valve 368 at such time being in its full-line position (FIG. 36). Threaded into the carrier block 320 is a screw 378 which during downward movement of the gun 64 contacts the upper end of the rod 372 and which may be set in different initially adjusted positions on the block to vary the extent of downward movement of the gun. Movement of the plunger 366 of the valve 368 to its dash-line position causes, through the provision of means hereinafter described, high pressure air to be cut off from the die chamber 282 of the gun 64 with the result that reciprocation of the impact block 312 of the gun ceases and accordingly the driving of the nails into the work also ceases, the gun 64 during the completion of the cycle of the machine being elevated to its raised starting position as will be explained later.

It will be noted at this point that the right hand bracket 98 has secured to it the above-mentioned valve 218 which comprises the plunger 216 and an arm 380 operatively connected to the plunger, the block 320 having pivotally mounted on it an actuator bar 382 which because of its unbalanced weight is normally in engagement with a stop face 384 of the block. During downward movement of the gun 64 and accordingly of the carrier block 320, the actuator bar 382 engages the arm 380 of the valve 218 and swings freely counterclockwise (FIG. 8) upon said block and thereafter swings back by gravity to a horizontal position beneath the arm 380 of the valve. During upward movement of the gun 64 and accordingly of the carrier block 320 the actuator lever 382 causes the arm 380 of the valve 318 to swing clockwise (FIG. 8) with the result that the plunger 216 of the valve is moved from its full-line to its dash-line position (FIG. 36) thus resetting fluid pressure control means for the return cycle of the machine as will be hereinafter explained in detail.

The heel positioning and clamping unit 76 will now be described. As is well known in the art, when the peripheral outlines or contours C, C' (FIG. 35) of any two of a run of sizes of conventional heels or heel lifts 40a in superimposed symmetrical relation are projected on a plane as shown in FIG. 35, the distances A between corresponding points on the side and rear margins of the contours are substantially equal, the distances B between corresponding breast points of the contours being substantially equal but slightly less than a distance A. The distances A and B between the outlines of heels of successive sizes are approximately constant, in other words, when the outlines C, C' of heels or heel lifts 40a of different sizes are projected in symmetrical relation on a common plane with their vertical median planes coincident, they have a substantially common axis of symmetry E as explained in detail in said Patent No. 3,072,913.

The positioning and clamping unit 76, which may be referred to as a heel clamp or a heel carrier unit and measures and positions the heel and base lifts 40a, 40b and accordingly the composite heel 40, together with mechanism, which transfers this unit between the heel loading position or station 77 beneath the magazine 72 and the heel attaching position or station 78 above the jack 46 and below the nailing die 50, will now be directed in detail.

A bracket 386 is secured to the upstanding column portion 96 of the main frame 94 as best seen in FIGS. 17, 18, 20 and 26, on which bracket are mounted upper and lower fulcrum pins 388 extending beyond bearing faces 390 of the bracket and into bearing bores of a swivel block 392, upper and lower faces of which engage said bearing faces, respectively, and which has a forwardly projecting supporting flange portion into which is threaded a supporting screw 394. Fulcrumed on a bearing pin 396 mounted on the swivel block 392 is a bifurcated portion of a transfer arm 398 a lower face of which normally bears against the supporting screw 394 which is threaded into the projecting flange of said block. With the above arrangement it will be apparent that the transfer arm 398 which, as will appear later, has a locator or base plate 400 of the heel positioning and clamping unit 76 adjustably secured to it, is mounted for movement about a vertical axis 402 (FIG. 26) of the fulcrum pins 388 to carry this unit between the heel loading position or station 77 and the heel attaching position or station 78 and is also mounted for movement about the above-mentioned axis 204 of the bearing pin 396 in order to allow the unit to be tilted vertically as an entirety during the heel attaching operation toward and away from the nailing die 50 without straining the parts of the machine. It will be noted at this point that the transfer arm 398 comprises laterally extending platform portions 398a, 398b.

The positioning and clamping unit 76 comprises the locator or base plate 400 and the above-mentioned cover plate 210, which has press-fitted into it flanged coupling studs 404, secured to the locator or base plate by screws 406 as best shown in FIG. 28. The cover and base plates 210, 400 have formed in them vertically registering U-shaped openings 408 (FIGS. 17, 18, 22 and 34), 410 (FIGS. 2 and 21) adapted to provide clearance space for the associated heel and base lifts 40a, 40b which are placed manually upon the cover plate 210 and against the annular or L-shaped heel gage 92 mounted on a platform 412 (FIG. 22) or are released from the magazine 72, which is secured to a platform 414, hereinafter described. As will appear later, when the heel positioning and clamping unit 76 arrives at the heel loading station 77, the heel and base lifts 40a, 40b drop through a U-shaped opening 416 (FIGS. 1, 4 and 25) of the platform 414 and through the U-shaped openings 408, 410 respectively in the cover plate 210 and the base plate 400 onto the fixed table 74 which is secured to a bracket 418 bolted to the upstanding column portion 96 of the main frame 94.

The positioning and clamping unit 76 is rotated about the axis 402 of the fulcrum pins 388 to move the associated heel and base lifts 40a, 40b positioned upon and clamped in said unit from the heel loading station 77 over the table 74 to the heel attaching station 78 below the nailing die 50. Movement of the heel positioning and clamping unit 76 toward the heel loading station 77 is limited by the engagement of the transfer arm 398 with a stop screw 420 which is adjustable on the bracket 386, and movement of said unit toward the heel attaching station 78 is limited by the engagement of a locking rod 422, which will be hereinafter referred to and is operatively connected to said arm, with a stop pin 424 mounted on a sleeve 426 hereinafter described.

The base or locator plate 400 underlies the platform portions 398a, 398b of the arm 398, said base plate and accordingly the heel positioning and clamping unit 76 being initially adjustable upon said arm substantially about a vertical reference axis 428 of the unit which axis is coincident with the axis of symmetry of heels positioned in the unit. In order initially to move the heel positioning and clamping unit 76 substantially about the vertical reference axis 428 into different adjusted positions upon the transfer arm 398, each of the platform portions 398a, 398b of said arm is provided with a slot 430 adapted fittingly to receive a block 432 having flanges overlying the upper adjacent face of the associated platform portion and having a bore into which is threaded a screw 434 fitting in a bore 436 of the base or locator plate 400, the construction and arrangement being such that the heel positioning and clamping unit 76 may be initially adjusted with relation to the arm 398 substantially about its reference axis 428. In initially adjusting the heel positioning and clamping unit 76 on the arm 398 the screws 434 are loosened and screws 438, which are threaded into the platform portions 398a, 398b respectively of the arm and are adapted to engage the blocks 432, are adjusted to move said unit to the desired position in which a vertical median plane 440 of the unit, which plane includes the axis 428, shall be coincident with the vertical reference plane 156 of the machine when said unit has been swung to the heel attaching position or station 78. After the proper adjustment has been effected the screws 434 are finally tightened and the screws 438 are moved firmly against the blocks 432.

Pivotally connected to the base or locator plate 400 is a cylinder 442 having a bore in which is slidable a piston 444 (FIGS. 21 and 37) having secured to it a rod 446 journaled to the left end (FIG. 21) of a lever 448 pivotally mounted on a bearing stud 450 secured to the base plate. The bearing stud 450 and the various other bearing studs of the heel positioning and clamping units 76 are generally similar to bearing studs 452 hereinafter referred to and shown in detail in FIG. 28 and the various links and levers of the unit are pivotally connected by the use of fulcrum pins such for example as the fulcrum pin 454 shown in FIG. 28. Journaled on a bearing stud 456 secured to the base plate 400 is a lever 458 operatively connected to the lever 448 through a link 460. The levers 448 and 458 have pivotally connected to them links 462, 464 and mounted on and extending between these links is a rear heel clamp or gage 466. The left end of the rear clamp 466 is journaled on a fulcrum pin 468 and the right end of the rear gage has secured to it a stud 470 which extends through an elongated slot 472 formed in the link 464, a spring-pressed plunger 474 slidable in a bore of the link normally maintaining the stud in engagement with the forward end of the slot. When the rear clamp 466 is forced with substantial pressure against the rear end of the heel lift 40a it pivots about the fulcrum pin 468 against the action of the spring-pressed plunger 474.

The forward ends of the links 462, 464 are pivotally connected to levers 476 journaled on bearing studs 478 secured to the base plate 400 and pivotally connected to these levers are right and left side clamps 480 which are pivotally connected to carrier arms 482 journaled on bearing studs 484 secured to the base plate. The levers 476 are operatively connected by links 486 and the above-mentioned fulcrum pins 454 to T-shaped levers 488 journaled on the above-mentioned bearing studs 452 secured to the base plate 400. Operatively connected to the T-shaped levers 488 are side clamps 490 which are pivotally connected to arms 492 journaled on bearing studs 494 secured to the base plate 400, said levers also being operatively connected by links 496 to the breast clamp 208.

The heel breast clamp 208 (FIG. 34) comprises upper and lower portions 208a, 208b, having convex rear faces 208d, 208e respectively adapted to engage the breasts of the heel and base lifts 40a, 40b. The lower portion 208b of the breast clamp 208 has threaded into it screws 500 which pass through slots 501 formed in the upper portion 208a of the breast clamp, said screw and slot connections providing means for initially adjusting the lower portion 208b of the breast clamp with relation to the upper portion of the clamp. In the normal use of the machine the rear faces 208d, 208e of the upper and lower portions of the breast clamp are vertically alined so that the breast faces of the heel and base lifts 40a, 40b positioned and clamped in the carrier unit 76 shall be substantially flush with each other whereby to reduce the subsequent heel breast scouring operation to a minimum.

The rear clamp 466 and each of the side clamps 480, 490 have associated with them base lift clamping or presser arms 502 which correspond in function to the leaf springs (368) disclosed in said Patent No. 3,072,913. The clamping arms 502 are journaled respectively on the bearing studs 484, 494 and on a fulcrum pin 504 carried by the rear clamp 466 and, when the heel positioning and clamping unit 76 is empty, are urged by compression springs 506 to positions in which they project slightly beyond their associated clamps, movement of the clamping arms under the action of the springs being limited by the engagement of flanges 502a of said arms with stop pins 508 secured to the rear clamp 466 and to the arms 482, 492. The arms 502 are adapted to engage the base lift 40b, which rests upon the table 74, just before the associated rear clamp 466 and the side clamps 480, 490 engage the heel lift 40a, the base lift engaging arms yielding against action of the springs 506 to insure that said arms shall not interfere with the proper positioning of the heel lift in the heel positioning and clamping unit 76.

In the illustrative construction the side clamps 490 are yieldingly connected to their associated T-shaped levers 488 and accordingly each of these clamps has formed in it a slot 510 through which passes a stud 512 secured to an associated T-shaped lever, each of the side clamps carrying a spring-pressed plunger 514 serving normally to retain the stud in engagement with an outer end of the slot.

As the piston rod 446 moves forward as the result of high pressure air being available through a line 516 (FIGS. 17, 18, 21 and 37) for a face 518 of the piston 444 and exhaust air being available through a line 520 for a face 522 of the piston, the breast and rear clamps 208, 466 together with the side clamps 480, 490 and the associated clamping arms 502 move in converging paths to position and to clamp the heel lift 40a and the base lift 40b which have been supported upon the table 74 to which they have been delivered, as above explained. The upper portions 208a of the breast clamp 208 and the side clamps 480 positively engage the heel lift 40b to position and clamp it in the carrier unit 76, and the rear clamp 466 and the side clamps 490, which are yieldingly urged against the heel lift 40a, assist the upper portion 208a of the breast clamp 208 and the side clamps 480 in the positioning and clamping of the heel lift. The base lift clamping arms 502 and the lower portion 208b of the breast gage 208 cooperate to position the base lift 40b in the carrier unit 76.

The construction and arrangement of the side clamps 480 and the breast clamp 208 are such that they open and close at the proper ratio to cause a conventional heel or heel lift clamped therein to have its vertical median plane coincident with the vertical median plane 440 of the heel positioning and clamping unit 76, and to cause the axis of symmetry of the heel to be coincident with the vertical reference axis 428 of the unit. As above explained, the breast clamp 208 commonly moves the breasts of the heel and base lifts 40a, 40b into substantial alinement, the base lift which is usually slightly larger than the heel lift, projecting a substantially uniform distance beyond the side and rear faces of the heel lift. In view of the fact that the amount of material that can be removed from the base lift 40b during the trimming operation is not critical, the clamping arms 502 are quite satisfactory for positioning the base lift in the heel positioning and clamping unit 76.

It is desirable to insure against the machine operating through a cycle when there is no work, which may be a heel lift 40a and a base lift 40b or just a heel lift then referred to as a heel, in the heel positioning and clamping unit 76. Accordingly, a plunger 524 of a cutoff valve 526 secured to the clamp cylinder 442 is actuated by a striker screw 528 which is adjustably secured to the piston rod 446 and corresponds to the screw (578) shown in Patent No. 3,027,913, when said rod is moved generally forward (FIG. 21) a distance greater than the required to clamp the smallest heel lift 40a to be accommodated.

When the heel and base lifts 40a, 40b on the table 74 have been positioned and clamped in the carrier unit 76, this unit is swung about the fulcrum pins 388, which are mounted in the bracket 386, into a position in which the vertical median plane of the heel and accordingly the vertical median plane 440 of the carrier unit coincide with the vertical reference plane 156 of the machine, this relation being controlled, as above explained, by the engagement of the end of the locking rod 422 with the stop pin 424 carried by the sleeve 426.

In order to effect swinging movement of the heel positioning and clamping or carrier unit 76 between the loading station 77 and the heel attaching station 78, the transfer arm 398 has pivotally mounted on it a cylinder 530 (FIGS. 2, 17, 18, 20 and 37) provided with a bore in which a piston 532 is housed. The piston 532 has secured to it a connecting rod 534 operatively connected to a coupling 536 secured to the column portion 96 of the main frame 94. High pressure air and air open to exhaust is made available alternately through lines 538, 540 for chambers 542, 544 respectively formed by the cylinder 530 and the piston to cause the heel carrier unit 76 to be transferred between its loading station 77 established by the engagement of the transfer arm 398 with the screw 420 and its heel attaching station 77 determined by the engagement of the locking rod 422 with the stop pin 424 as above explained.

When the heel carrier unit 76 has been moved to the heel attaching station 78 the axis of symmetry of the heel lift 40a positioned and clamped in said unit lies in the fixed vertical reference plane 156 of the machine and is arranged parallel to and is spaced slightly from the axis 140 of the spindle 138 of the jack post 126, the distance between the axis of symmetry of the heel lift and the spindle axis at all times being constant irrespective of the size of the heel or heel lift. It will thus be apparent that the heel carrier unit 76 is adapted automatically to locate heels of different sizes beneath the nailing die 50 in positions in which the vertical projections of the outlines of these heels on the planes of the feather lines respectively of the shoes carried by the lasts positioned upon the jack will lie a substantially constant distance outside said feather lines.

It is desirable that the heel positioning and clamping unit 76 be locked at the heel attaching station 78 in order to insure that pressure exerted by the shoe, which is mounted on the jack 46, against the heel and the unit shall not move this unit away from said station. Accordingly, the platform portion 398b of the transfer arm 398 has secured to it a coupling pin 545, an eccentric spherical lower portion of which is universally connected to an outer end of the locking rod 422. Secured to the table supporting bracket 418 is a coupling 546 universally connected to a housing portion 426a of the above-mentioned sleeve 426, said sleeve having a bore 548 in which the locking rod 422 fits slidingly. As best shown in FIG. 30, the locking rod 422 is provided with a frusto conical knob 550 which as above explained engages the stop 424 in the sleeve housing 426a to establish the heel attaching position of the heel carrier unit 76, a laterally beveled circumferential groove 552 of the rod 422 at this time being arranged opposite a detent 554 which is movable in a slot 556 of the sleeve housing 426a and is fulcrumed on a pin 558 secured to said housing and which has a bevel face 560, said detent serving, as will be hereinafter explained, to insure against movement of the heel carrier unit 76 away from the heel attaching station 78 during the attachment of the heel to the shoe.

Secured to the housing portion 426a of the sleeve 426 is a block 562, a spring-pressed plunger 564, which is mounted in a bore of said block, serving constantly to urge the detent 554 counterclockwise to an inactive position in engagement with an upper end of the slot 556. As will appear later, except for a short period when the detent 554 is being removed from the groove 552 of the locking rod 422 and the heel carrier unit 76 is being moved back to the heel loading station 77, the detent is free to move under the action of the spring-pressed plunger 564 to its inactive position. When, during the cycle of the machine, the heel has been attached to the shoe and the heel positioning and clamping unit 76 is about to be moved to the heel loading station 77, a rod 566 secured to a piston 568 movable in a bore of a transfer release cylinder 570 is raised by the admission, through a line 572, of high pressure air to a face 574 of the piston, which operates against the action of a spring 576, to move the detent 554 clockwise (FIG. 30) and out of the circular groove 552 of the rod 422, said detent being held in this position until the rod has moved in the sleeve 426 well toward its retracted position shown in FIG. 17, the line 572 then being opened to exhaust pressure, as will be hereinafter explained, with the result that the piston rod 566 is moved to its lowered or retracted position under spring action, the detent 554 swinging under the action of the spring-pressed plunger 564 to its idle position against the upper end of the slot 556.

When the heel positioning and clamping unit 76 is being moved to the heel attaching station 78 the bevel face 560 of the detent 554 is engaged by the frusto conical knob 550 of the locking rod 422 with the result that the detent is cammed downward against the action of the spring-pressed plunger 564 and when the locking rod engages the stop pin 424 the detent swings into the groove 552 of the locking rod, a bevel face 578 of the detent then engaging a bevel side face of the groove of the locking rod to retain said rod and accordingly the heel positioning and clamping unit 76 against movement.

The control mechanism of the machine comprises a valve 580 (FIGS. 2, 17, 18, 19 and 37) which is secured to the table supporting bracket 418. When the heel positioning and clamping unit 76 is at the heel attaching station 78 a striker plate 582 secured to the platform portion 398b of the transfer arm 398 bears against a lever 584 of the valve 580 causing a plunger 586 of this valve to move from its dash-line position to its projected full-line position (FIG. 37) against spring action to set the control circuit so that the machine may be started through its cycle as will be hereinafter explained. When the heel positioning and clamping unit 76 is at the loading station 77 (FIG. 17) the striker plate 582 is spaced from the valve 580, the plunger 586 of which has moved to its dash-line position under spring action.

The control mechanism of the machine also includes a valve 588 carried by the stop screw 420 and comprising a plunger 592 which is constantly urged by spring action to a projected position (FIG. 18) extending beyond an abutment end of the stop screw (full line position FIG. 37). When the heel carrier unit 76 is at the heel attaching station 78 the transfer arm 398 is spaced a substantial distance from the stop screw 420 and accordingly the plunger 592 of the valve 588 has been moved to its projected position. As the heel carrier unit 76 arrives at the loading station 78 (FIG. 17) the transfer arm 398 of said unit is pressed against the stop screw 420 and has moved the plunger 592 against spring action away from its projected position and to its dash line position (FIG. 37). It will be noted at this point that when the heel positioning and clamping unit 76 arrives at the heel loading station 77 it normally has a dwell of sufficient duration to enable the lowermost heel and base lifts 40a, 40b which are resting on the cover plate 210 of the unit and are in the magazine 72 or are resting against the L-shaped gage 92, to drop down onto the table 74, said lifts then being automatically positioned and clamped in the carrier unit which is then transferred to its waiting position at the heel attaching station 78 as will appear later.

As above explained, should the magazine 72 be empty so that no heel and base lifts 40a, 40b drop onto the table 72 as the heel positioning and clamping unit 76 arrives at the heel loading station, the clamps 466, 480, 490 and 208 will move inward so far that the plunger 524 of the cutoff valve 526 is moved to its dash-line position against spring action and the machine will come to a stop with said clamps arranged in their closed positions over the table. Under these conditions it is necessary to reset the machine after the magazine 72 has been "stacked" and this is effected by manually moving in one direction a plunger 594 of a reset valve 596 to its dash-line position (FIG. 37) to cause by means hereinafter described the clamps 466, 480, 490 and 498 to be opened, whereby to allow the waiting heel and base lift to drop onto the table 74, said plunger then being moved in an opposite direction to cause the various clamps to be closed and the heel positioning and clamping unit 76 to be moved to the heel attaching station 78 where the machine comes to rest until started through its next cycle.

The nail distributor 68 is similar in some respects to the nail distributor shown in said Patent No. 3,072,913. It will be noted that the present nail distributor has been improved upon as disclosed in an application for United States Letters Patent Serial No. 254,297, filed January 28, 1963, in the names of Fred T. MacKenzie et al., and as disclosed in an application for United States Letters Patent Serial No. 276,361, filed April 29, 1963, now Patent No. 3,207,362, on an application filed in the names of Andrew J. Gilbride et al., and also as disclosed in an application for United States Letters Patent Serial No. 278,869, filed May 8, 1963, in the names of Fred T. MacKenzie et al. It will be further noted that in the present machine there is no inverting roll as in the machine disclosed in application Serial No. 278,869, the nails being delivered, heads up, into channels 598 in a front plate 600 of the distributor and from said channels into the flexible tubes 219 registering with passages 602 in a front block 604 which is secured to the main frame, for delivery to the passages 60a of the nail tubes or nail driver guides 52, 54, 56 and 58.

In the present machine the nail tubes or driver guides 52, 54, 56 and 58 are provided with cylindrical recesses 606 (FIG. 5) in which are secured by screws 608, nail guiding and detaining inserts 610 having formed in them the above-mentioned small driver passages 60a which correspond to the small passages (148a) of the nail tubes (56, 56a) of the machine disclosed in Patent No. 3,072,913 and into which nails descend from the bores 217 which are formed in the nail tubes and into the upper ends of which the lower ends of the flexible tubes 219 extend. Each of the nail guiding and detaining inserts 610 has a peripheral channel 612 in which fits a rubber filler sleeve 614 and extending between the peripheral channel and the passage 60 are alined openings 616 in which register the abovementioned steel ball detents 88, said openings being of suitable construction to limit inward movement of said detents urged toward each other by the rubber sleeve 614. The ball detents 88 serve to detain nails 70 delivered from the nail distributor 68 and hanging by their heads on the detents, until the drivers 62 operating in the passages 60a of the nail tubes or driver guides 52, 54, 56 and 58 force the nails past said detents and into the work, said detents backed up by the rubber sleeve 614 yielding away from each other to permit the heads of the nails and the drivers to pass between them.

When nails in the passages 60a of the driver guides or nail tubes 52, 54, 56 and 58 are detained, as above described, the nail distributor 68 is preferably operated to deliver nails to the nailing die 50 at the end portion of the cycle of the machine, said nails resting in the passages 60a in their waiting positions until the drivers are operated during the next cycle of the machine.

The nail distributor 68 comprises a raceway block 618 (FIGS. 13 and 14) secured to the main frame 94 and provided with a plurality of raceways 620 to the upper ends of which nails are delivered from nailways 622 of a tilt-pot hopper 624. The front plate 600 is spaced from the raceway block 618 and is secured to the main frame 94 and forms with said block a guideway 626 for a separator or transfer plate 628. The separator plate 628 has formed in it a plurality of slots 630 adapted to receive nails from the lower ends of the raceways 620 and to deliver them to the vertical channels 598 in the rear face of the front plate 600. The right end of the separator plate 628, as viewed from the front of the machine, is pivotally connected to a link 632 operatively connected to a depending arm of an angular lever 634 which is journaled on a pin 636 mounted on the main frame 94 and is constantly urged counterclockwise, as viewed from the front of the machine by a spring 638 upper and lower ends of which are attached respectively to the lever and to the main frame, said counterclockwise movement of the lever being limited by the engagement of a screw 640 threaded into the lever with a stop 642 secured to the main frame 94.

Clockwise movement of the angular lever 634, as viewed from the front of the machine, is limited by the engagement of a screw 644 secured to the lever with a stop 646 secured to the main frame 94. Secured to the angular lever 634 is a housing 648 having slidingly mounted in it a plunger 650 which is constantly urged downwardly by a spring 652.

Fulcrumed on a bearing pin 654 mounted on the main frame 94 is a lever 656 pivotally connected to the lower end of a link 658 the uper end of which is secured to a shaft 660 journaled on a carrier frame 662 which is carried by the tilt-pot hopper 624 and is identical with the carrier frame (242) disclosed in detail in said application Serial No. 254,297, said carrier frame being shiftable to a very slight extent upon the tilt-pot hopper as said hopper is moved between its lowered full-line position (FIG. 13) and its raised dash-line position. The construction and operation of the carrier frame 662 and of the tilt-pot hopper 624 is disclosed in detail in said application Serial No. 254,297 and need not be described in detail herein. Pivotally connected to the lower end of the lever 656 is an arm 664 which has formed in it a slot 666 through which passes a guide screw 668 threaded into the main frame 94, and bearing against an upper flanged portion of said arm is the spring-pressed plunger 650.

As the tilt-pot hopper 624 is moved, by mechanism hereinafter disclosed, to its lowered full-line position (FIG. 13), the arm 664 moves the angular lever 634 clockwise (FIG. 14) until such movement is limited by the stop 646 whereby to cause the slots 630 of the separator plate 628 to be moved into alinement with the lower ends of the raceways 620, the lowermost nails in said raceways sliding into the associated slots of the separator plate. Any overtravel in the upward movement of the arm 664 results in compressing the spring 652. As the tilt-pot hopper 624 is moved to its raised dash-line position (FIG. 13) during the last portion of the cycle of the machine the arm 664 is lowered thus permitting the spring 638 to swing the angular lever 634 counterclockwise (FIG. 14) until the screw 640, adjustably secured to the lever, engages the stop 642 whereby to cause the separator plate 628 to move to its nail delivering position in which its slots 630 register with the channels 598 formed in the front plate 600, the nails dropping into said channels for delivery through the passages 602 in the front block 604 and into the flexible tubes 219, the nails coming to rest in their waiting positions in the passages 60a of the nail driver guides or nail tubes 52, 54, 56 and 58 of the nailing die 50, the heads of the nails resting on the ball detents 88 which extend into said passages. When the tilt-pot hopper 624 is again lowered to its full-line position (FIG. 13) during the first part of the following cycle of the machine, the arm 664 moves the angular lever 634 clockwise, as viewed in FIG. 14, until the screw 644 on the lever engages the stop 646 thereby returning the separator plate 628 to its nail receiving position.

Pivotally connected to the bottom of the tilt-pot hopper 624 is a piston rod 670 secured to a piston 672 slidable in a bore of a cylinder 674 fulcrumed at its lower end on a bearing pin 676 secured to the main frame 94. The piston 672 has upper and lower faces 678, 680 for which high pressure air and air open to exhaust are alternately available through lines 682, 684 as will be hereinafter explained, causing the tilt-pot hopper 624 to be raised and lowered and also causing, through the above described mechanism, the transfer plate to operate between its nail delivering and its nail receiving positions. Downward movement of the tilt-pot hopper 624 is limited by the engagement of a nut 686 secured to the piston rod 670 with a cap screw or stop 688 threaded into the upper end of the cylinder 674 and upward movement of the tilt-pot hopper is limited by the engagement of the piston with the upper end of the bore in which it slides. In view of the disclosures in applications Serial Nos. 254,297, 276,361 and 278,869, no additional description of the present distributor is believed to be necessary.

As above explained, the platforms 412 (FIGS. 22 and 23) 414 (FIGS. 1, 4, 24, 25 and 33), which are interchangeably secured to the bracket 386 and to the main frame 94, are positioned above the aforementioned heel positioning and clamping unit 67 at the loading station 77.

When the heel and base lifts 40a, 40b are manually presented to the machine, the L-shaped or angular heel gage 92, which is secured to the platform 412, is used, said heel lifts being placed on the cover plate 210 of the heel positioning and clamping unit 76 at the time that said unit is at the heel attaching station 78, with the side and breast faces of said lifts in engagement with an L-shaped face 690 of the gage 92. As the heel positioning and clamping unit 76 arrives at the heel loading station 77 the various clamps of said unit being in their retracted or open positions, the heel and its associated base lift drop onto the table 74.

The magazine 72 is mounted upon the platform 414 and includes a rear section 692 and right and left side or forward sections 694. The rear section 692 of the magazine 72 comprises an upstanding block 696 secured by screws 698 to the platform 414. Secured to the forward face of the block is a rear abutment 700 adapted to be engaged by the rear faces of the heel and base lifts 40a, 40b, respectively, the abutment extending a substantial distance below the platform and into close proximity to the cover plate 210 of the heel positioning and clamping unit 76. The left and right side or forward sections 694 of the magazine 72 are substantially alike except for a door 702 which is hinged to the left side section and may be held closed by a magnetic lock 704 secured to said right side section. The door 702 may be held open by a magnetic lock 705 secured to the left side or forward section 694. Each of the side sections 694 comprises a supporting block 706 secured by screws 708 to a U-shaped upstanding column 710 having secured to it, as will be explained later, a side plate 712 to the inner face of which a rubber pad 714, which has a thickness of approximately ⅛", is secured.

The blocks 706 rest upon the upper face of a U-shaped releasing slide 716, which is movable in rectilinear guideways 718 of the platform 414, said blocks having secured to them by screws 720, slide blocks 722 which, slidingly fit respectively in forwardly diverging or graded slots 724 formed in the U-shaped plate and have lateral flanges underlying the plate. Each of the side plates 712 has secured to it screws 723 which pass through elongated slots 725 formed in an associated U-shaped column 710, said plate being initially adjusted vertically with relation to said column by the use of conventional nuts 726 and hand nuts 728 threaded onto the respective screws and forced against washers backed up by the column. The sideplates 712 are so adjusted heightwise on their associated columns 710 as to project well below the plaform 414 to positions slightly spaced from the cover plate 210 of the heel positioning and clamping unit 76.

It is desirable that the heel and base lifts 40a, 40b, especially at the lower portion of the magazine, shall be accurately positioned in the magazine 72 with their heightwise median planes approximately coincident with the heightwise median plane 440 of the heel positioning and clamping unit 76 in its loading station 77. With this in view, after manually filling or loading the magazine 72 with heel and base lifts 40a, 40b, the side or forward sections 694 of the magazine are initially moved into desired adjusted positions by the use of manually operated mechanism hereinafter described, equal distances toward each other and toward the rear section 692 of the magazine in graded paths until their associated rubber pads 714 engage under substantial sustaining pressure opposite sides of the base lifts which, as above explained, are usually slightly wider and longer than the associated heel lifts.

As above explained, when the magazine 72 has been emptied of heel and base lifts 40a, 40b and accordingly no heel and base lifts drop onto the table 74 as the heel positioning and clamping unit 76 arrives at the heel loading station 77, the heel clamps 466, 480, 490 and 208 move inwardly sufficiently for the striker screw 528 to shift the plunger 524 of the cutoff valve 526 to its dash-line position (FIG. 37), the clamps coming to rest at their inward positions and the machine cycle being stopped as will appear later. At the time that this occurs a heel or heel and base lift supporting tray or shutter 730 is automatically swung to an active position shown in FIGS. 24, 25 and 33 dash lines (FIG. 4) just below the side plates 712 and the rear abutment 700 of the magazine 72 and just above the U-shaped opening 408 in the cover plate 210.

The side sections 694 of the magazine are then moved forwardly and outwardly along the graded slots 724 of the then stationary releasing slide 716 to their open positions by the use of mechanism hereinafter described and after opening the door 702 of the magazine, said magazine is stack-loaded with heel and base lifts 40a, 40b which are supported by the tray 730. The magazine door is thereafter closed and the side sections 694 of the magazine are moved toward each other and toward the rear section 692 of the magazine to "measure" the heel and base lifts 40a, 40b, the rubber pads 714 being forced against opposite sides of said base lifts. The machine is next reset, that is the heel clamps 466, 480, 490 and 208 are opened and the tray 730 is automatically swung to its idle or inactive dash-dot position shown in (FIG. 4) in response to the manual moving of the plunger 594 of the reset valve 596 to its dash-line position (FIG. 37) with the result that the lowermost base and heel lifts 40a, 40b drop onto the table 74 and between said opened clamps. The plunger 594 of the reset valve 596 is then manually returned to its full-line position (FIG. 37) to cause the carrier unit 76 to position and to clamp the heel and base lifts 40a, 40b on the table 74 and to transfer said unit to the heel attaching station 78, the machine coming to rest and being ready to start the heel attaching cycle upon depressing the hand knobs 200, 202.

It will be noted again that the side sections 694 of the magazine 72 may be initially moved away from each other and together away from the rear section 692 of the magazine by manually actuated mechanism for the purpose of loading the magazine with heel and base lifts 40a, 40b, said side sections then being manually moved toward each other and toward said rear section until the rubber pads 714 are forced with substantial pressure against the sides of the base lifts in the magazine, the side plate 712 of the magazine below the pads, as best shown in FIG. 33, being spaced apart a distance slightly greater than the width of the base lifts to form a pocket 732 (FIGS. 25 and 33). By providing the above construction, which is similar in some respects to the magazine disclosed in application for United States Letters Patent Serial No. 256,885, filed February 7, 1963, in the names of Fred T. MacKenzie et al., the magazine 72 can be initially adjusted in order to insure that the heel and base lifts are accurately positioned in said magazine so that they will drop onto the table 74 in a central position with relation to the various heel clamps.

It will be appreciated that it is critical that only the lower portion of the stack of heels 40 or heel and base lifts 40a, 40b be accurately positioned in the magazine 72 and it has been found that there is some "spring-back" in the upper portions of the side sections 694. In order to insure that the heels 40 or heel and base lifts 40a, 40b at the lower end of the magazine 72 be moved back against the rear abutment 700, the door 702 has secured to it a leaf spring 733 which is engaged by the breasts of the heels or the heel and base lifts as said heels and lifts drop in the magazine. The spring 733 is strong enough to force the heels 40 or the heel and base lifts 40a, 40b rearward as they drop in the magazine 72 but is not sufficiently strong to prevent the heels or lifts from dropping down onto the cover plate when the side sections 694 are moved apart, as will appear later.

When the heel and base lifts 40a, 40b are replaced by one piece heels which have a height approximately equal to the combined height of the lifts it is sometimes the practice to have a heel of a given size accommodate two or more different sizes of shoes. The breast of the heel is so positioned on the shoe that it requires no trimming but it will be necessary subsequently to trim the rear and side faces of said heels. It will be appreciated that where in the claims applicants define heel and base lifts these terms are intended to define a heel and where in the claims applicants define a heel this term is intended to cover heel and base lifts.

It will be further noted that when the heel positioning and clamping unit 76 is at the heel attaching station 78 and the heel lift 40a is in forced engagement with the nailing die 50 as above explained, the side sections 694 of the magazine 72 are temporarily moved apart automatically by fluid pressure operated means hereinafter described, thus allowing the stack of heel and base lifts to drop, the weight of said stack being momentarily supported by the cover plate 210 of the unit. It will be understood that at the time that this occurs the heel carrier unit 76, which includes the cover plate 210, is held tilted up slightly from its normal position about the horizontal axis 204 of the bearing pin 396. The upward tilting movement of the heel carrier unit 76 is partly the result of the upward pressure applied against the heel, which is clamped in the unit, by the shoe and is partly the result of the application of upward pressure of the shank of the outsole of the shoe against the concaved under face 206 of the breast clamp 208 as illustrated in FIG. 34.

It is desirable that before upward pressure applied against the heel positioning and clamping unit 76 shall be removed, the rubber pads 714 of the magazine 72 shall have again closed in on the base lifts 40b so as again to clamp the main stack of heel and base lifts against movement in the magazine thereby insuring that the lowermost heel and base lifts, which are housed in the pocket 732 at the lower end of the magazine, shall be free to drop away from the main stack of clamped heel and base lifts in the magazine when said unit tilts back to its lowered position in response to the lowering of the jack and accordingly the shoe.

It will be clear from the foregoing that when the heel positioning and clamping unit 76 swings toward the heel loading station 77, the lowermost heel and base lifts in the magazine are supported by the cover plate 210 of said unit and are housed, with a slight amount of clearance from the main stack of heel and base lifts, in the pocket 732 thus insuring that the weight of the main stack of heel and base lifts shall not be supported at that time by the cover plate of the unit. As the heel positioning and clamping unit 76 arrives at the loading station 77 the lowermost heel and base lifts in the magazine 72 drop through the U-shaped openings 408, 410 in the cover and base plates 210, 460 of the unit and onto the table 74, the various heel engaging clamps of the unit then being open. It will be understood that when the heel positioning and clamping unit 76 swings toward the heel attaching station the entire stack of heel and base lifts 40a, 40b is clamped in the magazine out of contact with the cover plate 210 of the unit.

It will be appreciated that the distances between the lower ends of the rubber pads 714 and the cover plate 210, when said plate is in its above-mentioned tilted up position, will always be ample to accommodate the combined thickness of the heel 40 or the heel lift 40a and its associated base lift 40b and also that the distances between the lower ends of the side plates 712 and the cover plate 210 in its normal or lowered position shall be less than the thickness of the base lift 40b.

Extending through the platform 414 at opposite sides of the U-shaped opening 416 are a pair of clearance slots 734 and formed at the under side of the platform at opposite sides of the opening are rectilinear guideways 736 respectively along which a lower actuator or measuring slide 738 is reciprocable. The actuator slide 738 has formed in it a pair of slots 740 in which fit slidingly blocks 741 supported by coupling pins 742 which extend upwardly through the slots 734 in the platform 414 and are secured by dowels 744 to the slide blocks 722.

Operatively connected through a link 746 to the rear end of the releasing slide 716 is a lever 748 fulcrumed on a bearing pin 750 mounted in a bearing 751 of the platform 414, said lever being journaled to a piston rod 752 secured to a piston 754 slidable in a bore of a cylinder 756 secured to a lug 758 screwed to the platform. Air open to high pressure and exhaust is alternately available through lines 760, 762 for faces 764, 766 respectively of the piston 754 to cause the releasing slide 716 to move the side sections 694 of the magazine 72 first away from and then toward each other lengthwise of the slots 740 during the attachment of the heel to the shoe whereby first to release the stack of heel and base lifts 40a, 40b in the magazine 72 allowing them to be supported by the cover plate 210 of the carrier unit 76, and then to cause all the lifts except the lowermost heel and base lifts again to be clamped in the magazine, said lowermost heel and base lifts dropping away from the clamped lifts in the magazine when the carrier unit tilts downward about the axis 204 as above explained during the retraction of the jack. Forward movement of the releasing slide 716 on the platform 414 is limited by the engagement of a screw 768 which is adjustably mounted on an upstanding lug of the plate with the rear end of the fixed upstanding block 696 of the magazine 772. Rearward movement of the releasing slide 716 is limited by the engagement of a nut 770 secured to the piston rod 752 with a head of a coupling screw 772 which secures the cylinder 756 to the lug 758.

The rear end of the actuator slide 738 is operatively connected through a link 774 to a lever 776 which is journaled beneath the platform 414 on the bearing pin 750 and has threaded into it a hand knob 778 which extends through a slot 780 in the platform and is provided with a collar. The hand knob 778 and accordingly the actuator slide 738 may be locked in a predetermined position on the platform 414 by rotating the knob into the lever 776 to draw said lever and the collar of the knob against the lower and upper faces respectively of the platform.

Journaled on a fulcrum pin 782 mounted on the platform 414 is the above-mentioned heel supporting tray or shutter 730 which has pivotally connected to it a link 784 operatively connected by a pin 786 to a clevis portion of a connecting rod 788 secured to a piston 790 slidable in a bore of a cylinder 792 which is screwed to the bottom of the platform 414, said pin 786 being mounted for sliding movement in a guide slot 794 formed in the platform. Air open to high pressure and exhaust is alternately available through lines 796, 798 for faces 800, 802 respectively of the piston 790 to cause the tray or shutter 730 to be moved between its idle or inactive dash-dot position (FIG. 4) and its active dash-line position in which it lies beneath the magazine 72 and overlies the U-shaped opening 408 of the cover plate 210 of the heel carrier unit 76 then at the heel loading station 77.

As above explained, when the magazine 72 is empty and the heel positioning and clamping unit 76 returns to the loading station 77 the lever 448 (FIG. 21), which operates the heel clamps 466, 480, 490 and 208 moves counterclockwise to an extent to operate the cut-off valve 526 whereby to cause the machine to come to rest with said clamps in their inward or closed positions. When this occurs, air under high pressure and exhaust is available for the faces 802, 800 respectively of the piston 790 with the result that the heel supporting tray 730 moves to its active dash-line position shown in FIG. 4, said movement being limited by the engagement of the pin 786 with the rear end of the slot 794. Movement of the tray 730 to its idle or inactive dash-dot position is limited by the engagement of the piston 790 with the forward end of the bore of the cylinder 792.

Preparatory to filling the empty magazine 72 the operator rotates the hand knob 778 counterclockwise (FIG. 4) to release said knob from its clamped position on the platform 414 and slides the knob rearwardly along the slot 780 causing the actuator or measuring slide 738 to be moved forwardly along the guideway 736. Such movement causes the side sections 694 of the magazine 72 to move forwardly and outwardly along heel grading lines extending lengthwise of the slots 724 of the releasing plate 716, which at this time has its associated screw 768 held against the upstanding block 696 of the magazine by air pressure applied against the face 764 of the piston 754, the face 766 of the piston being open to exhaust.

When the magazine 72 has been filled with heel and base lifts 40a, 40b the door 792 of the magazine is closed and the hand knob 778 is moved forwardly along the slot 780 causing the side sections 694 of the magazine to move rearwardly and toward each other to measure the heel and base lifts, the rubber pads 714 secured to the side plates 712 of said side sections being forced with substantial pressure against the sides of the base lifts (except for the lowermost heel and base lifts in the pocket 732) to sustain the weight of the stack of heel and base lifts in the magazine as shown in FIG. 33. At the time that the heel and base lifts 40a, 40b are clamped in the magazine 72 the lowermost heel and its associated base lift supported by the tray or shutter 730 are arranged in the pocket 732 below the rubber pads 714 and between the side plates 712. As above explained the plunger 594 of the reset valve 596 is then manually moved to its dash-line position (FIG. 37) causing, through means hereinafter described, the clamps 466, 480, 490 and 208 to move to their open positions and the shutter or tray 730 to move to its inactive dash-dot position, with the result that the lowermost heel and base lifts 40a, 40b in the magazine drop down onto the table 74. Upon movement by the operator of the plunger 594 of the reset valve 596 back to its full-line position, the heel is clamped in the carrier unit 76 which then moves to the heel attaching station 78 and comes to rest.

As the heel positioning and clamping unit 76 arrives at the heel attaching station 78, the striker plate 582 secured to the platform portion 398b of the arm 398 engages the lever 584 of the valve 580 secured to the table supporting bracket 418 causing the plunger 586 of the valve to be moved from its dash-line to its full-line position, the machine then being ready to be manually started through its heel attaching cycle by depressing the hand knobs 200, 202.

In view of the foregoing it will be apparent that during the heel attaching operation the releasing slide 716 is moved rearwardly and then forwardly by the above described mechanism and by mechanism hereinafter described, causing the side sections 694 of the magazine 72 to move away from and then toward each other lengthwise of the slots 740 of the then stationary actuator slide 738 for the purpose of releasing a lowermost heel and base lift 40a, 40b from the clamped stack of lifts.

The illustrative machine will now be described with reference to the pneumatic diagrams of FIGS 36 and 37 which show schematically the pneumatically operated mechanism of the machine.

These diagrams aid in the description of the operation of the machine at the time that it is started through its heel attaching cycle, the heel positioning and clamping unit 76 being in a locked or waiting position at the heel attaching station 78 just below the nailing die 50, and the jack 46 and the nail driving gun 64 being in their lowered and raised starting positions respectively.

In the use of the machine the operator, or alternatively, appropriately designed conveyor mechanism (not shown), places the last 48 bearing the shoe 44 bottom up and heel end rearward on the spindle 138 of the jack post 126, the shoulders 162 of the positioning plate 150 of the last being arranged in opposed relation to the fixed and movable lugs 158, 160 respectively of the jack post, the movable lug at such time being in its open position shown in FIG. 11 as previously explained.

Compressed air for powering the machine is tapped from a factory compressed air line (not shown) to a supply line 804 which includes an air filter 806, an air pressure regulator 808 and an air lubricator 810 and which has branches extending to the various lines of the system.

Having mounted the last 48 bearing the shoe 44 on the jack 46, the operator depresses the hand knobs 200, 202 causing the plungers 80, 82 of the valves 84, 86 respectively, pilots A of which are at this time open to reduced pressure controlled by an air pressure regulator 812, to be moved from their full-line to their dash-line positions. This results in high pressure air and air open to exhaust being available for the pilots A and B respectively of a differential pilot valve 814 causing a plunger 816 of this valve to shift from its full-line to its dash-line position. When this occurs, air is exhausted from the pilots A of pilot valves 818, 820 respectively thereby allowing plungers 822, 824 of these valves to be lowered and raised (FIG. 36) respectively by spring action from their full-line positions to their dash-line positions. This results in air under pressure and controlled by a pressure regulator 826, and air open to exhaust being available through quick exhaust valves 828, 830 and the lines 190, 192 respectively for the faces 194, 196 of the piston 110 which is reciprocable in the jack cylinder 108.

When this occurs, the jack 46 is raised from its lowered position shown in FIG. 10, the heel seat portion of the shoe on the jack engaging the composite heel 40 waiting in the heel positioning and clamping unit 76 at the heel attaching station 78, causing said unit to swing upward about the axis 204 and the heel to be forced against the bottoms of the nail tubes 52, 54, 56 and 58 of the nailing die 50, the jack coming to rest. As above explained, during the first part of the upward movement of the jack 46, the last 48 bearing the shoe is oriented on the spindle 138 of the jack post 126 and is thereafter held in its oriented position upon said post.

When the jack 46 has been raised to a point where it causes the composite heel 40 to be forced against the bottom of the nailing die 50 it will be noted, as above explained, that the shank portion of the outsole of the shoe bears against the bottom of the breast clamp 208 as shown in FIG. 34. It will also be noted at this point that when the plunger 816 of the differential pilot valve 814 has shifted to its dash-line position a pilot A of a pilot valve 832 is open to exhaust and this results in a plunger 834 of this valve moving under spring action from its full-line position to its dash-line position to cause, through fluid pressure operated means, the side sections 694 of the magazine 72 to move away from each other lengthwise of the slots 740 of the measuring slide 738 as above explained. The shifting of the plunger 816 of the differential pilot valve 814 to its dash-line position also renders a pilot A of a differential pilot valve 836 having a plunger 838 open to exhaust to set up this valve for a subsequent operation as will appear later.

Just before the jack 46 reaches the upper limit of its movement the cover plate 210 of the heel positioning and clamping unit 76 engages the plunger 212 of the pilot valve 214 causing said plunger to move against spring action from its full-line position to its dash-line position (FIG. 37), thus rendering high pressure air available for a pilot A of a differential pilot valve 840, a pilot B of this valve at such time being open to exhaust, with the result that a plunger 842 of the pilot valve 840 shifts from its full-line position to its dash-line position. Such action results in rendering high pressure air available through a manually operated control valve 844, which has a plunger 846 and is hereinafter referred to, and a quick exhaust valve 848 and the line 355 for the face 356 of the gun drop piston 290 and also results in opening the face 358 of this piston to exhaust through the line 357. Accordingly the gun 64 which is operatively connected to the piston 290, as above described, is lowered. As the gun 64 is lowered the nail drivers 62 force nails 70, which at that time are waiting in the passages 60a of the driver tubes 52, 54, 56 and 58 out of their waiting positions on the ball detents 88, the gun following the nails as they drop until their lower ends engage the heel lift 40a then forced against the nailing die 50.

The shifting of the plunger 842 of the differential pilot valve 840 from its full-line position to its dash-line position also results in high pressure air being available through the control valve 844 and the line 682 for the face 678 of the piston 672, which is reciprocable in the nail hopper cylinder 674, and in rendering high pressure air available for a pilot A of a differential pilot valve 850 having a plunger 852, a pilot B of this valve at this time being open to exhaust. Accordingly the plunger 852 of the pilot valve 850 is shifted from its full-line position to its dash-line position thus rendering, through a 2-way flow control valve 854, exhaust air available for the face 680 of the piston 672. When air under pressure and air open to exhaust is applied against the faces 678, 680 of the piston 672, the hopper 624 of the nail distributor 68 is moved to its lowered full-line position limited by the engagement of the nut 686 on the piston 670 with the cap screw or stop 688 threaded onto the upper end of the cylinder 674. Such motion, as above explained, results in the separator plate 628 being returned to its nail receiving position in which the slots 630 of said plate are in register with the lower ends of the raceways 620, the lowermost nails in the raceways sliding into said slots preparatory to the separator plate being returned to its nail delivering position at the end portion of the cycle of the machine as will be hereinafter explained.

The moving of the plunger 842 of the pilot valve 840 to its dash-line position also renders high pressure air available for a pilot A of a differential pilot valve 856 having a plunger 858 and a pilot B, which is also open to high pressure air, the construction of the pilots being such that after a slight dwell for pressure build-up the plunger 858 is moved to its dash-line position.

As the gun 64 is lowered, and at approximately the same time that the nails engage the work (the drivers following the nails down said passages) the carrier block 320 which, in effect, forms part of the gun 64, swings the lever 360 of the valve 364 rearward, causing the plunger 362 of this valve to be moved against spring action from its full-line position to its dash-line position. Just after this occurs, the plunger 858 of the differential pilot valve 856 having been moved to its dash-line position, thereby rendering high pressure air available through a bleeder valve 860 for a face 862 of a piston 864 which reciprocates in a cylinder 866 and has secured to it a connecting rod 868 for driving a work piece counter (not shown), the piston 864 is moved against the action of a spring 870 to effect its counting stroke by the application of high pressure air against said face 862.

High pressure air is also available at this time for a pilot A of a pilot valve 872 which has a plunger 874, said plunger moving against spring action from its full-line position to its dash-line position whereby to render high pressure air available for the annular chamber 282 of the gun 64, with the result that the impact block 312 reciprocates rapidly in the bore 308 of the gun, as described in Patent No. 2,911,645, and strikes with repeated high speed blows or impact action against the hammer or jack-set 314, causing the nails then in the passages 60a of the nail tubes 52, 54, 56 and 58 to be driven by the drivers 62 into the composite heel 40 and the heel seat portion of the shoe mounted on the jack 46, said nails being clenched against the heel plate 90 of the last 48 carrying the shoe as the gun follows the hammer downward as fast as permitted while the nails are being driven into the work.

When the nails have been driven into the work to the proper depth, the striker screw 378, which is initially adjusted in the collar 320 of the gun 64 for controlling the depth of drive, engages the rod 372, causing the cam 370 secured to the rod to move the plunger 366 of the pilot valve 368 from its full-line to its dash-line position against spring action. When this occurs a plunger 876 of the bleeder valve 860 is shifted from its full-line to its dash-line position thereby causing exhaust air to be available for the pilot A of the pilot valve 872, the plunger 874 of this valve returning to its full-line position under spring action, thus stopping flow of high pressure air to the chamber 282 of the gun 64 and accordingly stopping downward movement of said gun. At the same time the face 862 of the piston 864, which forms part of the mechanism for operating the counter (not shown), is open to exhaust and returns to its full-line position under the action of the spring 870.

The shifting of the plunger 876 of the bleeder valve 860 to its dash-line position also renders high pressure air available for a pilot A of a differential pilot valve 878, a pilot B of this valve at this time being open, through a flow control valve 880 to exhaust. Accordingly, a plunger 882 of the differential pilot valve 878 is moved to its dash-line position and results in the faces 522, 518 of the heel locator clamp piston 444 being open respectively to high pressure air and exhaust and also results in high pressure air being available for the face 574 of the piston 568 which is slidable in the transfer release cylinder 570. When this occurs the various heel and base lift clamps of the heel positioning and clamping unit 76 moves away from the composite heel attached to the shoe and the detent 554 (FIG. 30) is swung clockwise in response to upward movement of the rod 566, the locking rod 422 being released for movement in the sleeve 426. As above explained, although the composite heel 40 then attached to the shoe has been released from the heel positioning and clamping unit 76 at this time the outsole of the shoe, which is mounted on the jack 46, is forced against the breast clamp 208 of the unit and holds said unit in its tilted-up position about the horizontal axis 204 of the pin 396.

The shifting of the plunger 882 of the valve 878 to its dash-line position also causes air to be exhausted from the pilot B of the differential pilot valve 836 to set up this valve for subsequent operation and also causes air under pressure to be supplied to the pilot B of the differential pilot valve 840 thus causing the plunger 842 of this valve to return to its full-line position. Movement of the plunger 842 of the differential pilot valve 840 to its full-line position causes the pilot A of the differential pilot valve 850 to be opened to exhaust to set up this valve for a subsequent operation and causes the differential pilot valve 856 to be reset, and also renders through the manually actuated valve 844 exhaust air available for the face 678 of the piston 672 of the nail hopper cylinder 674 and through the quick exhaust valve 848 for the face 356 of the piston 290 of the gun positioning cylinder 292, and renders high pressure air available for the face 358 of the piston 290 which travels in the gun positioning cylinder 292. When high and exhaust pressure air is available for the faces 358, 356 respectively of the pistion 290, which is movable in the gun cylinder 292, the gun 64 is moved to its raised starting position.

The raising of the gun 64 as above described, moves against spring action the plunger 216 of the pilot valve 218 to its dash-line position (FIG. 36) causing high pressure air to be available for the pilots A of the valves 84, 86 thereby resetting these valves and thus causing the valve 814 to be restored to its starting position and air under pressure to be open to the pilots A of the valves 820, 818 and to the pilot A of the valve 836 as well as for the pilot A of the pilot valve 832. Accordingly air under somewhat reduced pressure controlled by the pressure regulator 812, and air open to exhaust is now available for the faces 196, 194 of the piston 110 which is slidable in the jack cylinder 108, with the result that the jack 46 returns to its lowered position. At this time air under said reduced pressure is supplied to the pilots A of the valves 80, 82 through the pilot valve 822, the pilot valve 218 having been released by the gun 64 during upward movement of the gun and accordingly the plunger of this valve returning under spring action to its full-line position.

The opening of high pressure air to the pilot A of the differential pilot valve 836 in response to the shifting of the plunger 816 of the differential pilot valve 814 to its full-line position, causes said plunger 838 of the differential pilot valve 836 to shift to its dash-line position with the result that high pressure air and exhaust air are available through flow control valves 834, 886, and the lines 540, 538, respectively, for the chambers 544, 542 formed by the piston 532 and the cylinder 530 with the result that the heel positioning and clamping unit 76 swings to the heel loading station 77, the rate of travel of said unit being controlled by the flow control valves. The shifting of the plunger 838 of the valve 836 to its dash-line position also results in pressurizing the pilot B of the differential pilot valve 850 and results in the plunger 852 of this valve shifting to its full-line position, thereby rendering high pressure air available for the face 680 of the piston 672, which is slidable in the nail hopper cylinder 674, at a rate controlled by the flow control valve 854, the tilt pot hopper 624 being moved to its raised dash-line position (FIG. 13) and the separator plate 628 moving under spring action to its nail delivering position, and accordingly transferred nails being delivered to their waiting positions in the passages 60a of the driver guides or nail tubes 52, 54, 56 and 58 as above explained.

As the heel positioning and clamping unit 76 moves away from the heel attaching station 78, the striker plate 582 moves away from the lever 584 of the pilot valve 580 with the result that the plunger 586 of the valve is moved by spring action to its dash-line position (FIG. 37) thus cutting off the supply of air available for the valve 86, and thus insuring that the machine cannot be started through its cycle at this time.

As the heel positioning and clamping unit 76 arrives at the heel loading station 77, the heel carrier unit supporting arm 398 displaces the plunger 592 of the pilot valve 588 to its dash-line position (FIG. 37) thereby causing high pressure air to be supplied to the pilot B of the differential pilot valve 878 at a rate controlled by a flow control valve 880, the valve 878 shifting from its dash-line position to its full-line position (FIG. 37) soon (depending upon the setting of the flow control valve 880) after the heel positioning and clamping unit 76 arrives at the heel loading station 77, the heel positioning clamps of said unit being in their retracted or open positions and the lowermost base and heel lifts 40a and 40b respectively dropping from the magazine 72 onto the table 74 between the clamps. When the plunger 882 of the differential pilot valve 878 has moved to its full-line position the faces 522, 574 of the pistons 444, 568 associated with the heel locator clamp cylinder 442 and the transfer release cylinder 570 are open to exhaust and the face 518 of the piston 444 is open through a pressure regulator 888 to high pressure air. Accordingly, the clamps 466, 480, 490 and 208 of the heel carrier unit 76 close in to position and to clamp the heel and base lifts 40a, 40b in said unit and the rod 566 secured to the piston 568 is lowered under spring action, thus allowing the detent 554 acted upon by the spring-pressed plunger 564 to move against the inner or upper end of the slot 556 as above explained.

The shifting of the plunger 882 of the differential pilot valve 878 from its dash-line to its full-line position (FIG. 37) also renders high pressure air available through the control valve 526 and a sequence valve 890 for the large pilot B of the differential pilot valve 836 with the result that the plunger 838 of this valve moves from its dash-line to its full-line position thus rendering chambers 542, 544 formed by the piston 532 and cylinder 530 open to high pressure air and to exhaust air with the result that the heel positioned and clamped in the heel positioning and clamping unit 76 at the heel loading station 77 is swung about the vertical axis 402 to the heel attaching station 78 above the jack 46 and just below the nailing die 50, such movement, as above explained, being limited by the engagement of the outer end of the locking rod 422 with the stop pin 424. As the heel positioning and clamping unit 76 leaves the heel loading station 77 the plunger 592 of the pilot valve 588 is released and returns by spring action to its full-line reset position (FIG. 37) thereby opening the pilot B of the differential pilot valve 588 to exhaust.

Just before the heel positioning and clamping unit 76 arrives at the heel attaching station 78 the striker plate 582 which is attached to the platform 398b of the arm 398 displaces the lever 584 of the valve 580 causing the plunger 586 of the valve to be moved from its dash-line to its full-line position (FIG. 37) whereby to render high pressure air available for the valve 86. The machine now comes to rest and is ready to be started through its heel attaching cycle by the simultaneous depression of the hand knobs 200, 202 of the valves 84, 86 as described.

It will be understood that when there is no shoe upon the jack 46 and the hand knobs 200, 202 are depressed to start the machine through its cycle, the plunger 212 of the pilot valve 214 will not be moved to its dash-line position and accordingly the machine will come to rest with the jack in its upper or raised position. When this occurs the jack 46 may be lowered to starting position by manually moving the plunger 216 of the valve 218 to its dash-line position and then releasing it.

When the magazine 72 is empty and accordingly no heels or heel and base lifts 40, 40a are available to drop down onto the table 74 the various clamps of the heel positioning and clamping unit 76 move inwardly so far that the striker screw 528 moves the plunger 524 of the valve 526 from its full-line position to its dash-line position (FIG. 37) with the result that no high pressure air is available to actuate the plunger 838 of the differential pilot valve 836 from its dash-line position to its full-line position and the machine comes to rest with the clamps in their inward positions over the table. As above explained, when the plunger 524 of the valve 526 is shifted to its dash-line position the shutter or tray 730 is in its active position below the magazine 72 to provide a "floor" for the magazine. The magazine 72 is then filled with heel and base lifts 40a, 40b and the tray 730 is returned automatically to its idle dash-dot position (FIG. 4) when the machine is reset.

The manually operated valve 594 is provided for resetting the machine when the plunger 524 of the valve 526 has been moved to its dash-line position and the machine comes to a stop with the heel clamps of the heel carrier unit 76 in their innermost positions and with the tray or shutter 730 in its active position below the magazine 72. When the above condition obtains and the magazine 72 has been "stacked," the operator manually moves the plunger 594 of the valve 596 to its dash-line position thus rendering high pressure air available for the large pilot A of the differential pilot valve 878, thus moving the plunger 882 of the valve 878 to its dash-line position with the result that air under high and exhaust pressures is available respectively for the faces 522, 518 of the piston 442 and accordingly the heel clamps are opened and come to a stop in their open positions and the tray or shutter 730 is swung back to its inactive position shown in dash-dot lines (FIG. 4) by means which will appear later, the lowermost heel or associated heel and base lifts 40a, 40b in the pocket 732 (FIG. 33) of the magazine 72 dropping onto the table 74. The opening of the various heel clamps causes the striker screw 528 to move away from the plunger 524 of the cut-off valve 526, said plunger returning to its full-line position shown in FIG. 37 by spring action. The plunger 594 of the reset valve 596 is now returned manually to its full-line position (FIG. 37) with the result that the plunger 882 of the differential pilot valve 878 returns to its full-line position (FIG. 37) under air pressure available for the small pilot B of this valve causing the clamps of the heel positioning and clamping unit 76 to close in to clamp the heel and base lifts 40a and 40b and causing through means previously described, said unit to swing to the heel attaching station 78 where it is locked preparatory to initiating the heel attaching cycle by simultaneously depressing the hand knobs 200, 202.

As above stated, it is desirable during the heel attaching operation temporarily to move the side sections 694 of the magazine 72 apart so as to drop the stack of lifts in the magazine onto the cover plate 210 of the heel positioning and clamping unit 76, the lowermost heel or heel and base lifts 40a, 40b of said stack being housed in the pocket 732 at the lower end of the magazine. It is also desirable, as above explained, that the side sections 694 of the magazine 72 shall be moved toward each other to clamp the heel base lifts 40b between the rubber pads 714 of said sections, while the heel positioning and clamping unit 76 is held in its tilted up position (FIG. 34) about the axis 204 of the bearing pin 396 (FIG. 26) by upward pressure of the work mounted on the jack 46. As already explained, with such an arrangement the lowermost heel or pair of heel and base lifts 40a, 40b in the magazine 72 and on the cover plate 210 of the heel carrier unit 76 will move away from the main stack of heel and base lifts clamped in the magazine as the jack 46 is lowered and, during return swinging movement of said carrier unit, the weight of the main stack of heel and base lifts in the magazine will not be supported by the cover plate. Accordingly during the heel attaching cycle of the machine the side sections 694 of the magazine 72 are moved away from each other and are soon thereafter moved toward each other by fluid pressure means which will now be described.

When the plunger 816 of the pilot valve 814 is shifted to its dash-line position (FIG. 36) the pilot A of the pilot valve 832 is open to exhaust the accordingly the plunger 824 of this valve is shifted by spring action from its full-line position to its dash-line position (FIG. 37). Accordingly high pressure air is available for the face 766 of the piston 754 and the face 764 of said piston is open to exhaust with the result that the releasing slide 716 is moved rearwardly along the guideway 718 causing, through mechanism above described, the camming of the side sections 694 of the magazine 72 away from each other lengthwise of the slots 740 of the then stationary measuring slide 738 and thus causing the full weight of the column or stack of heel and base lifts 40a, 40b to be supported upon the cover plate 210 of the heel positioning and clamping unit 76 then in its tilted up position at the heel attaching station 78.

When the plunger 216 of the control valve 218 is shifted from its full-line to its dash-line position during upward movement of the gun 64, as above explained, the plungers 80, 82 of the pilot valves 84, 86 are restored to their full-line positions causing the plunger 816 of the differential pilot valve 814 to return to its full-line position and accordingly high pressure air to be available for the pilot A of the pilot valve 832. It will thus be clear that the plunger 834 of the pilot valve 832 will be moved against spring action from its dash-line position to its full-line position with the result that the faces 764, 766 of the piston 754 are subjected to air under pressure and exhaust respectively causing the releasing slide 716 to move forwardly along the guideways 718 until the side sections 694 of the magazine 72 clamp the base lifts 40b against movement in the magazine. As above explained, it is desirable that the rubber pad 714 of the side sections 694 of the magazine shall clamp the base lifts 40b between them before the heel positioning and clamping unit 76 is lowered about the axis 204 of the bearing pin 396 and accordingly the pneumatic control means may be provided for this purpose with suitable means such, for example, as a suitable flow control valve (not shown) in the pilot line which supplies air to the line connecting the pilots A of the valves 818, 820.

As above explained, when the magazine 72 is empty and accordingly a heel or an associated pair of heel and base lifts 40a, 40b does not drop onto the table 74 as the heel carrier unit 76 arrives at the heel loading station 77, the various clamps close in so far that the striker screw 528 moves the plunger 524 of the cut-off valve 526 to its dash-line position and the machine comes to rest with the clamps in their inner-most positions, a pilot A of a valve 892 then being open to exhaust. At this time a pilot B of differential pilot valve 892 is open to pressure, a plunger 894 of this valve shifting to its dash-line position and thus causing air under pressure and exhaust to be available for the faces 802, 800 respectively of the piston 790 which is movable in the shutter cylinder with the result that the piston moves to its position shown in FIG. 4 moving the shutter or tray 730 to its dash-line active position beneath the magazine.

The operator then loads the magazine 72 with heels or heel and base lifts 40a, 40b and clamps the rubber pads 714 of the side sections 694 against the heels or the base lifts as above described. The plunger 594 of the reset valve 596 is thereafter manually moved to its dash-line position (FIG. 37) causing air under pressure to be available for the large pilot A of the differential pilot valve 878 while a small pilot B of this valve is also under pressure since the plunger 592 of the control valve 588 at this time is in its dash-line position. Accordingly the plunger 882 of the differential pilot valve 878 moves to its dash-line position causing the various clamps of the heel positioning and clamping unit 76 to open and to come to rest in their open positions, the plunger 524 of the valve 526 returning by spring action to its full-line position (FIG. 37).

With the plunger 882 of the differential pilot valve 878 in its dash-line position, the plunger 524 of the control valve 526 in its full-line position and the plunger 594 of the reset valve 596 in its dash-line position, air under pressure is available for the pilot A of the differential pilot valve 892 (through pilot line which is tapped off from the line of the reset valve) while the pilot B of the differential pilot valve 892 is open to exhaust. Accordingly, the plunger 894 of the differential pilot valve 892 is restored to its full-line position causing the shutter or tray to return to its dash-dot inactive position, the lowermost heel or heel and base lifts 40a, 40b which are in the pocket 732 at the lower end of the magazine 72 dropping onto the table 74 and between the various clamps of the heel carrier unit 76. The plunger 594 of the reset valve 596 is then manually returned to its full-line position with the result that the pilot A of the differential pilot valve 878 is open to exhaust, the pilot B of this valve still being open to pressure and the plunger 882 of the valve returning to its full-line position. Accordingly as above explained the various clamps of the heel positioning and clamping unit 76 close in on the heel and base lifts 40a, 40b on the table 74 to position and clamp them in said unit, the plunger 894 of the differential pilot valve 892 remaining in its full-line position since the pilots A and B of this valve are of the same size and are then subjected to equal pressures. As above explained, after the heel and base lifts 40a, 40b have been clamped in the carrier unit 76, air under pressure is available through the sequence valve 890 for the large pilot B of the differential pilot valve 836 to move the plunger 838 of this valve to its full-line position whereby to cause the unit to be swung to the heel attaching station where it is locked preparatory to starting the machine through its heel attaching cycle.

In order to insure that pressure shall not be available for the face 356 of the piston 290, which controls downward vertical movement of the gun 64, while initially adjusting the machine, for example, there is provided the above-mentioned valve 844. In the normal operation of the machine, the plunger 846 of the valve 844 is in its full-line position shown in FIG. 36 and when it is desired to cut high pressure off from the face 356 of the piston 290, which is reciprocable in the gun positioning cylinder 292, and/or from the face 678 of the piston 672, which is reciprocable in the nail hopper cylinder, the plunger 846 is manually moved to its dash-line position (FIG. 36), said plunger being manually restored to its normal or ful-line position after making necessary repairs or adjustments.

In order to cut off high pressure air from the annular chamber 282 of the gun 64 thereby insuring against impact action of the gun while repairing or setting up the machine, there is provided a cut-off valve 896 having a plunger 898 which may be shifted manually between its normal full-line position and its cut-off dash-line position.

Having thus described our invention, what we claim as new and desire to secure by Letters Patent of the United States is:

1. In a heel attaching machine, a magazine for housing heels in stacked relation, a tray for supporting heels during the loading of said magazine, said tray being movable between an active position beneath said magazine and an inactive position from beneath said magazine, and means for automatically moving the tray from its inactive position to its active poistion when the magazine becomes empty.

2. In a heel attaching machine, a jack for a shoe, a nailing die, means for automatically delivering and positioning a heel with relation to said jack and said die, a magazine for automatically delivering said heel to said means, a tray for supporting heels while loading the magazine and movable between an active heel supporting position beneath the magazine and an inactive position away from the magazine, means operative in timed relation with said first-named means for effecting relative movement between the jack and the nailing die to force together the heel and a heel seat of the shoe, and safety means, which is responsive to the operation of said first-named means, and is adapted to insure against completion of the heel delivering and positioning operation of said first-named means and the operation of said second-named means when the magazine fails to deliver a heel to said first-named means, and means responsive to the operation of said safety means for automatically moving the tray from its inactive to its active position.

3. In a heel attaching machine having heel and base lift attaching and loading stations, a carrier unit movable between said stations and including mechanism for positioning and clamping heel and base lifts in said unit, a magazine for automatically delivering associated heel and base lifts to the carrier unit, a tray which is movable to and from a heel and base lift supporting position beneath the magazine for supporting said heel and base lifts during the loading of said magazine, and means responsive to the operation of said mechanism for insuring against movement of the carrier unit from the loading station to the attaching station and for moving the tray to its heel and base lift supporting position as the result of no heel and base lifts being delivered to the carrier unit by the magazine.

4. In a heel attaching machine having a heel loading station and a heel attaching station, a jack for a shoe, a nailing die, a magazine, a carrier unit, which comprises fluid pressure operated mechanism, for positioning and clamping a heel which is movable between said heel loading station where the heel is automatically presented to the unit by the magazine and said heel attaching station where the heel is attached to the shoe, fluid pressure operated mechanism for moving the carrier unit between the loading and heel attaching stations, fluid pressure operated means for effecting relative movement between the jack and the nailing die to force together the heel seat of the shoe and a heel delivered to the heel attaching station by the carrier unit, fluid pressure operated means cooperating with the nailing die to drive nails into the heel and the heel seat of the shoe whereby to attach the heel to the shoe, a tray which is movable to and from a heel supporting position between the magazine and the carrier unit and which is adapted to support said heels during the loading of the magazine, and means responsive to the operation of said first-named fluid pressure operated mechanism for moving the tray to its active position and also for rendering said fluid pressure operated means and the second-named fluid pressure operated mechanism inactive when there is no heel in the carrier unit thereby insuring against operation of the machine through its cycle.

5. In a heel attaching machine having a heel loading station and a heel attaching station, a magazine arranged at a heel loading station, a jack and a nailing die arranged at the heel attaching station, a heel positioning and clamping unit movable between the heel loading station, where said unit is positioned below the magazine, and the heel attaching station where said unit is positioned between the jack and the nailing die, means for stopping the machine when said unit is arranged at the loading station and there is no heel available for said unit, a heel attaching tray movable between an inactive position away from the heel loading station and an active heel supporting position beneath the magazine, and means operative in timed relation with said first-named means for automatically moving the tray to its active position below the magazine when the magazine is empty and there is no heel available for said unit.

6. In a heel attaching machine having a heel attaching station, a carrier unit, means for positioning and securing a heel in said unit, means for moving said unit and accordingly the heel to a predetermined position at said station, means for locking the carrier unit against movement away from said predetermined position, means for forcing a shoe against the heel at the heel attaching station, and means for driving a plurality of nails simultaneously by successive impact action into the heel and the heel seat of the shoe to secure said heel to the shoe.

7. In a heel attaching machine, having a heel attaching station and a heel loading station, a jack for a shoe and a nailing die arranged at the heel attaching station, a carrier unit for positioning and clamping a heel at the heel loading station, means for moving said unit about an axis from the heel loading station to the heel attaching station to locate said heel in a predetermined position between the nailing die and the shoe on the jack, means for locking the carrier unit against movement away from the heel attaching station, and means for moving the jack at the heel attaching station toward the nailing die to force the heel seat portion of the shoe against the heel and the heel against said die, said carrier unit being movable as an entirety toward and away from said nailing die about an axis disposed at right angles to the aforesaid axis to permit the heel to be forced against the nailing die by the action of the shoe on the jack.

8. In a heel attaching machine having a heel attaching station, fluid pressure means adapted automatically to position and clamp a heel and to move it to a predetermined position at said heel attaching station, fluid pressure means for locking said first-named means against movement away from said station, fluid pressure means for forcing a shoe against the heel at the heel attaching station, fluid pressure means for driving a plurality of nails simultaneously by successive impact action into the heel and the heel seat of the shoe to secure the heel to the shoe, and means for insuring against operation of said third and fourth-named means until the first-named means has moved the heel to said predetermined position at the heel attaching station.

9. In a heel attaching machine having a cycle of operation, a magazine comprising a fixed rear section adapted to be engaged by the rear ends of a stack of heels, a pair of forward sections, means for moving said forward sections manually equal distances toward each other and toward the rear section for orienting and initially clamping the heel in the magazine, and means for automatically moving said forward sections away from and then toward each other during said cycle.

10. In a heel attaching machine operative automatically through a cycle, a magazine comprising a fixed rear section adapted to be engaged by the rear ends of a stack of heels, a pair of forward sections one of which is adapted to be engaged by one of the side faces respectively of the heels and the other of which is adapted to be engaged by the breasts and the other side faces respectively of the heels, manually actuated means for initially moving said forward sections into different adjusted positions equal distances toward each other and toward the rear section to cause said heels to be oriented in measured stacked relation in the magazine, and power means for automatically moving said forward sections away from and toward each other during a portion of said cycle.

11. In a heel attaching machine operative automatically through a cycle, a magazine comprising a fixed rear section adapted to be engaged by the rear ends of a stack of heels, movable forward sections one of which is adapted to be engaged by one of the side faces of the stack of heels and the other of which is adapted to be engaged by the breasts and the other side faces respectively of said heels, manually actuated means for initially moving with relation to the rear section said forward sections bodily along graded paths which converge as they approach the rear section, and power operative means for temporarily moving said forward sections away from each other and then toward each other in paths different from said graduated paths during a portion of the cycle of the machine whereby to release a lowermost heel from the magazine and then to secure the stack of heels against movement in the magazine.

12. In a heel attaching machine having a heel loading station and a heel attaching station, a heel carrier unit which has a cover plate provided with an opening, power means for moving the carrier unit between the heel loading station and the heel attaching station, a magazine which is arranged at the heel loading station over the heel carrier unit and is adapted to receive heels in stacked relation, a table which is arranged at the heel loading station below the magazine and the carrier unit, said magazine comprising a fixed rear section adapted to be engaged by the rear ends of the heels and movable forward sections, means for initially sliding said forward sections toward each other and toward the rear section, after loading an empty magazine with heels, to orient the heels in the magazine and to clamp all except the lowermost heel in said stack against movement, in the magazine, means for attaching a heel to a shoe at the heel attaching station, and power means which is operative in timed relation with the heel attaching means and which moves the forward sections of the magazine away from each other whereby to cause, after the machine has completed one cycle subsequently to filling the magazine, the entire stack of heels in the magazine to drop in the magazine and to be supported by the cover plate, with the lowermost heel in engagement with the cover plate, and then to cause the side sections to move toward each other to clamp all except the lowermost heel in the stack against movement in the magazine, said lowermost heel in the magazine when the unit arrives at the heel loading station being adapted to drop through the opening in the carrier unit and onto the table, said unit comprising means for positioning and clamping the lowermost heel on the table in the carrier unit preparatory to moving the carrier unit to the heel attaching station.

13. In a heel attaching machine having a heel attaching station, means which comprises a cover plate and is adapted to position and clamp heels and deliver them successively to the heel attaching station, and a magazine adapted to deliver heels successively to said means, said magazine comprising a fixed rear section and forward sections which are arranged over the cover plate, said forward sections being movable toward and away from each other and having opposed faces upper portions of which are made of resilient material and extend toward each other beyond lower portions of said forward sections.

14. In a heel attaching machine having a heel and base lift loading station and a heel and base lift attaching station, a jack for a shoe and a nailing die arranged at the heel and base lift attaching station, a table arranged at the heel and base lift loading station, a carrier unit comprising a cover plate provided with an opening and heel and base lift positioning and clamping members arranged below and adjacent to said opening, a magazine arranged above the table and above the cover plate, means for moving said unit between the loading station in which the opening is arranged below the magazine and above the table and at which heel and base lifts drop through the opening onto the table and between said members, and said attaching station at which the opening and the heel and the heel and base lifts positioned and clamped in the unit are arranged between the jack and the nailing die, means for moving the jack from an idle position toward the nailing die to cause the heel seat of the shoe to be forced against the base lift and the heel lift to be forced against the nailing die, said carrier unit being bodily movable toward the nailing die in response to said movement of the jack to facilitate the pressing of the heel lift against the nailing die, means for driving nails into said lifts and into the heel seat of the shoe while the heel lift is forced against the nailing die whereby to attach said lifts to the shoe, means operative while the heel lift is forced against the nailing die for first releasing the stack of heel and base lifts in the magazine allowing them to be temporarily supported by the cover plate of the carrier unit and then clamping against movement in the magazine all except the lower heel and base lifts in said magazine, said second-named means being operative to move the jack toward its idle position preparatory to moving the carrier unit to the loading station.

15. In a heel attaching machine, a magazine comprising a fixed rear section and movable forward sections which are adapted to be engaged by the rear and side faces respectively of heels arranged in stacked relation in said magazine and a door which is hinged to one of the front sections and is normally secured slidingly in closed relation to the other front section, manual means for initially moving said forward sections away from each other and away from the rear section and for thereafter moving said forward sections toward each other and toward the rear section generally to orient the stacked heels in the magazine, power means for automatically moving the forward sections away from each other during a power cycle of the machine for causing the heels in the magazine to drop in said magazine and for moving said forward sections toward each other to clamp all except the lowermost heel in said magazine, and a leaf spring which is secured to the door and extends downward and toward the rear section of the magazine, said door together with said front and rear sections being adapted generally to orient the stacked heels in the magazine and the leaf spring secured to the door being adapted, when the stack of heels has been placed in the magazine, in response to operation of said power means to force the rear ends of the heels in the lower portion of the magazine against the rear section and to press firmly against the breasts of the heels at the lower end of the magazine as they drop in said magazine whereby to insure that said heels are forced yieldingly against said rear section.

16. In a heel attaching machine having a heel loading station and a heel attaching station, a fixed table arranged at the heel loading station, a magazine arranged above the table at the heel loading station, a heel carrier unit movable between the heel attaching station and the heel loading station to a position beneath the magazine and above said table, a heel support movable between an inactive position away from said loading station and an active position arranged at the loading station below the magazine and above the heel carrier unit, said magazine comprising a fixed rear section adapted to be engaged by the rear ends of heels stacked in the magazine and mounted on the support, and relatively movable forward sections upper opposing faces of which are formed of resilient material and which form between them a relatively narrow chamber portion adapted to engage a main stack of heels, and lower opposing faces of which form between them a relatively wide lower chamber portion adapted to receive a lowermost heel in the stack, means for moving the opposing faces of the forward sections of the magazine against the sides of the heels of said main stack to cause said magazine to support the weight of the main stack while retaining the lowermost heel on the support free to drop from said lower chamber when the support is moved from its active position, and means for moving the support from its active position beneath the magazine to an inactive position to allow the lowermost heel to drop onto the table and into the carrier unit.

17. In a heel attaching machine having a heel loading station and a heel attaching station, a magazine spaced from and arranged above a table at the heel loading station, a jack spaced from and arranged below a nailing die at the heel attaching station, a heel positioning and clamping unit movable between the heel attaching station, where it is positioned above the jack and below the die, and the heel loading station where it is positioned below the magazine and above the table, said magazine comprising a relatively large upper chamber adapted to receive a main stack of heels and base lifts and a relatively small lower chamber adapted to receive a lowermost heel and associated base lift of the stack, said heel positioning and clamping unit comprising a cover plate provided with an opening which registers over the table and below the magazine when the unit is at the loading station and which is arranged over the jack and below the nailing die when the unit is at the attaching station, said upper and lower chambers of the magazine being defined by a fixed rear section and a pair of forward sections, manual means for initially moving the forward sections of the magazine equal distances toward and away from each other and toward and away from the rear section into different adjusted positions to cause the forward sections to clamp in said upper chamber the main stack of heel and base lifts secured to the magazine but to allow the heel lift and the associated base lift in said lower chamber freedom when permitted to drop from the magazine, and power means for moving the forward sections of the magazine away from each other when the unit is at the heel attaching station to cause the stack of heel and base lifts to drop in the magazine until the lowermost base lift in the magazine then in the lower chamber engages the cover plate of the unit, said power means being adapted thereafter to move the forward sections toward each other when the unit is at the heel attaching station to clamp all of the heel and base lifts in the upper chamber of the magazine but not the heel lift and its associated base lift in the lower chamber of the magazine, said lowermost heel lift and its associated base lift being free to drop through the opening and the cover and onto the table when the unit has returned to the heel loading station.

18. In a heel attaching machine having a heel loading station and a heel attaching station, a magazine which has a fixed rear section and has side sections movable toward and away from each other and which is adapted to receive heels and associated base lifts, manually actuated means for initially moving the side sections of the magazine toward each other to clamp the heels and their associated base lifts against movement in the magazine, a heel carrier unit comprising a cover plate having an opening and heel and base lift positioning and clamping members arranged adjacent to and beneath said opening, a fixed heel supporting table, means for moving the carrier unit between said heel loading station, in which its opening and its heel and base lift positioning and clamping members are arranged just below the magazine and above the work supporting table, and said heel attaching station, and means for automatically moving the side sections of the magazine away from each other when the carrier unit is at the heel attaching station whereby to allow a lowermost heel and its associated base lift in the magazine to drop onto the platform and for thereafter moving the side sections toward each other while the carrier unit is at the heel attaching station to clamp against movement in the magazine the heel and base lifts above said lowermost heel and base lifts, said magazine having a wide lower portion which is spaced from the heel and base lifts dropped onto the cover plate when the side sections have been moved into clamping relation with the remaining heels and base lifts in the magazine, said lowermost heel and base lifts being free to drop through the opening in the cover plate and between the heel positioning and clamping members of said unit and onto the table when the carrier unit has been moved to the heel loading station.

19. In a heel attaching machine having a heel loading station and a heel attaching station, a jack, a nailing die arranged opposite said jack at the heel attaching station, a magazine which has a fixed rear section and has side sections movable toward and away from each other and which is adapted to receive heels and associated base lifts, manually actuated means for initially moving the side sections of the magazine toward each other to secure the heels and base lifts against dropping movement in the magazine, a heel carrier unit comprising a cover plate having an opening and heel and base lift positioning and clamping members arranged adjacent to and below the opening, a heel supporting table, means for moving the carrier unit between the heel loading station, where the opening in the cover plate and the heel positioning and clamping members are arranged below the magazine and above the work supporting table, and the heel attaching station where the opening in the cover plate and the heel positioning and clamping members are arranged above the jack and below the nailing die, and means for automatically moving the side sections of the magazine away from each other when the heel carrier unit is at the heel attaching station whereby to allow a stack of interspersed heel and base lifts to drop in the magazine and to allow the lowermost heel and base lift in the magazine to drop onto the cover plate, and for thereafter moving said side sections toward each other while the carrier unit is at the heel attaching station to secure against movement in the magazine, said heel and base lifts above said lowermost heel and base lifts, said magazine having a wide lower portion free from the heel and base lifts dropped onto the cover plate while the remaining heel and base lifts are secured against movement in the magazine, said lowermost heel lift and associated base lift on the cover plate being free to drop through the opening in the cover plate and between the heel positioning and clamping members and onto the table when the carrier unit has been moved to the heel receiving station.

20. In a heel attaching machine having a heel attaching station and a heel receiving station, a heel carrier unit which is movable between the heel receiving station and the heel attaching station and comprises a flat cover plate having an opening and heel positioning and clamping members arranged below said opening, a magazine which is arranged at the heel receiving station, a lower end of said magazine being arranged above the opening of the cover plate when the carrier unit is in the heel receiving station and being arranged in opposed relation to a flat upper face of said cover plate when the carrier unit is at the heel attaching station, said magazine comprising a fixed rear section and side sections which normally secure a main stack of heels against movement in the magazine and are movable away from each other to release the main stack of heels in the magazine whereby to permit the lowermost heel to drop onto the flat upper face of said cover plate and which are then moved toward each other to secure in the magazine the heels positioned above said released heel, the distance between the lower end portions of the side sections of the magazine being greater than the width of the heel on the cover plate thereby permitting said released heel free to drop through the opening in the cover plate and between the heel positioning and clamping members when the heel carrier unit is moved to the heel receiving station while securing the main stack of heels against dropping movement in the magazine.

21. In a machine for attaching heels to shoes, a carrier unit having means for positioning and clamping a heel with its vertical median plane arranged in a median plane of the carrier unit and with its axis of symmetry coincident with a fixed axis of said unit, a jack provided with a spindle which has an axis and is adapted to receive a thimble of a last bearing shoe, a nailing die, means for orienting the last about the axis of said spindle to move a vertical median plane of the heel seat of the last into coincidence with a fixed reference plane of the machine, means for moving the carrier unit into a position in which the vertical median plane of the heel clamped in said unit is located in said fixed reference plane of the machine and in which the axis of symmetry of the heel is arranged parallel to and is spaced a predetermined distance from the axis of the spindle irrespective of the size of the shoe and its associated heel, means for effecting relative movement of the jack and the die lengthwise of the axis of the spindle to force together the heel and the heel seat of the shoe on the one hand and the heel and the nailing die on the other hand, and means for locking the carrier unit against lateral displacement from the heel attaching station to insure that the median plane of the carrier unit and the vertical median plane of the heel is said unit shall remain coincident with the fixed reference plane of the machine during the application of pressure against the work.

22. In a machine for attaching heels to shoes, a carrier unit, means for positioning and clamping in said unit a heel with a vertical median plane thereof located in a median reference plane of the carrier unit and with an axis of symmetry thereof located in a fixed axis of said unit, a jack having a spindle which has an axis and is adapted to receive the thimble of a last bearing a shoe, a nailing die, means for orienting the last about the axis of the spindle of the jack to move the vertical median plane of the heel seat of the last into coincidence with a fixed reference plane of the machine, means for moving the carrier unit to a heel attaching station into a position in which the vertical median plane of the heel clamped in the carrier unit is located in said fixed reference plane of the machine and in which the axis of symmetry of the heel is located parallel to and is spaced a predetermined distance from the axis of the spindle irrespective of the size of the shoe and its associated heel, means for effecting at the heel attaching station relative movement of the jack and the die lengthwise of the axis of the spindle to force together the heel and the heel seat of the shoe on the one hand and the heel and the nailing die on the other hand, and means for locking at the heel attaching station the carrier unit against displacement to insure that the vertical reference plane of the carrier unit and the vertical median plane of the heel in said unit shall be coincident with the fixed reference plane of the machine during the relative movement of the jack and the die, said carrier unit being mounted for swinging movement as an entirety with reference to the jack and the nailing die with its median reference plane coincident with the fixed reference plane of the machine during relative movement of the jack and the die.

23. In a machine for attaching heels to shoes, a table, a carrier unit, means for positioning and clamping in the carrier unit at a heel loading station a heel, which is supported by the table, with its vertical median plane located in a median reference plane of the carrier unit and its axis of symmetry located in a fixed axis of said unit, a jack having a spindle adapted interchangeably to receive at a heel attaching station the thimbles of lasts which carry shoes and the heel seats of which are graduated different distances from the axes of the thimbles of the lasts in accordance with the sizes of the shoes, a nailing die, means for orienting at the heel attaching station the lasts about an axis of the spindle of the jack to move longitudinal vertical median planes of the heel seats of the lasts into coincidence with a fixed reference plane of the machine, means for moving the carrier unit from the loading station to the heel attaching station to a position in which the longitudinal vertical median plane of the heel clamped in said unit is arranged in the fixed plane of the machine and in which the axis of symmetry of the heel is arranged parallel to and is spaced a predetermined distance from the axis of the spindle irrespective of the size of the shoe and its associated heel, means for moving the jack in a rectilinear path lengthwise of the axis of the spindle toward the nailing die to force the heel seat of the shoe against the heel on the one hand and the heel against the nailing die on the other hand preparatory to attaching the heel to the shoe, and means for locking during the application of pressure against the work the carrier unit against lateral displacement to insure that the vertical median plane of the carrier unit and accordingly the longitudinal vertical median plane of the heel in said unit shall remain coincident with the fixed reference plane of the machine during the movement of the jack toward the nailing die, said carrier unit being mounted for swinging movement as an entirety, under pressure of the shoe against the heel and/or directly against the carrier unit, toward and away from said die with its median reference plane coincident with the fixed vertical reference plane of the machine in response to movement of the jack.

24. In a heel attaching machine having a heel attaching station and a heel loading station, a jack for a shoe and a nailing die arranged at said heel attaching station, a heel carrier unit movable between said heel loading station and said heel attaching station, means for positioning and clamping a heel in the carrier unit at the heel loading station, a stop, means for moving the carrier unit and the heel positioned and clamped in it to predetermined positions arranged between the jack and the nailing die and controlled by said stop, means for moving the jack in a predetermined path toward the nailing die to force a heel seat portion of the shoe against the heel and the heel against the nailing die, means for locking at the heel attaching station the carrier unit against movement widthwise of the jack, and means for permitting movement of the carrier unit as an entirety generally heightwise of the jack under pressure of the shoe.

25. In a heel attaching machine, a support for heel and base lifts, a carrier unit for positioning and clamping associated heel and base lifts mounted on the support, said carrier unit comprising a positively operated breast clamp and a pair of positively operated side clamps each of which has associated with it an arm which is spring biased to a rest position with relation to the associated side clamp, means for positively moving at one rate the breast clamp against the breast faces of the heel and base lifts causing these faces to be substantially alined and for simultaneously therewith moving at another rate the side clamps toward each other and against the rear lateral sides of the heel lift causing said clamps to cooperate with the breast clamp in the positioning of the heel lift irrespective of its size with a vertical median plane of the heel lift arranged in a fixed reference plane of the carrier unit and with an axis of symmetry of the heel lift coincident with a fixed reference axis of said unit, said arms mounted on the side clamps being adapted, as they are moved toward each other with the side clamps, to bear against the rear portions of the sides of the base lift to hold it clamped against the breast clamp with its side and rear margins projecting beyond the side and rear margins respectively of the heel lift.

26. In a heel attaching machine, a support for associated base and heel lifts, a carrier unit for positioning and clamping said associated lifts, said unit comprising a breast clamp and a pair of side clamps each of which is journaled to a carrier arm mounted upon a bearing stud, a presser arm which is pivotally mounted on each of the bearing studs, a stop secured to each of the carrier arms, and a spring for swinging each of the presser arms to a projected position with relation to an associated carrier arm, means for positively forcing at one speed the breast clamp against the breast faces of the heel and base lifts, whereby to cause these faces to be alined, and for simultaneously moving at another speed the side clamps toward each other and against the rear lateral sides of the heel lift causing them to cooperate with the breast gage in the positioning of the heel lift, irrespective of its size, with a vertical median plane thereof arranged in a fixed reference plane of the carrier unit and with an axis of symmetry thereof coincident with a fixed reference axis of the unit, said presser arms being adapted to be moved toward each other in response to movement of the side arms toward each other whereby to cause the presser members to bear against the rear side portions of the base lift to hold it against the breast clamp with its side and rear margins projecting beyond the side and rear margins respectively of the heel lift, said side arms during such movement yielding against the action of the associated springs with reference to their associated side clamps.

27. In a heel attaching machine, a support for a heel lift and a base lift, a carrier unit for positioning and securing the heel and base lifts in position on the support, said unit including a breast clamp comprising heel and base lift engaging portions and a pair of side clamps which are adapted to engage rear opposite sides of the heel lift and opposite ends of which carry presser members adapted to engage the rear opposite sides of the base lift and to yield under pressure with relation to the side clamps, means for positively moving at one rate the breast clamp against the breast faces of the heel and the base lifts causing these faces to be substantially alined and for simultaneously moving at another rate the side clamps toward each other against the rear lateral sides of the heel lift causing them to cooperate with the breast clamp in the positioning of the heel lift, irrespective of its size, with a vertical median plane thereof arranged in a fixed reference plane of the carrier unit and with an axis of symmetry thereof coincident with a fixed reference axis of said unit, said presser members being adapted as they are moved toward each other with the side clamps to bear against the rear lateral portions of the sides of the base lift to hold it clamped against the breast clamp with its side and rear margins projecting beyond the side and rear margins of the heel lift, and means for initially effecting adjustment of the base lift portion of the breast clamp with relation to the heel lift portion of the breast clamp.

28. In a heel attaching machine having drivers for nails, a nailing die having a plurality of driver guides each formed with a recess, an insert replaceably secured in each recess and having a passage adapted to receive a nail and a driver and also having an outer wall in which is formed a peripheral channel, a plurality of radial bores which extend between the peripheral channel and the passage of each of the inserts, detents which are arranged respectively in said bores, and a resilient sleeve which is housed in said peripheral channel of each of the inserts and is adapted to force the detents into positions in which they extend beyond the wall of the passage of the associated insert and are adapted to be engaged by the heads of nails dropping down said passage to retain said nails in driver receiving positions, said bores being adapted to limit movement of the detents into the passages and being adapted to allow the detents to move apart against the action of the resilient sleeve whereby to allow the nails to be driven through the passage of the insert and into work when pressure is applied by the associated driver against the heads of the nails.

29. In a heel attaching machine having drivers for nails, a nailing die including a plurality of driver guides each provided with a recess, means for moving the driver guides into different adjusted positions to vary the pattern of the die, each of the driver guides having an upper driver passage of relatively large diameter and a nail delivering passage the lower end of which opens into the upper driver passage, each of the driver guides having interchangeably secured in its recess a tubular insert having a relatively small driver passage coaxially arranged with relation to said upper driver passage and having an upper funnel-shaped portion joining said upper and lower driver passages, each of said tubular inserts having formed in it a peripheral channel, a plurality of radial bores which extend between the peripheral channel and said small driver passage, ball detents which are arranged in the bores, said bores having stop portions which are adapted to be engaged by the detents to limit movement of the detents toward each other into the small driver passage, and a resilient sleeve which is housed in said channel and is adapted constantly to urge the ball detents against said stop portions of the bores and into said small driver passage in which position the detents are adapted to be engaged by the heads of nails dropping down said small driver passage to retain said nails in position to be engaged by an associated driver, said bores being adapted to allow the ball detents acted upon by the nail hanging by its head on the detents and being driven by an associated driver, to move apart against the action of the resilient sleeve whereby to allow the nail to be driven into work when pressure is applied by the driver against the head of the nail.

30. In a heel attaching machine, a nailing die having a vertical median plane, a jack post having a vertical median plane coincident with the vertical median plane of the die and having a last supporting face and also having fixed to it a spindle which projects above said face and is adapted to receive a thimble of a geometrically graded last provided with a positioning plate having shoulders arranged equal distances from a vertical longitudinal median plane of the heel seat of the last, means for moving the jack post in a rectilinear path toward and away from the nailing die between a loading and an unloading position and a heel attaching position, a fixed abutment, a lug fixed to the jack post, a unit which is mounted on the jack post and comprises a movable lever, a toggle journaled to said lever, an actuator plate which is operatively connected to the toggle, and a spring adapted constantly to urge the actuator plate toward said fixed abutment to close the toggle whereby to move, when permitted, the lever toward the fixed lug of the jack post, said actuator plate being adapted, when the jack post is moved toward its heel attaching position, to cause the lever to move away from the fixed abutment whereby to allow the spring to effect through the toggle the moving of the lever against one of the shoulders of the positioning plate of the last and to force the other shoulder of the positioning plate against said fixed lug whereby to orient the last mounted upon the spindle with the vertical longitudinal median plane of the heel seat of the last coincident with the vertical median planes of the nailing die and the jack post, said actuator plate upon movement of the jack post to its loading and unloading position being adapted to engage the fixed abutment to cause the lever to be moved against the action of the spring away from the associated shoulder of the positioning plate of the last whereby to allow movement of the last upon the thimble of the last and away from the fixed lug to facilitate the removal of the last from the jack and the placing of another last upon said jack.

31. In a heel attaching machine having a heel attaching station and a heel loading station, a jack and a nailing die arranged at the heel attaching station and having a fixed common median reference plane, a heel positioning and clamping unit having a medium reference plane and an axis of symmetry arranged in said plane of the unit, a mount for supporting the heel positioning and clamping unit, means for moving the mount predetermined distances in opposite directions to cause the unit to be moved between the heel loading station and the heel attaching station, and means for initially adjusting the unit upon the mount substantially about the axis of symmetry of the unit to insure that the median reference plane of the unit shall be coincident with the fixed common reference plane of the jack and the nailing die when the unit is at the heel attaching station.

32. In a heel attaching machine having a heel loading station and a heel attaching station, a jack which is arranged at the heel attaching station and has a vertical spindle, said jack having a fixed vertical median reference plane in which an axis of said spindle lies, a heel positioning and clamping unit having a vertical median reference plane and a vertical axis of symmetry lying in said plane of the unit, a mount for the heel positioning and clamping unit, means for moving about a vertical axis the mount predetermined distances in opposite directions to cause the unit to be moved between the heel loading station and the heel attaching station at which the axis of symmetry of said unit lies in the fixed vertical reference plane of the jack, and means for initially adjusting upon the mount the unit substantially about its axis of symmetry to insure that the vertical median reference plane of the unit shall be coincident with the fixed reference plane of the jack when the unit on the mount has been moved to its heel attaching position.

33. In a heel attaching machine having a heel loading station and a heel attaching station, a heel positioning and clamping unit having a longitudinal median plane and an axis of symmetry lying in said plane, a mount, means for initially moving upon said mount the unit into any one of different adjusted positions substantially about the axis of symmetry of said unit, means for securing the positioned unit to said mount, and means for swinging between the heel loading station and the heel attaching station said mount and accordingly the unit about an axis parallel to the axis of symmetry of said mount.

34. In a heel attaching machine having a heel loading station and a heel attaching station, a heel positioning and clamping unit having a longitudinal vertical median plane and a vertical axis of symmetry lying in said plane, a mount comprising an arm and a block which is journaled for movement about a vertical axis and upon which the arm is journaled for movement about a horizontal axis disposed at right angles to and intersecting said second-named vertical axis, means for initially moving into different adjusted positions on the mount the unit in a desired operating position substantially about an axis of symmetry of the unit, means for securing the initially positioned unit to said arm, and means for moving the block about said second-named vertical axis to move the heel positioning and clamping unit between the heel loading and heel attaching stations, said arm and accordingly the unit being free to swing about said horizontal axis under pressure of work applied against said unit at the heel loading station.

35. In a heel attaching machine, a nailing die having driver passages, means for presenting to the nailing die a shoe and a heel to be attached to the shoe, drivers cooperative with the nailing die to drive nails in the driver passages into the heel and the heel seat of the shoe to attach the heel to the shoe, and a nail distributor comprising a plurality of raceways, a tilt-pot hopper for delivering nails to the raceways, tubes for delivering nails to the driver passages of the nailing die, a separator plate which has slots and is operatively connected to the hopper, means for raising and lowering the hopper, mechanism for automatically operating in timed relation through a cycle the drivers, the shoe and heel presenting means, the tilt-pot hopper, the separator plate and the tilt-pot hopper raising and lowering means, and means for causing during a last portion of said cycle and in response to movement of the tilt-pot hopper to its raised position, the separator plate to be moved from a nail receiving position in which its slots receive nails from the raceways to a nail delivering position in which the nails are delivered to the tubes and also for causing during the first part of the following cycle and in response to movement of the tilt-pot hopper to its lowered position the separator plate to return to its nail receiving position.

References Cited by the Examiner

UNITED STATES PATENTS

| | | | |
|---|---|---|---|
| 536,427 | 3/1895 | Hayes | 227—149 |
| 2,538,895 | 1/1951 | Brennan | 227—149 XR |
| 2,943,329 | 7/1960 | Spencer | 227—48 |
| 3,071,775 | 1/1963 | Strout | 227—29 |
| 3,072,913 | 1/1963 | Morgan et al. | 227—1 |

GRANVILLE Y. CUSTER, JR., *Primary Examiner.*